(12) United States Patent
Beeson et al.

(10) Patent No.: US 7,025,464 B2
(45) Date of Patent: Apr. 11, 2006

(54) PROJECTION DISPLAY SYSTEMS UTILIZING LIGHT EMITTING DIODES AND LIGHT RECYCLING

(75) Inventors: Karl W. Beeson, Princeton, NJ (US); Scott M. Zimmerman, Baskin Ridge, NJ (US)

(73) Assignee: Goldeneye, Inc., Carlsbad, CA (US)

( * ) Notice: Subject to any disclaimer, the term of this patent is extended or adjusted under 35 U.S.C. 154(b) by 0 days.

(21) Appl. No.: 10/815,005

(22) Filed: Mar. 30, 2004

(65) Prior Publication Data

US 2005/0219476 A1 Oct. 6, 2005

(51) Int. Cl.
  *G03B 21/00* (2006.01)
  *G03B 21/20* (2006.01)
  *G03B 21/26* (2006.01)
  *G03B 21/28* (2006.01)
  *F21V 7/00* (2006.01)

(52) U.S. Cl. .............................. 353/98; 353/30; 353/31; 353/99; 353/121; 362/297; 362/347; 313/113; 313/114

(58) Field of Classification Search .................. 353/30, 353/31, 85, 98, 99, 121; 362/297, 347; 313/113, 313/114
See application file for complete search history.

(56) References Cited

U.S. PATENT DOCUMENTS

| 5,410,454 A | 4/1995 | Murase et al. ................. 362/31 |
| 6,144,536 A | 11/2000 | Zimmerman et al. .......... 361/31 |
| 6,185,357 B1 | 2/2001 | Zou et al. .................... 385/133 |
| 6,186,649 B1 | 2/2001 | Zou et al. .................... 362/347 |
| 6,318,863 B1 * | 11/2001 | Tiao et al. ..................... 353/31 |
| 6,356,700 B1 * | 3/2002 | Strobl ......................... 385/147 |
| 6,550,942 B1 | 4/2003 | Zou et al. .................... 362/347 |

\* cited by examiner

*Primary Examiner*—Judy Nguyen
*Assistant Examiner*—Melissa J Koval
(74) *Attorney, Agent, or Firm*—William Propp, Esq.

(57) ABSTRACT

A projection display system has at least one light-recycling illumination system and at least one imaging light modulator. The light-recycling illumination system includes a light source that is enclosed within a light-recycling envelope. The light source is a light-emitting diode that emits light, an a fraction of that light will exit the light-recycling envelope through an aperture. The light-recycling envelope recycles a portion of the light emitted by the light source back to the light source in order to enhance the luminance of the light exiting the aperture. The fraction of the light that exits the aperture is partially collimated and is directed to the imaging light modulator. The imaging light modulator spatially modulates the partially collimated light to form an image.

34 Claims, 25 Drawing Sheets

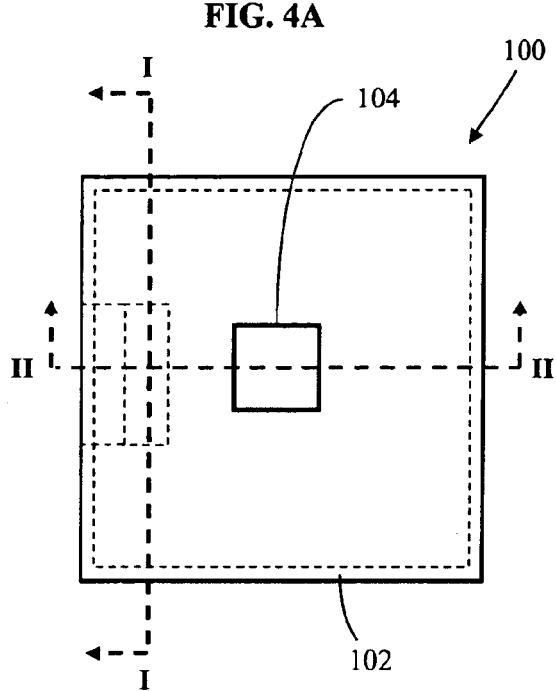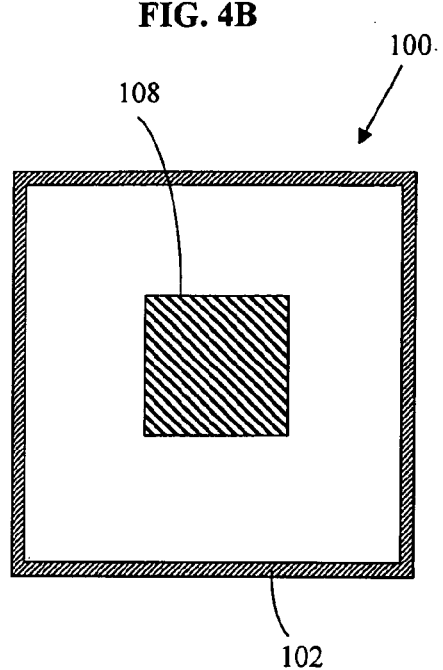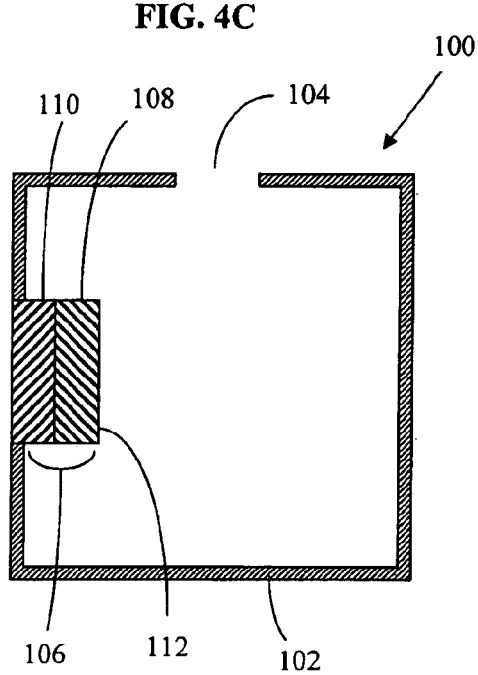

PROJECTION DISPLAY SYSTEMS UTILIZING LIGHT EMITTING DIODES AND LIGHT RECYCLING

CROSS REFERENCE TO RELATED APPLICATION

This application is related to U.S. Patent Application Ser. No. 10445136 entitled "ILLUMINATION SYSTEMS UTILIZING HIGHLY REFLECTIVE LIGHT EMITTING DIODES AND LIGHT RECYCLING TO ENHANCE BRIGHTNESS," which is herein incorporated by reference. This application is also related to U.S. Patent Application Ser. No. 10/814,043 entitled "ILLUMINATION SYSTEMS UTILIZING LIGHT EMITTING DIODES AND LIGHT RECYCLING TO ENHANCE OUTPUT RADIANCE" and to U.S. patent application Ser. No. 10/814,044 entitled "ILLUMINATION SYSTEMS UTILIZING MULTIPLE WAVELENGTH LIGHT RECYCLING," both of which are filed concurrently with this application and which are herein incorporated by reference.

TECHNICAL FIELD

This invention relates to projection display systems incorporating light-emitting diodes (LEDs).

BACKGROUND OF THE INVENTION

Illumination systems are used as either stand-alone light sources or as internal light sources for more complex optical systems. Examples of optical systems that utilize or incorporate illumination systems include projection displays, flat-panel displays and avionics displays.

Many applications require illumination systems with high brightness and a small effective emitting area. An example of a conventional light source with high brightness and a small effective emitting area is an arc lamp source, such as a xenon arc lamp or a mercury arc lamp. Arc lamp sources may have emitting areas as small as a few square millimeters. An example of a complex optical system that can utilize an illumination system with high brightness and a small effective source area is a projection display system. Current projection display systems typically project the combined images of three small red, green and blue cathode-ray-tube (LCD) device, a liquid-crystal-on-silicon (LCOS) device or a digital light processor (DLP) device onto a viewing screen. DLP devices utilize an array of micro-mirrors to form an image. Light sources such as LEDs are currently not used for projection display systems because LED sources do not have sufficient output brightness.

The technical term brightness can be defined either in radiometric units or photometric units. In the radiometric system of units, the unit of light flux or radiant flux is expressed in watts and the unit for brightness is called radiance, which is defined as watts per square meter per steradian (where steradian is the unit of solid angle). The human eye, however, is more sensitive to some wavelengths of light (for example, green light) than it is to other wavelengths (for example, blue or red light). The photometric system is designed to take the human eye response into account and therefore brightness in the photometric system is brightness as observed by the human eye. In the photometric system, the unit of light flux as perceived by the human eye is called luminous flux and is expressed in units of lumens. The unit for brightness is called luminance, which is defined as lumens per square meter per steradian. The human eye is only sensitive to light in the wavelength range from approximately 400 nanometers to approximately 700 nanometers. Light having wavelengths less than about 400 nanometers or greater than about 700 nanometers has zero luminance, irrespective of the radiance values.

In U.S. Patent Application Ser. No. 10445136, brightness enhancement referred to luminance enhancement only. Since luminance is non-zero only for the visible wavelength range of 400 to 700 nanometers, U.S. Patent Application Ser. No. 10445136 is operative only in the 400 to 700-nanometer wavelength range visible to the human eye. In U.S. patent application Ser. No. 10/814,043 entitled "ILLUMINATION SYSTEMS UTILIZING LIGHT EMITTING DIODES AND LIGHT RECYCLING TO ENHANCE OUTPUT RADIANCE," brightness enhancement refers to radiance enhancement and is valid for any wavelength throughout the optical spectrum. In this application, brightness enhancement will generally refer to luminance enhancement.

In a conventional optical system that transports light from an input source at one location to an output image at a second location, one cannot produce an optical output image whose luminance is higher than the luminance of the light source. A conventional optical system 20 of the prior art is illustrated in cross-section in FIG. 1. In FIG. 1, the input source 22 has area, Area$_{in}$. The light rays from input source 22 fill a truncated cone having edges 21 and 23. The cone, which is shown in cross-section in FIG. 1, extends over solid angle 27. The magnitude of solid angle 27 is $\Omega_{in}$. Lens 24 focuses the light rays to image 26 having area, Area$_{out}$. The light rays forming the image 26 fill a truncated cone having edges 25 and 29. The cone, which is shown in cross-section, extends over solid angle 28. The magnitude of solid angle 28 is $\Omega_{out}$.

If the optical system 20 has no losses, the light input flux at the input source 22, $$\Phi_{in} = (\text{Luminance}_{in})(\text{Area}_{in})(\Omega_{in}), \quad [\text{Equation 1}]$$

equals the light output flux at the output image 26, $$\Phi_{out} = (\text{Luminance}_{out})(\text{Area}_{out})(\Omega_{out}). \quad [\text{Equation 2}]$$

In these equations, "Luminance$_{in}$" is the luminance at the input source 22, "Luminance$_{out}$" is the luminance at the output image 26, "Area$_{in}$" is the area of the input source 22 and "Area$_{out}$" is the area of the output image 26. The quantities $\Omega_{in}$ and $\Omega^{out}$ are, respectively, the projected solid angles subtended by the input source and output image light cones. In such a lossless system, it can be shown that $$\text{Luminance}_{in} = \text{Luminance}_{out} \quad [\text{Equation 3}]$$

and $$(\text{Area}_{in})(\Omega_{in}) = (\text{Area}_{out})(\Omega_{out}). \quad [\text{Equation 4}]$$

If the index of refraction of the optical transmission medium is different at the input source and output image positions, the equality in Equation 4 is modified to become $$(n_{in}^2)(\text{Area}_{in})(\Omega_{in}) = (n_{out}^2)(\text{Area}_{out})(\Omega_{out}), \quad [\text{Equation 5}]$$

where $n_{in}$ is the index of refraction at the input position and $n_{out}$ is the index of refraction at the output position. The quantity $(n^2)(\text{Area})(\Omega)$ is variously called the "etendue" or "optical extent" or "throughput" of the optical system. In a conventional lossless optical system, the quantity $(n^2)(\text{Area})(\Omega)$ is conserved and Luminance$_{in}$ equals Luminance$_{out}$. However, under certain conditions utilizing such light recycling, the effective luminance of the source as well as the maximum exiting luminance of the optical system can be higher than the intrinsic luminance of the source in the absence of recycling, a result that is not predicted by the standard etendue equations.

Recently, highly reflective green, cyan, blue and ultraviolet LEDs and diode lasers based on gallium nitride (GaN), indium gallium nitride (InGaN), aluminum gallium nitride (AlGaN) and aluminum nitride (AlN) semiconductor materials have been developed. Some of these LED devices have high light output, high luminance and have a reflecting layer that can reflect at least 50% of the light incident upon the device. Such a reflecting layer is necessary in order to increase the effective luminance of the LED by light recycling. The reflecting layer of the LED can be a specular reflector or a diffuse reflector. Typically, the reflecting layer of the LED is a specular reflector. Luminance outputs of several million lumens per square meter per steradian and total outputs greater than 100 lumens from a single packaged device arc possible. Light outputs per unit area can exceed 25 lumens per square millimeter. As such, several new applications relating to illumination systems have become possible. Advantages such as spectral purity, reduced heat, and fast switching speed all provide motivation to use LEDs and semiconductor lasers to replace fluorescent, incandescent and arc lamp sources.

Red and yellow LEDs were developed earlier than the UV, blue, cyan and green LEDs. The red and yellow LEDs are generally made from a different set of semiconductor materials, one particular example being aluminum indium gallium phosphide (AlInGaP).

FIG. 2 illustrates a cross-sectional view of a recently developed type of LED 40 that has an emitting layer 46 located below both a transparent top electrode 43 and a second transparent layer 44. Emitting layer 46 emits light rays 45 when an electric current is passed through the device 40. Below the emitting layer 46 is a reflecting layer 47 that also serves as a portion of the bottom electrode. Electrical contacts 41 and 42 provide a pathway for electrical current to flow through the device 40. It is a recent new concept to have both electrical contacts 41 and 42 on the backside of the LED opposite the emitting surface. Typical prior LED designs placed one electrode on top of the device, which interfered with the light output from the top surface and resulted in devices with low reflectivity. The reflecting layer 47 allows the LED to be both a light emitter and a light reflector. Lumileds Lighting LLC, for example, produces highly reflective green, blue and ultraviolet LED devices of this type. It is expected that highly reflective yellow, red and infrared LEDs with high outputs and high luminance will also eventually be developed. However, even the new green, cyan, blue and ultraviolet gallium nitride, indium gallium nitride, aluminum gallium nitride and aluminum nitride LEDs do not have sufficient luminance for many applications.

LEDs, including inorganic light-emitting diodes and organic light-emitting diodes, emit incoherent light. On the other hand, semiconductor laser light sources, such as edge-emitting laser diodes and vertical cavity surface emitting lasers, generally emit coherent light. Coherent semiconductor laser light sources typically have higher brightness than incoherent light sources, but semiconductor laser light sources are not suitable for many applications such as displays due to the formation of undesirable speckle light patterns that result from the coherent nature of the light.

Most light-emitting color projection displays utilize three primary colors to form full-color images. The three primary colors are normally red (R), green (G) and blue (B), but some projection displays may also utilize additional colors such as white (W), yellow (Y), cyan (C) and magenta (M). The red, green and blue primary colors can be mixed to form thousands or millions of colors. However, such systems do not reproduce all the colors that a human eye can visualize. The colors that can be visualized by the human eye can be graphed in X and Y color coordinates as the 1931 CIE Chromaticity Diagram. A representation of the 1931 CIE Chromaticity Diagram is shown in FIG. 3A. The X and Y color coordinates of the pure colors, such as 700 nm, 600 nm, 500 nm and 400 nm are points on the "curved line of pure colors" in FIG. 3A. The straight line connecting the 400-nm and 700-nm points is the "line of purples", which are mixtures of 400-nm and 700-nm light. The enclosed area inside the "curved line of pure colors" and "line of purples" represents all the colors that are visible to the human eye. All the colors inside the enclosed area that are not on the curved line are mixtures of pure colors.

A cathode ray tube (CRT) computer monitor utilizes red, green and blue phosphors to display multicolor images. The approximate color coordinates for the resulting R, G and B primary colors are shown in FIG. 3A and form a triangle. Notice that there is considerable area outside the RGB triangle that falls within the range of colors visible to the human eye and represents colors that cannot be reproduced by the computer monitor. The shaded area inside the triangle represents all the colors that can be formed by mixing varying amounts of the R, G, and B primary colors. This shaded are is called the color gamut for a CRT computer monitor.

The total number of mixed colors and color grayscale levels that can be produced by a CRT monitor depends on the number of intensity levels that can be produced for each R, G and B color. For example, the line between R and G represents colors that can be produced by mixing only R and G. If the monitor can produce, for example, 100 intensity levels (grayscale levels) of R and 100 intensity levels (grayscale levels) of G, then R and G can be mixed 100×100 or 10,000 ways to produce many different colors and many different grayscale levels of particular colors. When R and G are mixed, the resulting color depends on the ratio of R to G. The grayscale level of the mixed color depends on the intensity level of the mixture. As an illustrative example, mixing intensity level 100 of the color R and intensity level 100 of the color G can produce the color yellow. The ratio of intensity level R to intensity level G is 100:100 or 1:1. Mixing intensity level 50 of the color R and intensity level 50 of the color G will produce the same yellow color since the ratio of the two intensity levels is still 1:1. However, the intensity or grayscale level of the 50:50 mixture is one-half of the intensity or grayscale level of the 100:100 mixture. Adding a third primary color B increases the number of possible colors. In this example, if the total number of intensity or grayscale levels of B is 100, then R, G and B can be mixed 100×100×100 or 1,000,000 ways to achieve a wide range of colors and multiple grayscale levels of the same color. The colors that are called white are mixtures of R, G and B and are located in the central region of the RGB triangle.

One can increase the color gamut of a display system by adding additional colors located outside the RGB triangle. For example, if one adds yellow (Y) and cyan (C) colors that have color coordinates outside the RGB triangle, the shaded area corresponding to the color gamut increases as shown in FIG. 3B. Therefore a wider range of colors can be produced by a display system that uses five primary colors (R, G, B, Y and C) than by a display system that uses three primary colors (R, G and B).

It would be highly desirable to develop LED-based projection display systems that utilize light recycling in order to increase the maximum output luminance of the systems. It would also be desirable to use LEDs to extend the color gamut and grayscale range of projection display systems. Possible uses include projection displays for television and avionics applications.

SUMMARY OF THE INVENTION

One embodiment of this invention is a projection display system that comprises at least one light-recycling illumination system and at least one imaging light modulator. The light-recycling illumination system further comprises a light source for generating light, a light-recycling envelope, a light output aperture and a light-collimating means. The light source is at least one light-emitting diode having a reflecting layer, wherein the total light-emitting area of the light source is area $A_S$ and wherein the light source has a maximum intrinsic source luminance. The light-recycling envelope encloses the light source and reflects and recycles a portion of the light generated by the light source back to the reflecting layer of the at least one light-emitting diode. The light output aperture is located in a surface of the light-recycling envelope and has area $A_O$, wherein area $A_O$ is less than area $A_S$. The light source and the light-recycling envelope direct at least a fraction of the light out of the light-recycling envelope through the light output aperture as uncollimated light having a maximum exiting luminance. Under some conditions, the maximum exiting luminance is greater than the maximum intrinsic source luminance. The light-collimating means has an input surface that is adjacent to the light output aperture and that accepts the uncollimated light. The light-collimating means partially collimates the uncollimated light and directs the partially collimating light through an output surface and to the imaging light modulator. The imaging light modulator, which is located in the optical path of the partially collimated light, spatially modulates the partially collimated light to form an image.

Another embodiment of this invention is a color sequential method of forming a full-color projection display image. In this embodiment, the time period for each frame of the full-color projection display image is divided into at least three sub-frames.

During the first sub-frame, all the pixels of an imaging light modulator are addressed to set the transmission of the imaging light modulator for light of a first color. Light of a first color is emitted from a first light source that has a first reflecting layer. A portion of the light of a first color is recycled back to the first reflecting layer to increase the effective brightness of the first light source. A fraction of the light of a first color is partially collimated and directed to the imaging light modulator and the imaging light modulator spatially modulates the partially collimated light of a first color to form a first image.

During the second sub-frame, all the pixels of the imaging light modulator are addressed to set the transmission of the imaging light modulator for light of a second color. Light of a second color is emitted from a second light source that has a second reflecting layer. A portion of the light of a second color is recycled back to the second reflecting layer to increase the effective brightness of the second light source. A fraction of the light of a second color is partially collimated and directed to the imaging light modulator and the imaging light modulator spatially modulates the partially collimated light of a second color to form a second image.

During the third sub-frame, all the pixels of the imaging light modulator are addressed to set the transmission of the imaging light modulator for light of a third color. Light of a third color is emitted from a third light source that has a third reflecting layer. A portion of the light of a third color is recycled back to the third reflecting layer to increase the effective brightness of the third light source. A fraction of the light of a third color is partially collimated and directed to the imaging light modulator and the imaging light modulator spatially modulates the partially collimated light of a third color to form a third image.

BRIEF DESCRIPTION OF THE DRAWINGS

A more complete understanding of the present invention, as well as other objects and advantages thereof not enumerated herein, will become apparent upon consideration of the following detailed description and accompanying drawings, wherein:

FIGS. 4A–4E are cross-sectional views of an embodiment of this invention that has one light-emitting diode.

DETAILED DESCRIPTION OF THE PREFERRED EMBODIMENTS

Figure 1:
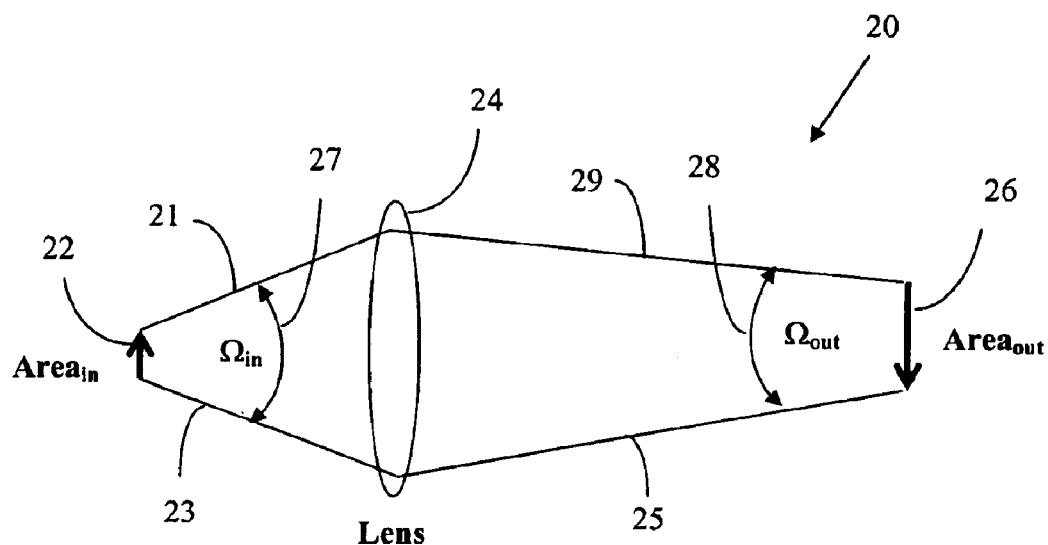
FIG. 1 is a cross-sectional side view of a conventional optical system of the prior art.
Figure 2:
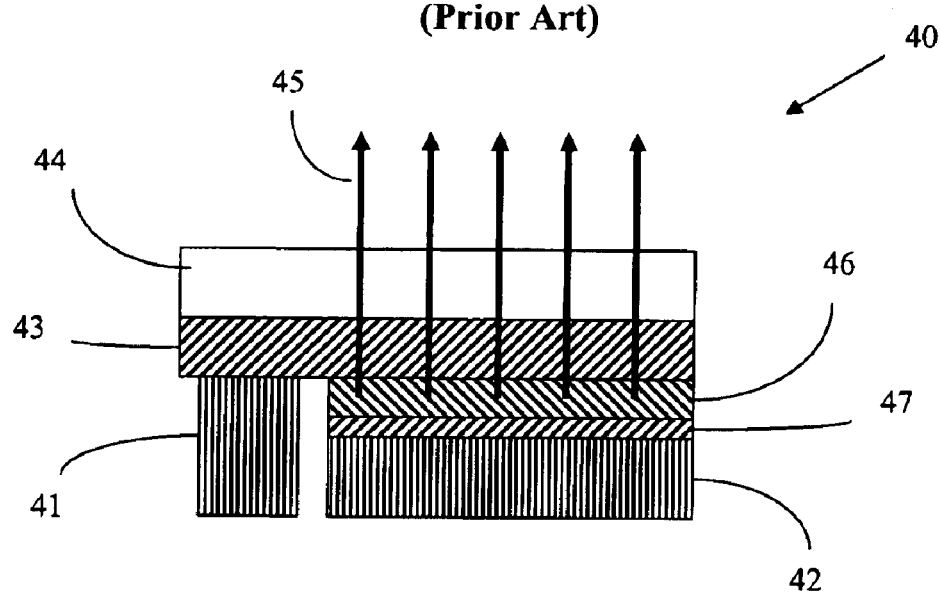
FIG. 2 is a cross-sectional view of a prior art light source that has both emitting and reflecting surfaces.

The preferred embodiments of the present invention will be better understood by those skilled in the art by reference to the above figures. The preferred embodiments of this invention illustrated in the figures are not intended to be exhaustive or to limit the invention to the precise form disclosed. The figures are chosen to describe or to best explain the principles of the invention and its applicable and practical use to thereby enable others skilled in the art to best utilize the invention.

The embodiments of this invention are comprised of at least one illumination system and at least one imaging light modulator. The illumination system is further comprised of a light source, a light-recycling envelope, a light output aperture located in the surface of the lightrecycling envelope and a light-collimating means.

The preferred light source of this invention comprises at least one light-emitting diode (LED). Preferred LEDs are inorganic light-emitting diodes and organic light-emitting diodes (OLEDs) that both emit light and reflect light. More preferred LEDs are inorganic light-emitting diodes due to their higher light output brightness.

Various illumination systems that utilize LEDs are illustrated in FIGS. 4–11, 16–19 and 21–22. An LED depicted in FIGS. 4–11, 16–19 and 21–22 may be any LED that both emits light and reflects light. Examples of LEDs that both emit and reflect light include inorganic light-emitting diodes and OLEDs. Inorganic light-emitting diodes can be fabricated from materials containing gallium nitride, aluminum gallium nitride, indium gallium nitride, aluminum nitride, aluminum indium gallium phosphide, gallium arsenide, indium gallium arsenide or indium gallium arsenide phosphide, for example, but are not limited to such materials. OLEDs may be constructed from a variety of light-emitting organic small molecules or polymers. Appropriate small molecules include, for example, tris (8-hydroxyquinoline) aluminum(III), which can be abbreviated as $Alq_3$, and certain types of chelates, oxadiazoles, imidazoles, benzidines and triarylamines, but are not limited to such materials. Appropriate polymers include, for example, poly(ethylene dioxythiophene) and poly(styrene sulfonate).

For purposes of simplifying the figures, each LED in FIGS. 4–11, 16–19 and 21–22 is illustrated in an identical manner and each LED is shown as being comprised of two elements, an emitting layer that emits light and a reflecting layer that reflects light. Note that typical LEDs are normally constructed with more than two elements, but for the purposes of simplifying the figures, the additional elements are not shown. Some of the embodiments of this invention may contain two or more LEDs. Although each LED in FIGS. 4–11, 16–19 and 21–22 is illustrated in an identical manner, it is within the scope of this invention that multiple LEDs in an embodiment may not all be identical. For example, if an embodiment of this invention has a plurality of LEDs, it is within the scope of this invention that some of the LEDs may be inorganic light-emitting diodes and some of the LEDs may be OLEDs. As a further example of an illumination system having multiple LEDs, if an embodiment of this invention has a plurality of LEDs, it is also within the scope of this invention that some of the LEDs may emit different colors of light. Example LED colors include, but are not limited to, wavelengths in the infrared, visible and ultraviolet regions of the optical spectrum. For example, one or more of the LEDs in a lightrecycling envelope may emit red light, one or more of the LEDs may emit green light and one or more of the LEDs may emit blue light. If an embodiment, for example, contains LEDs that emit red, green and blue light, then the red, green and blue colors may be emitted concurrently to produce a single composite output color such as white light. Alternatively, the red, green and blue colors may each be emitted at different times to produce different colors in different time periods. The latter mode of operation is normally called color sequential or field sequential operation.

Preferred LEDs have at least one reflecting layer that reflects light incident upon the LED. The reflecting layer of the LED may be either a specular reflector or a diffuse reflector. Typically, the reflecting layer is a specular reflector. Preferably the reflectivity $R_S$ of the reflecting layer of the LED is at least 50%. More preferably, the reflectivity $R_S$ is at least 70%. Most preferably, the reflectivity $R_S$ is at least 90%.

Each LED in FIGS. 4–11, 16–19 and 21–22 is illustrated with an emitting layer facing the interior of the light-recycling envelope and a reflecting layer positioned behind the emitting layer and adjacent to the inside surface of the light-recycling envelope. In this configuration, light can be emitted from all surfaces of the emitting layer that are not in contact with the reflecting layer. It is also within the scope of this invention that a second reflecting layer can be placed on the surface of the emitting layer facing the interior of the light-recycling envelope. In the latter example, light can be emitted from the side surfaces of the emitting layer that do not contact either reflecting layer. A second reflecting layer is especially important for some types of LEDs that have an electrical connection on the top surface of the emitting layer since the second reflecting layer can improve the overall reflectivity of the LED.

The total light-emitting area of the light source is area $A_S$. If there is more than one LED within a single light-recycling envelope, the total light-emitting area $A_S$ of the light source is the total light-emitting area of all the LEDs in the light-recycling envelope.

A light source, whether comprising one LED or a plurality of LEDs, has a maximum intrinsic source luminance that depends on the light source design and the driving electrical power applied to the light source. The maximum intrinsic source luminance is determined in the following manner. First, the luminance is measured for each LED in the light source when the light-recycling envelope is not present and when no other LED is directing light to the LED under measurement. The measurements are done with each LED powered at the same level as in the illumination system and are done as a function of emitting angle. From these luminance measurements, a maximum luminance value can be determined for all the LEDs. This maximum value is defined as the maximum intrinsic source luminance.

The light-recycling envelope of this invention is a light-reflecting element that at least partially encloses the light source. The light-recycling envelope may be any three-dimensional surface that encloses an interior volume. For example, the surface of the light-recycling envelope may be in the shape of a cube, a rectangular three-dimensional surface, a sphere, a spheroid, an ellipsoid, an arbitrary three-dimensional facetted surface or an arbitrary three-dimensional curved surface. Preferably the three-dimensional shape of the light-recycling envelope is a facetted surface with flat sides in order to facilitate the attachment of the LEDs to the inside surfaces of the envelope. In general, LEDs are usually flat and the manufacture of the light-recycling envelope will be easier if the surfaces to which the LEDs are attached are also flat. Preferable three-dimensional shapes have a cross-section that is a square, a rectangle or a polygon.

The light-recycling envelope reflects and recycles a portion of the light emitted by the light source back to the light source. Preferably the reflectivity $R_E$ of the inside surfaces of the light-recycling envelope is at least 50%. More preferably, the reflectivity $R_E$ is at least 70%. Most preferably, the reflectivity $R_E$ is at least 90%. Ideally, the reflectivity $R_E$ should be as close to 100% as possible in order to maximize the efficiency and exiting luminance of the illumination system.

The light-recycling envelope may be fabricated from a bulk material that is intrinsically reflective. A bulk material that is intrinsically reflective may be a diffuse reflector or a specular reflector. Preferably a bulk material that is intrinsically reflective is a diffuse reflector. Diffuse reflectors reflect light rays in random directions and prevent reflected light from being trapped in cyclically repeating pathways. Specular reflectors reflect light rays such that the angle of reflection is equal to the angle of incidence.

Alternatively, if the light-recycling envelope is not fabricated from an intrinsically reflective material, the interior surfaces of the light-recycling envelope must be covered with a reflective coating. The reflective coating may be a specular reflector, a diffuse reflector or a diffuse reflector that is backed with a specular reflector. Diffuse reflectors typically need to be relatively thick (a few millimeters) in order to achieve high reflectivity. The thickness of a diffuse reflector needed to achieve high reflectivity can be reduced if a specular reflector is used as a backing to the diffuse reflector.

Diffuse reflectors can be made that have very high reflectivity (for example, greater than 95% or greater than 98%). However, diffuse reflectors with high reflectivity are generally quite thick. For example, diffuse reflectors with reflectivity greater than 98% are typically several millimeters thick. Examples of diffuse reflectors include, but are not limited to, fluoropolymer materials such as Spectralon™ from Labsphere, Inc. and polytetrafluoroethylene film from manufacturers such as Fluorglas (sold under the trade name Furon™), W. L. Gore and Associates, Inc. (sold under the trade name DR™), or E. I. du Pont de Nemours & Company (sold under the trade name of Teflon™), layers of barium sulfate, porous polymer films containing tiny air channels such as polyethersulfone and polypropylene filter materials made by Pall Gelman Sciences, and polymer composites utilizing reflective filler materials such as, for example, titanium dioxide. An example of the latter polymer composite material is titanium dioxide filled ABS (acrylonitrile-butadiene-styrene terpolymer) produced by RTP. In the case that a polymer composite material is employed as a reflective material, such as titanium dioxide filled ABS, the light-recycling envelope can be formed from the polymer composite material and a separate light-reflecting layer is not needed on the interior surfaces of the light-recycling envelope.

Most specular reflective materials have reflectivity ranging from about 80% to about 98.5%. Examples of specular reflective materials include, but are not limited to, Silverlux™, a product of 3M Corporation, and other carrier films of plastic that have been coated with a thin metallic layer such as silver, aluminum or gold. The thickness of the metallic coating may range from about 0.05 micrometers to about 0.1 millimeter, depending on the materials used and the method of manufacturing the metal coating. Other examples of specular reflective films that have high reflectivity include photonic bandgap reflective materials and Vikuiti™ ESR (Enhanced Specular Reflector) made by 3M Corporation. The ESR film has a reflectivity of greater than 98% across the visible light spectrum.

The interior volume of the light-recycling envelope that is not occupied by the light source may be occupied by a vacuum, may be filled with a light transmitting gas or may be filled or partially filled with a light-transmitting solid. Any gas or solid that fills or partially fills the light-recycling envelope should transmit light emitted by the light source. Examples of light-transmitting gases are air, nitrogen and inert gases such as argon. Examples of light-transmitting solids include inorganic glasses such as silicon dioxide or sapphire and organic polymers such as polymethylmethacrylate, polystyrene, polycarbonate or a silicone-containing material.

The interior volume of the light-recycling envelope may also contain a wavelength conversion layer. Illumination systems that contain a wavelength conversion layer are described in U.S. patent application Ser. No. 10/814,043 entitled "ILLUMINATION SYSTEMS UTILIZING MULTIPLE WAVELENGTH LIGHT RECYCLING," which is herein incorporated by reference. For example, red light may be produced by an illumination system that incorporates an LED that emits red light or red light may be produced by an illumination system that incorporates an LED that emits ultraviolet light and that also incorporates a wavelength conversion layer that converts the ultraviolet light to red light.

The light-recycling envelope has a light output aperture. The light source and the light-recycling envelope direct at least a fraction of the light emitted by the light source out of the light-recycling envelope through the light output aperture as incoherent light having a maximum exiting luminance. The total light output aperture area is area $A_O$. An output aperture may have any shape including, but not limited to, a square, a rectangle, a polygon, a circle, an ellipse, an arbitrary facetted shape or an arbitrary curved shape.

Various embodiments of this invention that utilize light recycling will now be described.

Figure 4D:
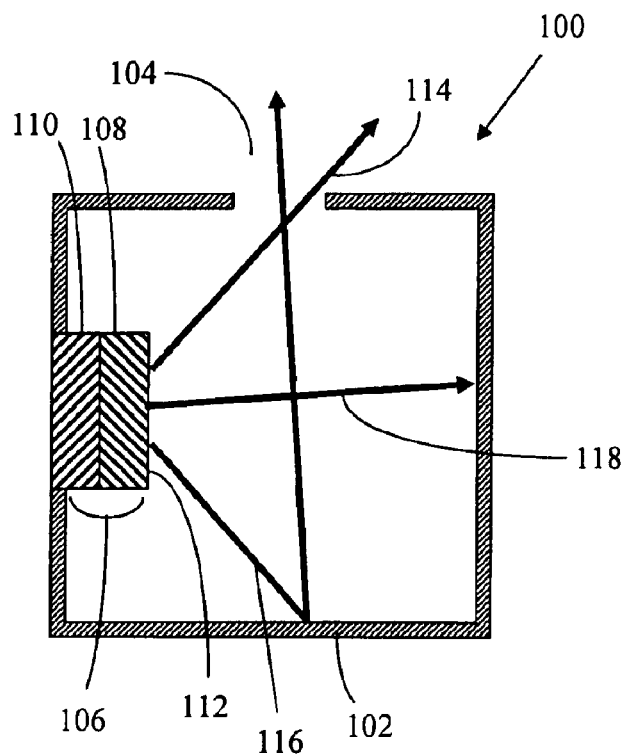
Figure 4E:
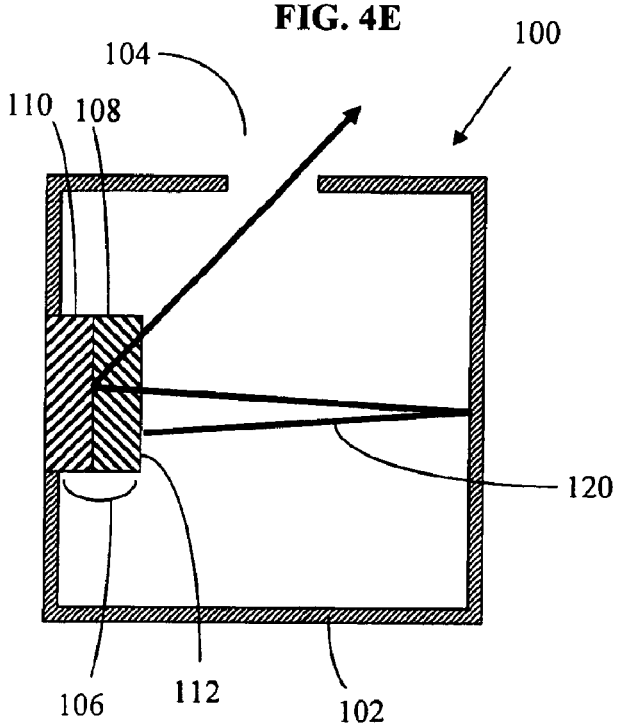

One embodiment of this invention is light-recycling illumination system 100 shown FIGS. 4A, 4B, 4C, 4D, and 4E. FIG. 4A is a top exterior view of illumination system 100 showing the outer edge of a light-recycling envelope 102 and a light output aperture 104 as solid lines in the figure. FIG. 4B is a cross-sectional view along the I-I plane indicated in FIG. 4A. FIG. 4C is a cross-sectional view along the II-II plane indicated in FIG. 4A. The II-II plane passes through the light output aperture 104 and LED 106. FIGS. 4D and 4E show the paths of some representative light rays emitted from LED 106.

The cubical three-dimensional shape of the surface of the light-recycling envelope 102, the square cross-sectional shape of the light-recycling envelope 102 and the square shape of the light output aperture 104 are illustrative examples used for ease of understanding of the descriptions. It should also be noted that the drawing is merely a representation of the structure; the actual and relative dimensions may be different.

As noted previously, the light-recycling envelope 102 may be any three-dimensional surface that encloses an interior volume. For example, the surface of the light-recycling envelope may be in the shape of a cube, a rectangular three-dimensional surface, a sphere, a spheroid, an ellipsoid, an arbitrary three-dimensional facetted surface or an arbitrary three-dimensional curved surface. Preferably the three-dimensional shape of the light-recycling envelope is a facetted surface with flat sides in order to facilitate the attachment of LEDs to the inside surfaces of the envelope. The only requirement for the three-dimensional shape of the light-recycling envelope is that a fraction of any light emitted from an LED within the lightrecycling envelope must also exit from the light output aperture of the light-recycling envelope within a finite number of reflections within the light-recycling envelope, i.e. there are no reflective dead spots within the light-recycling envelope where the light emitted from the LED will endlessly reflect without exiting the light-recycling envelope through the light output aperture.

The cross-section of the light-recycling envelope 102, such as the square cross-section shown in FIG. 4C, may have any shape, both regular and irregular, depending on the shape of the three-dimensional surface. Other examples of possible cross-sectional shapes include a rectangle, a taper, a polygon, a circle, an ellipse, an arbitrary facetted shape or an arbitrary curved shape. Preferable cross-sectional shapes are a square, a rectangle or a polygon.

In light-recycling illumination system 100, the inside surfaces of the light-recycling envelope 102, except for the area covered by the LED 106 and the area occupied by the light output aperture 104, are light reflecting surfaces. The reflecting surfaces recycle a portion of the light emitted by the light source back to the light source. In order to achieve high light reflectivity, the light-recycling envelope 102 may be fabricated from a bulk material that is intrinsically reflective or the inside surfaces of the light-recycling envelope 102 may be covered with a reflective coating. The bulk material or the reflective coating may be a specular reflector, a diffuse reflector or a diffuse reflector that is backed with a specular reflector. Examples of reflective materials were described previously. Preferably the reflectivity $R_E$ of the inside surfaces of the light-recycling envelope 102 that are not occupied by the LED 106 and the light output aperture 104 is at least 50%. More preferably, the reflectivity $R_E$ is at least 70%. Most preferably, the reflectivity $R_E$ is at least 90%. Ideally, the reflectivity $R_E$ should be as close to 100% as possible in order to maximize the efficiency and the maximum exiting luminance of the illumination system.

The square cross-sectional shape of illumination system 100 shown in FIG. 4C has a first side containing the light output aperture 104, a second side, a third side and a fourth side. The first side is opposite and parallel to the third side. The second side is opposite and parallel to the fourth side. The first side and third side are perpendicular to the second side and fourth side. The four sides of the illumination system shown in cross-section in FIG. 4C plus the two remaining sides (not shown in the cross-sectional view) of the six-sided cube form the interior of the light-recycling envelope.

The light source for light-recycling illumination system 100 is LED 106, which emits light of any optical wavelength or range of wavelengths. LED 106 is positioned interior to the fourth side of the illumination system and may be any inorganic light-emitting diode or an OLED. Preferably, LED 106 is an inorganic light-emitting diode. Preferably the wavelength of the light emitted by LED 106 is greater than about 200 nanometers and less than about 700 nanometers. If there is no wavelength conversion layer inside light-recycling envelope to convert ultraviolet light to visible light, preferably the wavelength is greater than about 400 nanometers and less than about 700 nanometers.

LED 106 has a reflecting layer 110 and an emitting layer 108. The reflecting layer is adjacent to and interior to the fourth side while the emitting layer extends into the interior of the light-recycling envelope. The reflecting layer 110 may be a specular reflector or a diffuse reflector. In a typical inorganic light-emitting diode, the reflecting layer, if present, is usually a specular reflector. The light reflectivity of reflecting layer 110 of LED 106 is $R_S$. If the reflectivity varies across the area of the reflecting layer, the reflectivity $R_S$ is defined as the average reflectivity of the reflecting layer. The reflectivity $R_S$ of reflecting layer 110 is preferably at least 50%. More preferably, the reflectivity $R_S$ of reflecting layer 110 is at least 70%. Most preferably, the reflectivity $R_S$ of reflecting layer 110 is at least 90%. Ideally, the reflectivity $R_S$ should be as close to 100% as possible in order to maximize the efficiency and the maximum exiting luminance of the illumination system.

The total light-emitting area of the light source is area $A_S$. In FIGS. 4A–4E, the light source consists of just one LED, so the total light-emitting area As of the light source is the light-emitting area of LED 106.

The light output from the light source, in this case LED 106, has a maximum intrinsic source luminance that depends on the light source design and the driving electrical power applied to the light source. The maximum intrinsic source luminance of the light source can be determined by measuring an identically constructed and identically powered LED that is not enclosed in a light-recycling envelope.

The light output aperture 104 is in the first side of the illumination system. A fraction of the light emitted from the light source and reflected by the light-recycling envelope exits the light output aperture. As noted, the aperture may have any shape including, but not limited to, a square, a rectangle, a polygon, a circle, an ellipse, an arbitrary facetted shape or an arbitrary curved shape. The total light output aperture area is area $A_O$.

Light may be emitted from emitting layer 108 of LED 106 through one or more of the surfaces of emitting layer 108 that do not contact reflecting layer 110. For example, light may be emitted through surface 112. Four illustrative examples of light rays emitted through surface 112 are shown in FIGS. 4D and 4E.

In FIG. 4D, a first light ray 114 emitted from the surface 112 of emitting layer 108 of the LED 106 on the fourth side passes through the interior of the light-recycling envelope 102 to exit through the light output aperture 104 on the first side without reflecting off the reflecting sides of the light-recycling envelope.

A second light ray 116 emitted from the surface 112 of the emitting layer 108 of the LED 106 passes through the interior of the light-recycling envelope and is reflected by the lightrecycling envelope 102 on the third side. The reflected ray 116 then passes through the interior of the light-recycling envelope to exit through the light output aperture 104 on the first side. This is merely an illustrative example since the second ray 116 can reflect a finite number of times from the reflective surfaces of any and all of the sides before exiting the light-recycling envelope through the light output aperture.

A third light ray 118 emitted from the surface 112 of the emitting layer 108 of LED 106 passes through the interior of the light-recycling envelope 102 and is absorbed by the light-recycling envelope 102 on the second side. In general, the light-recycling envelope is not a perfect reflector and has a reflectivity less than 100%. Some of the light, such as light ray 118, will be absorbed. Due to the absorption losses, only a fraction of the light that is inside the lightrecycling envelope will exit the light-recycling envelope through the light output aperture 104.

In FIG. 4E, a fourth light ray 120 emitted from the surface 112 of the emitting layer 108 of the LED 106 during a first time period passes through the interior of the light-recycling envelope 102 and is reflected by the light-recycling envelope on the second side. The reflected fourth light ray passes through the interior of the light-recycling envelope and is recycled back to the light source. The fourth light ray 120 is transmitted through surface 112 and the emitting layer 108 of the LED 106 to reflect off the reflecting layer 110 of the LED 106. The fourth light ray 120 then is transmitted through the emitting layer 108 of LED 106 and through the surface 112 during a second time period, passes through the interior of the light-recycling envelope and finally exits the light output aperture 104.

Light rays 114, 116 and 118 are not recycled back to the light source. Light ray 120 is recycled back to the light source. Only a portion of the light emitted by the light source is recycled back to the light source.

When the fourth light ray 120 reflects off reflecting layer 110 of LED 106 and is transmitted through emitting layer 108 and surface 112 to enter the light-recycling envelope during the second time period, the reflected light ray 120 adds to the light rays concurrently being emitted by emitting layer 108 of LED 106 during the second time period. The reflected light ray increases the effective source luminance of LED 106 so that the effective source luminance is then higher than the maximum intrinsic source luminance of LED 106 measured in the absence of light recycling.

The maximum exiting luminance of the light exiting the light output aperture cannot be greater than the effective luminance of the light source. However, by utilizing a lightrecycling envelope to recycle a portion of the light emitted by the light source back to the reflecting layer of the light source, the effective luminance of the light source can be increased so that the maximum exiting luminance of the light exiting the light output aperture can then be greater than the maximum intrinsic source luminance of an identical LED measured in the absence of light recycling. Note that when the maximum exiting luminance of the light exiting the light output aperture of illumination system 100 is compared to the maximum intrinsic source luminance of an identical LED in the absence of light recycling, the LED 106 of the illumination system 100 and the identical LED used in the reference measurement are of the same design and are operated at the same electrical power. Also note that measuring the exiting luminance over the full range of exiting angles and selecting the maximum luminance value determines the maximum exiting luminance.

The fourth light ray 120 will usually be unaffected transmitting through the emitting layer 108 of LED 106 whether the emitting layer 108 is emitting light or not. The fourth light ray 120 could, alternatively, reflect off the light-recycling envelope on the first or third side before reflecting off the reflecting layer 110 of the LED on the fourth side. This is merely an illustrative example since the fourth light ray 120 can reflect a finite number of times from the reflective surfaces of any and all the sides before or after reflecting off the reflecting layer 110 of the LED, once or any finite number of times, before the fourth light ray exits the light-recycling envelope through the light output aperture 104.

The maximum reflectivity of the inside surfaces of light-recycling illumination system 100 and the resulting maximum exiting luminance exiting from the light output aperture 104 is achieved by preferably having the entire interior surfaces of illumination system 100 be reflective except for the total area $A_O$ of the output aperture 104. The total inside area of the light-recycling envelope is $A_T$, which includes area $A_O$ and the total light-emitting area $A_S$ of the light source. The LED light source has a reflecting layer 110 having reflectivity $R_S$. In the example of FIGS. 4A–4E, area $A_S$ is the light-emitting area of LED 106, but for other examples having more than one LED, $A_S$ is the total light-emitting area of all the LEDs within the lightrecycling envelope. The remaining inside area of the light-recycling envelope that is not covered by the total light-emitting area $A_S$ of the LED and the area $A_O$ of the output aperture is denoted as remaining area $A_R$. Preferably the entire remaining area $A_R$ of the light-recycling envelope should have a reflective surface of reflectivity $R_E$ to maximize the luminance exiting from the light output aperture or apertures. As noted previously, the reflectivity $R_E$ is preferably at least 50%. More preferably, the reflectivity $R_E$ is at least 70%. Most preferably, the reflectivity $R_E$ is at least 90%. Ideally the reflectivity $R_E$ should be as close to 100% as possible in order to maximize the efficiency and the maximum exiting luminance of the illumination system.

Since the area $A_S$ and the area $A_R$ are not perfect reflectors and do absorb some of the light during each reflection, the maximum illumination system efficiency and the maximum exiting luminance are achieved by minimizing the number of light reflections. For a given fixed total light-emitting area $A_S$ and a given fixed total area $A_O$ of the light output aperture, the maximum exiting luminance directed from the light output aperture is achieved by minimizing the remaining area $A_R$ in order to minimize the number of reflections. Usually it is not possible for the remaining area $A^R$ to be zero, however, since it is usually not possible to arrange the one or more LEDs in the illumination system to cover the entire area of the light-recycling envelope that is not occupied by the light output aperture.

The light-recycling illumination system 100 can achieve an enhanced maximum exiting luminance that is greater than the maximum intrinsic source luminance of the light source only if the total light output aperture area $A_O$ of the light output aperture 104 is less than the total light-emitting area $A_O$ of the light source. This area requirement for exiting luminance enhancement can be understood from the following theoretical examples. First assume that the inside surfaces of a theoretical illumination system have no absorption losses, i.e. areas $A_S$ and $A_R$ all have 100% reflectivity. Also assume that the light source emits light in a Lambertian distribution. Note that a Lambertian emitter is an emitter that has a constant luminance for all emitting angles from −90 degrees to +90 degrees.

If the light output area $A_O$ is equal to the total light-emitting area $A_S$, then all the light flux emitted by the source will exit the theoretical illumination system in the same area and will, in most cases, will have the same Lambertian distribution. If the output distribution of the light exiting the light output aperture is Lambertian, then the exiting luminance will be equal to the maximum intrinsic source luminance.

If the light output area $A_O$ of the theoretical illumination system is larger than the total light-emitting area $A_S$, the light exiting the light output aperture can have the same Lambertian distribution but will have a maximum exiting luminance that is less than the maximum intrinsic source luminance due to the output light flux being spread over a larger area. The exiting luminance directed from the light output aperture will be lower by a factor of $A_S/A_O$.

If the light output area $A_O$ of the theoretical illumination system is smaller than the total light-emitting area $A_S$ and no light is lost or absorbed inside the illumination system, the light exiting the light output area can have the same Lambertian distribution but will have a maximum exiting luminance that is greater than the maximum intrinsic source luminance due to the reduced area of the light output aperture. The maximum exiting luminance directed from the light output aperture will be greater by a factor of $A_S/A_O$. To achieve a maximum exiting luminance that is greater than the maximum intrinsic source luminance, it is therefore a requirement that the output area $A_O$ be less than the total light-emitting area $A_S$.

However, the area requirement that $A_O$ must be less than $A_S$ is not the only requirement needed in order to achieve an enhancement of the maximum exiting luminance in an illumination system. In a typical illumination system, the reflectivity $R_S$ and the reflectivity $R_E$ will be less than 100%, which will lower the maximum exiting luminance enhancement. Light that does not exit the light output aperture 104 on the first attempt may be absorbed by the light source or the light-recycling envelope as it is reflected one or more times inside the light-recycling envelope. These losses will reduce the exiting luminance. Therefore, in order to achieve an enhancement of the maximum exiting luminance in a typical illumination system, $R_S$ and $R_E$ must be relatively high even if they are not 100%. The preferred values for $R_S$ and $R_E$ were listed previously.

Furthermore, in a typical illumination system, the light source may not emit light in a wide Lambertian (−90 degrees to +90 degrees) angular distribution but in a narrower angular distribution. When a light source initially emits light in a narrow angular distribution and when the emitted light then undergoes multiple reflections inside the illumination system, the light exiting the light output aperture will have a wider angular distribution than the initial angular distribution. The output distribution can approximate a Lambertian distribution. Expanding the original narrow angular distribution to a wider output distribution inside the illumination system also reduces the maximum exiting luminance of the light exiting the light output aperture. Therefore, in order to achieve an enhancement of the maximum exiting luminance in a typical illumination system, the angular distribution of the light emitted by the light source should be as close to a Lambertian distribution as possible.

The maximum theoretical luminance enhancement is given by the ratio of the areas $A_S/A_O$ as shown above. For example, if $A_S$ equals 20 mm$^2$ and $A_O$ equals 1 mm$^2$, then the maximum theoretical exiting luminance enhancement is $A_S/A_O$ or 20. The maximum value is achieved only if the LED is a Lambertian emitter and only if $R_S$ and $R_E$ each equal 100%. If the LED is not a perfect Lambertian emitter or if $R_S$ and $R_E$ are each less than 100%, as is normally the case, enhancement of the maximum exiting luminance can still be achieved but the enhancement will be less than the maximum theoretical value. In such cases, the area $A_O$ may need to be significantly less than $A_S$ in order to achieve a maximum exiting luminance that is greater than the maximum intrinsic source luminance. Preferably, the area $A_O$ of the light output aperture 104 is less than or equal to 50% of the total light-emitting area $A_S$ of the light source. More preferably, the area $A_O$ of the light output aperture 104 is less than or equal to 30% of the total light-emitting area $A_S$ of the light source. Most preferably, the area $A_O$ of the light output aperture 104 is less than or equal to 10% of the total light-emitting area $A_S$ of the light source. In addition, for some applications it is desirable that the area $A_O$ of the light output aperture 104 be small and comparable in size to the area of an arc lamp source. For those applications, preferably the area $A_O$ of the light output aperture 104 is less than 25 mm$^2$ in area. More preferably, the area $A_O$ of the light output aperture 104 is less than 10 mm$_2$.

Figure 5:
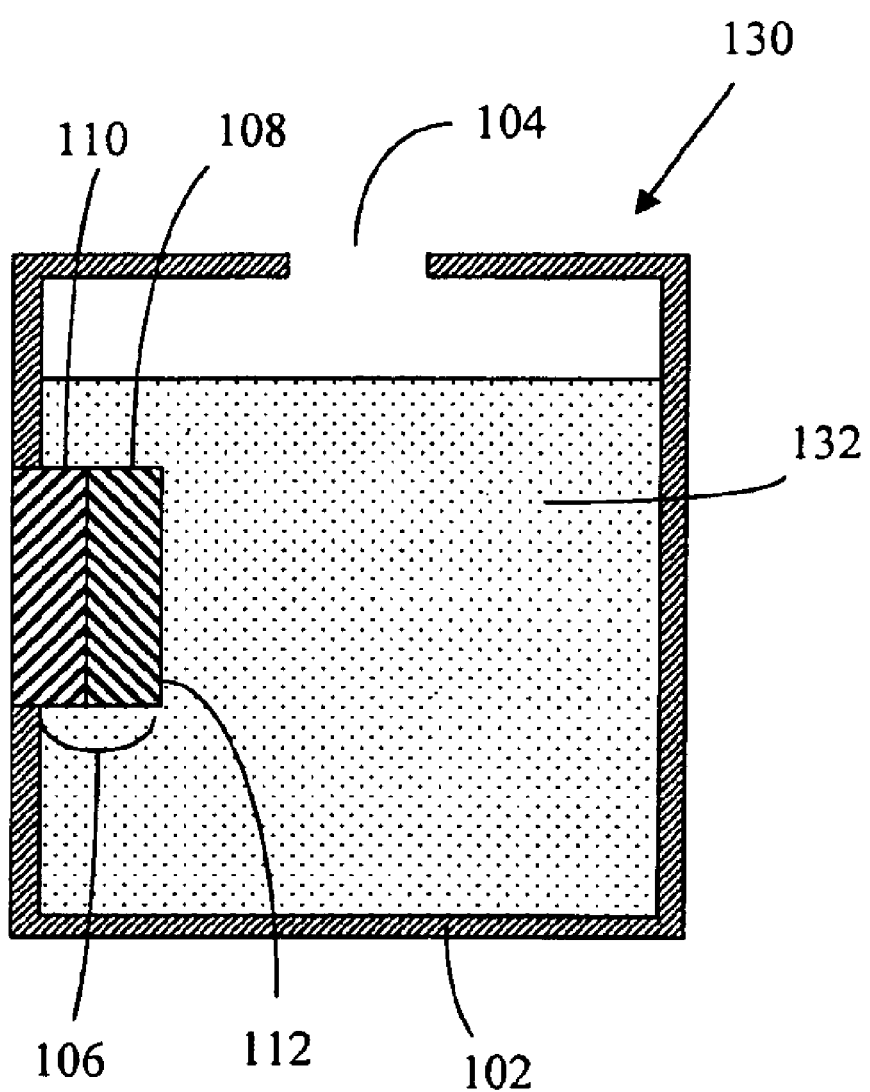
FIG. 5 is a cross-sectional view of an embodiment of this invention in which the light-recycling envelope is substantially filled with a light-transmitting solid.

Another embodiment of this invention is shown in cross-section in FIG. 5. Light-recycling illumination system 130 is identical to light-recycling illumination system 100 except that the interior volume of the light-recycling envelope 102 is substantially filled with a light-transmitting solid 132. Alternatively, light-transmitting solid 132 can partially fill or completely fill the light-recycling envelope.

Preferably the light-transmitting solid 132 is in contact with a light output surface of LED 106. For example, the light-transmitting solid 132 can be in contact with surface 112. By placing a light-transmitting solid in contact with a light output surface of an LED, the difference in refractive index between the light output surface and the environment external to the light output surface will be reduced relative to having air at the interface of the light output surface. Reducing the refractive index difference reduces the amount of light that undergoes total internal reflection inside the LED and increases the efficiency of light emission from the LED. This effect can result in an overall increase in the efficiency of the illumination system. The highest efficiency of light emission from the LED will occur if the effective refractive index of the light-transmitting solid is equal to or greater than the refractive index of the light output surface.

If necessary, the effective refractive index of the light transmitting solid 132 can be increased by incorporating ultrafine powders of high index materials into the light-transmitting solid. Preferably, the ultrafine powders are made from materials having a bulk index of refraction greater than 1.60. Ultrafine powders are powders with particle sizes less than about 300 nanometers. Exemplary ultrafine powders can be made from materials such as, for example, tin oxide, titanium oxide, zinc oxide, cerium oxide and antimony pentoxide.

As mentioned previously, a wavelength conversion layer can be formed inside the light-recycling envelope. One way this can be accomplished is by incorporating a wavelength conversion material in the light-transmitting solid 132. The wavelength conversion material converts a portion of the light of a first color emitted by the light source into light of a second color, different than the light of a first color. Wavelength conversion materials include powdered phosphor materials, quantum dot materials, luminescent dopant materials or a plurality of such materials.

Powdered phosphor materials are typically optical inorganic materials doped with ions of lanthanide (rare earth) elements or, alternatively, ions such as chromium, titanium, vanadium, cobalt or neodymium. The lanthanide elements are lanthanum, cerium, praseodymium, neodymium, promethium, samarium, europium, gadolinium, terbium, dysprosium, holmium, erbium, thulium, ytterbium and lutetium. Optical inorganic materials include, but are not limited to, sapphire ($Al_2O_3$), gallium arsenide (GaAs), beryllium aluminum oxide ($BeAl_2O_4$), magnesium fluoride ($MgF_2$), indium phosphide (InP), gallium phosphide (GaP), yttrium aluminum garnet (YAG or $Y_3Al_5O_{12}$), terbium-containing garnet, yttrium-aluminum-lanthanide oxide compounds, yttrium-aluminum-lanthanide-gallium oxide compounds, yttrium oxide ($Y_2O_3$), calcium or strontium or barium halophosphates $(Ca,Sr,Ba)_5(PO_4)_3(Cl,F)$, the compound $CeMgAl_{11}O_{19}$, lanthanum phosphate ($LaPO_4$), lanthanide pentaborate materials ((lanthanide)(Mg,Zn)$B_5O_{10}$), the compound $BaMgAl_{10}O_{17}$, the compound $SrGa_2S_4$, the compounds $(Sr,Mg,Ca,Ba)(Ga,Al,In)_2S_4$, the compound SrS, the compound ZnS and nitridosilicate. There are several exemplary phosphors that can be excited at 250 nm or thereabouts. An exemplary red emitting phosphor is $Y_2O_3:Eu^{3+}$. An exemplary yellow emitting phosphor is $YAG:Ce^{3+}$. Exemplary green emitting phosphors include $CeMgAl_{11}O_{19}:Tb^{3+}$, ((lanthanide)$PO_4:Ce^{3+},Tb^{3+}$) and $GdMgB_5O_{10}:Ce^{3+},Tb^{3+}$. Exemplary blue emitting phosphors are $BaMgAl_{10}O_{17}:Eu^{2+}$ and $(Sr,Ba,Ca)_5(PO_4)_3Cl:Eu^{2+}$. For longer wavelength LED excitation in the 400–450 nm wavelength region or thereabouts, exemplary optical inorganic materials include yttrium aluminum garnet (YAG or $Y_3Al_5O_{12}$), terbium-containing garnet, yttrium oxide ($Y_2O_3$), $YVO_4$, $SrGa_2S_4$, $(Sr,Mg,Ca,Ba)(Ga,Al,In)_2S_4$, SrS, and nitridosilicate. Exemplary phosphors for LED excitation in the 400–450 nm wavelength region include $YAG:Ce^{3+}$, $YAG:Ho^{3+}$, $YAG:Pr^{3+}$, $SrGa_2S_4:Eu^{2+}$, $SrGa_2S_4:Ce^{3+}$, $SrS:Eu^{2+}$ and nitridosilicates doped with $Eu^{2+}$.

Quantum dot materials are small particles of inorganic semiconductors having particle sizes less than about 40 nanometers. Exemplary quantum dot materials include, but are not limited to, small particles of CdS, CdSe, ZnSe, InAs, GaAs and GaN. Quantum dot materials can absorb light at one wavelength and then re-emit the light at different wavelengths that depend on the particle size, the particle surface properties, and the inorganic semiconductor material. Sandia National Laboratories has demonstrated white light generation using 2-nanometer CdS quantum dots excited with near-ultraviolet LED light. Efficiencies of approximately 60% were achieved at low quantum dot concentrations dispersed in a large volume of transparent host material. Because of their small size, quantum dot materials dispersed in transparent host materials exhibit low optical backscattering.

Luminescent dopant materials include, but are not limited to, organic laser dyes such as coumarin, fluorescein, rhodamine and perylene-based dyes. Other types of luminescent dopant materials are lanthanide dopants, which can be incorporated into polymer materials. The lanthanide elements are lanthanum, cerium, praseodymium, neodymium, promethium, samarium, europium, gadolinium, terbium, dysprosium, holmium, erbium, thulium, ytterbium and lutetium. An exemplary lanthanide element is erbium.

Figure 6:
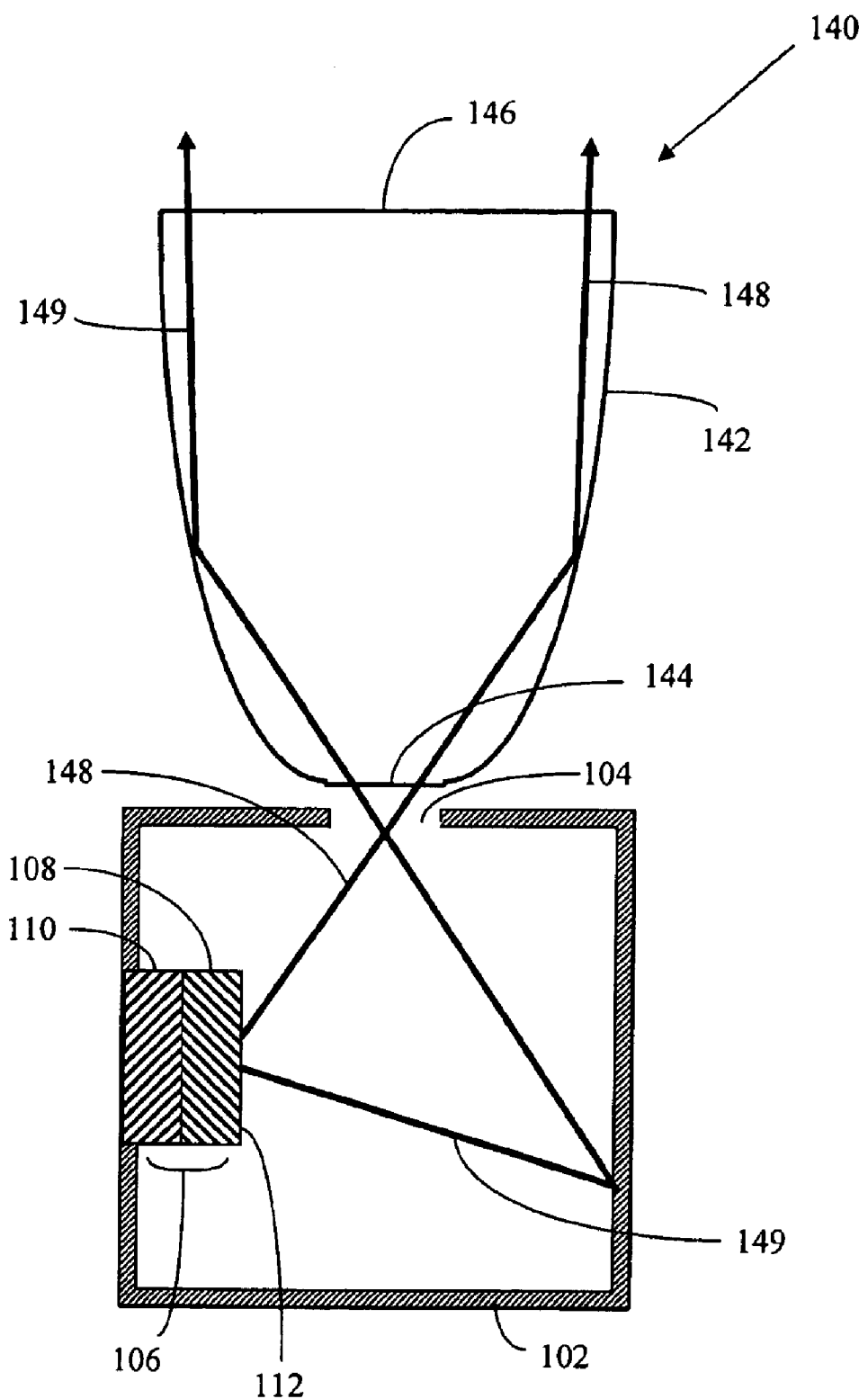
FIG. 6 is a cross-sectional view of an embodiment of this invention that has a light-collimating means.

Another embodiment of this invention is light-recycling illumination system 140 shown in cross section in FIG. 6. Light-recycling illumination system 140 is similar to light-recycling illumination system 100 except that light-recycling illumination system 140 further comprises a light-collimating means. In general, a light-collimating means can be any optical element or combination of elements that at least partially collimates the light exiting from the light output aperture 104. For example, the light-collimating means can be a compound parabolic reflector, a convex lens, a tapered light guide, or a combination of two or more such elements.

Light-recycling illumination system 140 in FIG. 6 is identical to light-recycling illumination system 100 except that light-recycling illumination system 140 further comprises a light-collimating means 142. In FIG. 6, light-collimating means 142 is a compound parabolic reflector for illustrative purposes. A compound parabolic reflector is a tapered light guide that transports light by reflecting light from the inside surfaces of the tapered light guide. The compound parabolic reflector may be constructed from a solid transparent material. If the compound parabolic reflector is constructed from such a solid transparent material, light can pass through the material and reflect from the inside surfaces of the compound parabolic reflector by total internal reflection. Alternatively, the compound parabolic reflector may be a hollow structure and the sides of the compound parabolic reflector must then be covered with a reflective coating in order to reflect light. Light-collimating means 142 has an input surface 144, which is adjacent to the light output aperture 104 and which accepts uncollimated light, and an output surface 146. The input surface 144 accepts uncollimated light from the light output aperture 104. The light-collimating means 142 partially collimates the previously uncollimated light and transmits the partially collimated light through the output surface 146. In order for the light-collimating means to partially collimate the light exiting the light output aperture 104, the area of input surface 144 must be less than the area of the output surface 146. Equation 5 gives the mathematical relationship between the input and output areas and the input and output solid angle distributions of the light.

Representative light rays 148 and 149 shown in FIG. 6 illustrate the function of the light-collimating means 142 when light-collimating means 142 is a compound parabolic reflector. Light ray 148 is emitted from surface 112 of emitting layer 108 on the first side, passes through the interior of the light-recycling envelope 102, passes through the light output aperture 104 on the first side and passes through input surface 144 of the light-collimating means 142 as uncollimated light. Light ray 148 is reflected by the sides of the light-collimating means 142 and exits the light-collimating means through output surface 146 as partially collimated light.

Light ray 149 is emitted from surface 112 of emitting layer 108 on the fourth side, passes through the interior of light-recycling envelope 102 to the inside surface of the lightrecycling envelope 102 on the second side. Light ray 149 is reflected by the light-recycling envelope 102, passes through the interior of the light-recycling envelope 102, passes through the light output aperture 104 on the first side and enters the light-collimating means through input surface 144. Light ray 149 is reflected by the sides of the light-collimating means and exits the light-collimating means through output surface 146 as partially collimated light.

The degree of light collimation required from the light-collimating means depends on the application. The light that exits through the light output aperture 104 typically has a Lambertian (output angles of −90 degrees to +90 degrees or a solid angle of $2\pi$) or near Lambertian angular distribution. The degree of collimation exiting the light-collimating means 142 can be adjusted as needed by changing the area of the output surface 146 relative to the area of the input surface 144 utilizing the mathematical relationship of Equation 5. If the input refractive index $n_{in}$ of the light-collimating means is equal to the output refractive index $n_{out}$ of the light-collimating means, then Equation 4 can be used instead and the light output solid angle distribution $\Omega_{out}$ from the light-collimating means is given by $$\Omega_{out} = \Omega_{in}(Area_{in})/(Area_{out}),  \quad [\text{Equation 6}]$$

where $\Omega_{in}$ is the light input solid angle distribution into the light-collimating means, $Area_{in}$ is the area of the input surface 144 and $Area_{out}$ is the area of the output surface 146.

For applications requiring a high degree of light collimation, the light-collimating means 142 partially collimates the light so that the light output distribution is preferably within the angular range of −35 degrees to +35 degrees. More preferably, light-collimating means 142 partially collimates the light so that the light output distribution is within the angular range of −25 degrees to +25 degrees. Most preferably, light-collimating means 142 partially collimates the light so that the light output distribution is within the angular range of −15 degrees to +15 degrees.

Figure 7A:
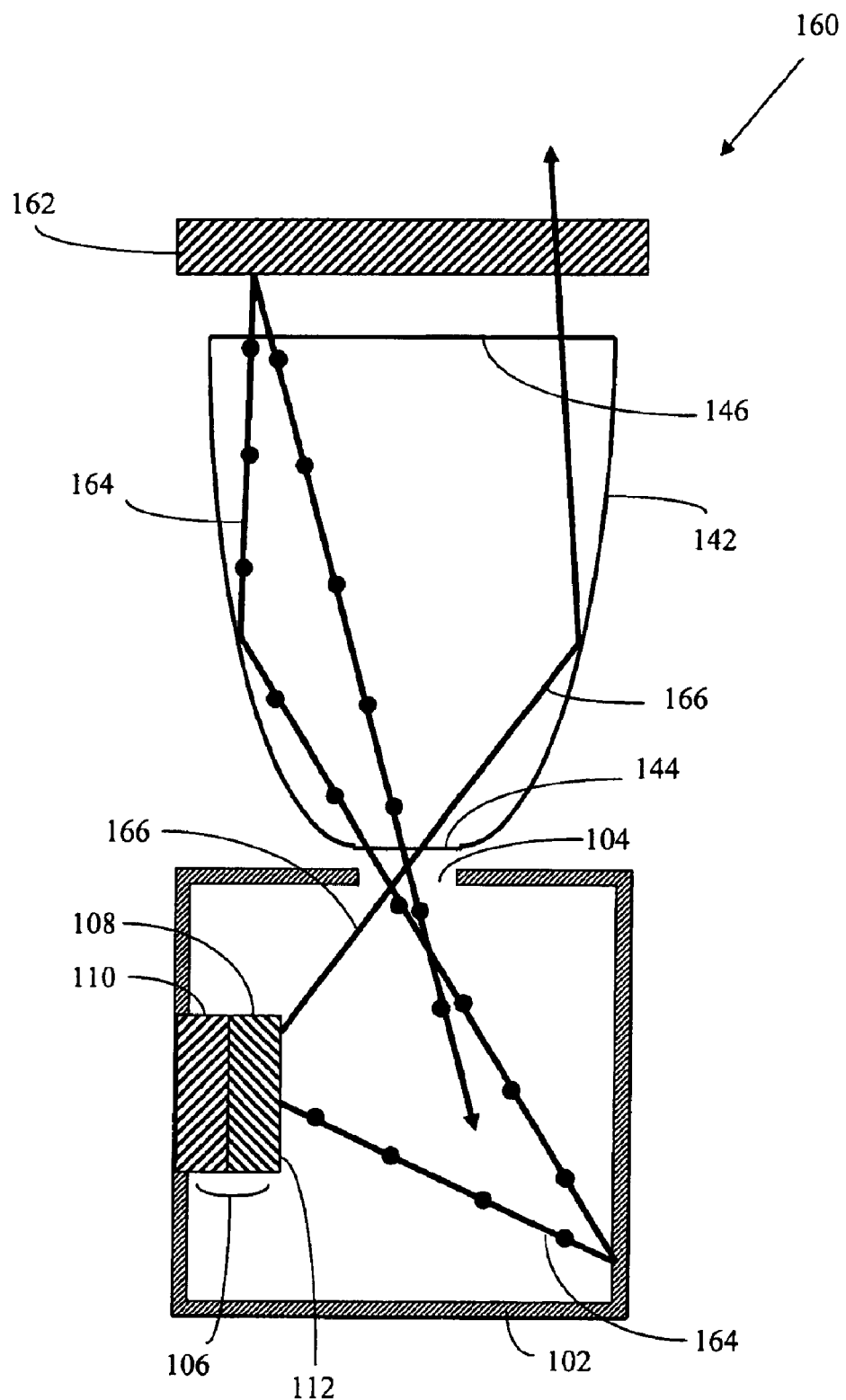
FIG. 7A is a cross-sectional view of an embodiment of this invention that has both a light-collimating means and a planar reflective polarizer.

The embodiment in FIG. 6 illustrates a light-recycling illumination system that incorporates a light-collimating means. It is also possible to have embodiments of this invention that comprise both a light-collimating means and a polarizer operating in combination. One embodiment of a light-recycling illumination system utilizing a polarizer is shown in FIG. 7A. The polarizer illustrated in FIG. 7A is a planar reflective polarizer. FIG. 71 shows another embodiment of this invention that comprises both a light-collimating means and a different type of reflective polarizer.

FIG. 7A is a cross-sectional view of light-recycling illumination system 160. Lightrecycling illumination system 160 is identical to light-recycling illumination system 140 in FIG. 6 that has a light-collimating means, except that light-recycling illumination system 160 further comprises a planar reflective polarizer 162. A planar reflective polarizer is any planar polarizer that reflects light of a first polarization state and transmits light of a second polarization state. The light may have any wavelength or color. Polarization states can be states of linear polarization or states of circular polarization. Examples of suitable planar reflective polarizers are Vikuiti™ Dual Brightness Enhancement Film (DBEF) made by 3M Corporation and polarizers made by NanoOpto Corporation and Moxtek Incorporated that utilize subwavelength optical elements or wire-grid optical elements.

The planar reflective polarizer 162 is positioned adjacent to the output surface 146 of light-collimating means 142. Planar reflective polarizer 162 reflects light of a first polarization state and transmits light of a second polarization state. Planar reflective polarizer 162 reflects and recycles light of the first polarization state back through the light-collimating means 142 and back into the light-recycling envelope 102. Light of a first polarization state that has been recycled back into the light-recycling envelope 102 can be reflected multiple times within the light-recycling envelope and thereby be partially converted into light of a second polarization state. Recycled light that has been converted into light of a second polarization state may then exit the light-recycling envelope through light output aperture 104, pass through light-collimating means 142 and finally pass through planar reflective polarizer 162. This recycled and polarization converted light adds to the light output of illumination system 160. The efficiency and the maximum exiting luminance of illumination system 160 are thereby increased.

Representative light rays 164 and 166 shown in FIG. 7A illustrate the function of the light-collimating means 142 and the planar reflective polarizer 162. Light ray 164 of a first polarization state (illustrated by a solid line with superimposed dots) is emitted from surface 112 of emitting layer 108 on the fourth side, passes through the interior of light-recycling envelope 102 to the inside surface of the light-recycling envelope 102 on the second side. Light ray 164 of a first polarization state is reflected by the light-recycling envelope 102, passes through the interior of the light-recycling envelope 102, passes through the light output aperture 104 on the first side and enters the input surface 144 of light-collimating means 142 as uncollimated light. Light ray 164 of a first polarization state is reflected by the sides of light-collimating means 142 and exits the light-collimating means through the output surface 146 as partially collimated light. The light ray 164 of a first polarization state is then reflected by planar reflective polarizer 162, passes through light-collimating means 142 a second time and reenters the light-recycling envelope 102 to eventually be partially converted into light of a second polarization state.

Light ray 166 of a second polarization state (illustrated by a solid line) is emitted from surface 112 of emitting layer 108 on the first side, passes through the interior of the lightrecycling envelope 102, passes through the light output aperture 104 on the first side and passes through input surface 144 of the light-collimating means 142 as uncollimated light. Light ray 166 of a second polarization state is reflected by the sides of the light-collimating means 142 and then exits through the output surface 146 of the light-collimating means 142 as partially collimated light. The light ray 166 then passes through planar reflective polarizer 162 and exits illumination system 160 as partially collimated light of a second polarization state.

Figure 7B:
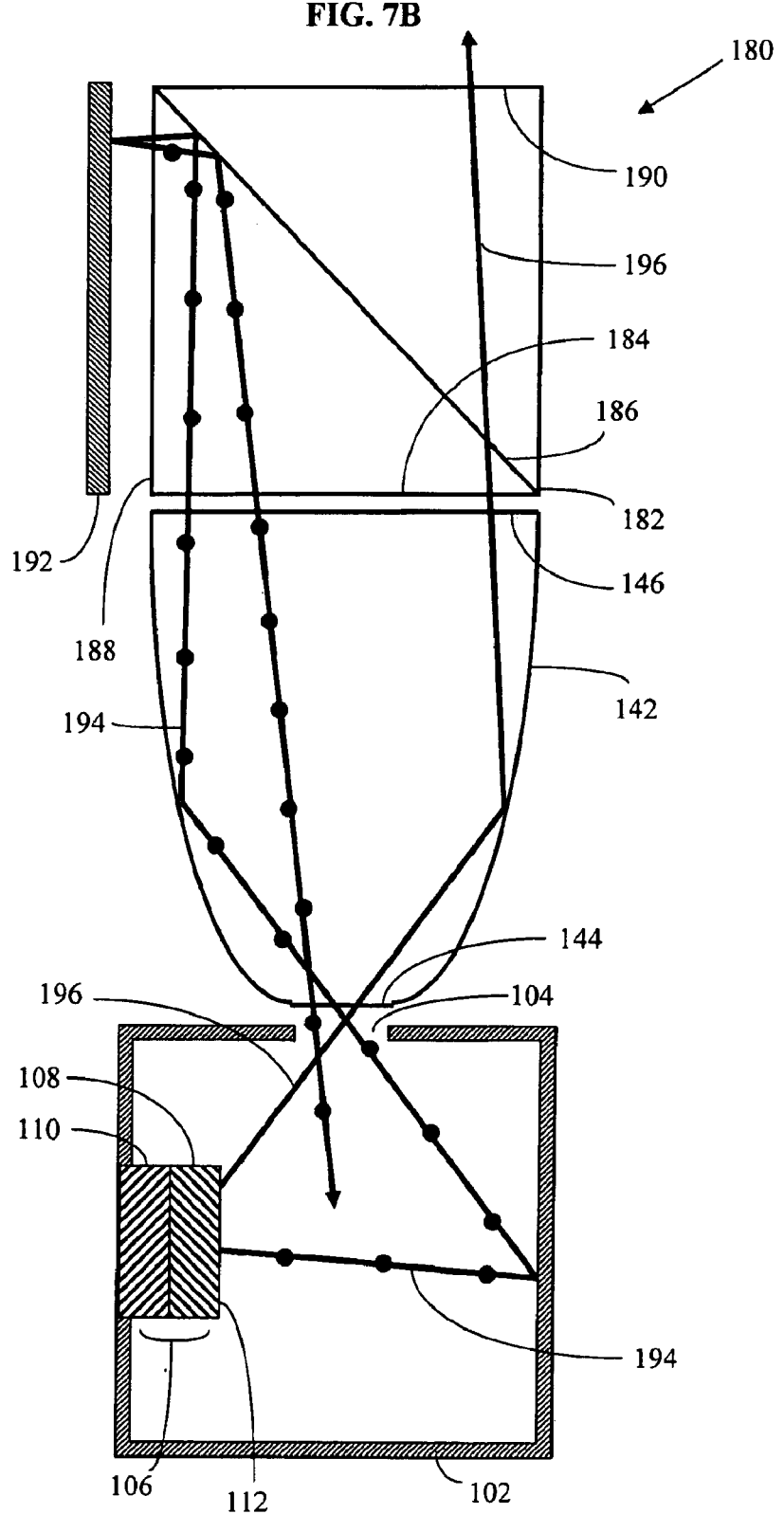
FIG. 7B is a cross-sectional view of an embodiment of this invention that has both a light-collimating means and a beam-splitting prism polarizer.

FIG. 7B is a cross-sectional view of light-recycling illumination system 180. Lightrecycling illumination system 180 is identical to light-recycling illumination system 140 that has a light-collimating means, except that light-recycling illumination system 180 further comprises a reflective polarizer. In this illustration, the reflective polarizer is a beam-splitting prism polarizer 182. The characteristics and function of a beam-splitting prism polarizer are well known to those skilled in the art. The beam-splitting prism polarizer 182 has an input surface 184, a first output surface 188 perpendicular to the input surface, a second output surface 190 parallel and opposite to the input surface and a partially reflecting diagonal surface 186. The polarizing element of the beam-splitting prism polarizer is the partially reflecting diagonal surface 186 located along a prism diagonal. The partially reflecting diagonal surface is oriented at an angle of approximately 45 degrees with respect to the output surface 146 of the light-collimating means 142. The partially reflecting diagonal surface 186 reflects light of a first polarization state to the first output surface 188 and transmits light of a second polarization state to the second output surface 190. The light may have any wavelength or color.

Note that in the previous embodiment shown in FIG. 7A, the planar reflective polarizer 162 could also have been placed at a 45-degree angle relative to the plane of the output surface 146 of the light-collimating means 142. Such an orientation of the planar reflective polarizer 162 will allow the planar reflective polarizer to function in a similar manner as the beam-splitting prism polarizer 182 illustrated in FIG. 7B.

The beam-splitting prism polarizer 182 is positioned adjacent to the output surface 146 of light-collimating means 142. The partially reflecting diagonal surface 186 of the beam-splitting prism polarizer 182 reflects light of a first polarization state to a reflector 192 and transmits light of a second polarization state. Reflector 192 reflects and recycles the light of a first polarization state back through the beam-splitting prism polarizer 182, back through the light-collimating means 142 and back into the light-recycling envelope 102. Light of a first polarization state that has been recycled back into the light-recycling envelope 102 can be reflected multiple times within the light-recycling envelope and thereby be partially converted into light of a second polarization state. Recycled light that has been converted into light of a second polarization state may then exit the light-cycling envelope through light output aperture 104, pass through light-collimating means 142 and finally pass through the second output surface 190 of beam-splitting prism polarizer 182. This recycled and polarization converted light adds to the light output of illumination system 180. The efficiency and the maximum exiting luminance of illumination system 180 are thereby increased.

Representative light rays 194 and 196 shown in FIG. 7B illustrate the function of the light-collimating means 142 and the beam-splitting prism polarizer 182. Light ray 194 of a first polarization state is emitted from surface 112 of emitting layer 108 on the fourth side, passes through the interior of light-recycling envelope 102 to the inside surface of the light-recycling envelope 102 on the second side. Light ray 194 of a first polarization state is reflected by the light-recycling envelope 102, passes through the interior of the light-recycling envelope 102, passes through the light output aperture 104 on the first side and enters the input surface 144 of light-collimating means 142 as uncollimated light. Light ray 194 of a first polarization state is reflected by the sides of light-collimating means 142 and exits the light-collimating means through the output surface 146 as partially collimated light. The light ray 194 of a first polarization state enters beam-splitting prism polarizer 182 through input surface 184, is reflected by partially reflecting diagonal surface 186, passes through first output surface 188 to reflector 192 and is reflected by reflector 192 backwards though the first output surface 188 of the beam-splitting prism polarizer. Light ray 194 is reflected by the partially reflecting diagonal surface 186 backwards through the input surface 184 and into the light-collimating means 142, passes through light-collimating means 142 a second time and reenters the light-recycling envelope 102 to eventually be partially converted into light of a second polarization state.

Light ray 196 of a second polarization state is emitted from surface 112 of emitting layer 108 on the first side, passes through the interior of the light-recycling envelope 102, passes through the light output aperture 104 on the first side and passes through input surface 144 of the light-collimating means 142 as uncollimated light. Light ray 196 of a second polarization state is reflected by the sides of the light-collimating means 142 and then exits through the output surface 146 of the light-collimating means 142 as partially collimated light. Light ray 196 passes through input surface 184 into the beam-splitting prism polarizer 182, passes through partially reflecting diagonal surface 186, exits the beam-splitting prism polarizer 182 through the second output surface 190 and exits and illumination system 180 as partially collimated light of a second polarization state.

The embodiments of this invention illustrated in FIGS. 4–7 are illustrated with one LED as the light source. However, embodiments of this invention may incorporate more than one LED. The number of LEDs placed inside a light-recycling envelope can vary widely depending, for example, on the available inside area of the light-recycling envelope and the desired number of emitted colors that one would like to produce inside the light-recycling envelope. In general, a light-recycling illumination system may contain any number of LEDs on the inside surface of the light-recycling envelope as long as the LEDs do not overlap each other and do not overlap the light output aperture. The LEDs may cover the entire inside surface of the light-recycling envelope with the exception of the area of the light output aperture. One or more of the LEDs may emit light of a first color, one or more of the LEDs may emit light of a second color, one or more of the LEDs may emit light of a third color and so forth.

Figure 8A:
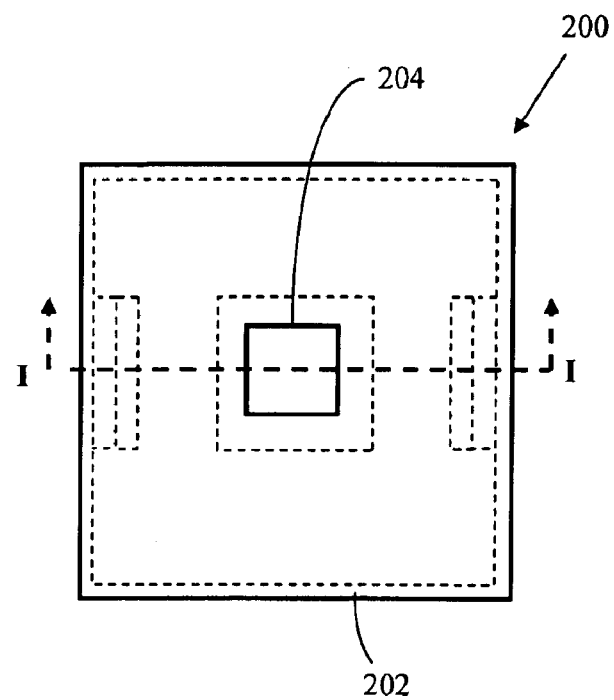
FIGS. 8A–8F are cross-sectional views of an embodiment of this invention that has three light-emitting diodes.
Figure 8B:
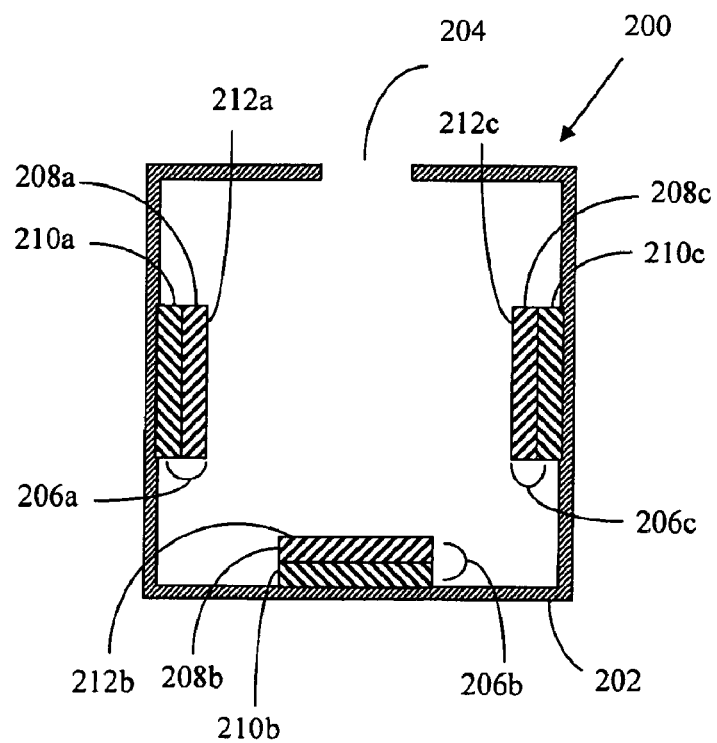

FIGS. 8A, 8B, 8C, 8D, 8E and 8F illustrate a light-recycling illumination system 200, an embodiment of this invention that has a light source consisting of three LEDs. The LEDs are denoted as LED 206a, LED 206b and LED 206b. Each of the three LEDs emits and reflects light. FIG. 8A is a top external view of illumination system 200 showing the edge of lightrecycling envelope 202 and the light output aperture 204 as solid lines in the figure. FIG. 8B is a cross-section viewed along the I-I plane indicated in FIG. 8A.

The characteristics and properties of LEDs 206a, 206b and 206c, emitting layers 208a, 208b and 208c, reflecting layers 210a, 210b and 210c, the light-recycling envelope 202 and the light output aperture 204 are identical to the characteristics and properties of the respective elements in illumination system 100. As stated previously, the light-recycling envelope may have any three-dimensional shape that encloses an interior volume. Preferably the three-dimensional shape of the light-recycling envelope is a facetted surface with flat sides in order to facilitate the attachment of LEDs to the inside surfaces of the envelope. The cubical shape of illumination system 200 is for illustration purposes only.

The square cross-sectional shape of light-recycling illumination system 200 shown in FIG. 8B has a first side containing the light output aperture 204, a second side, a third side and a fourth side. The first side is opposite and parallel to the third side. The second side is opposite and parallel to the fourth side. The first side and third side are perpendicular to the second side and fourth side. The four sides of the illumination system shown in cross-section in FIG. 8B plus the two remaining sides (not shown in FIG. 8B) of the six-sided cube form the interior of the light-recycling envelope.

In light-recycling illumination system 200, LED 206a is on the fourth side, LED 206b is on the third side and LED 206c is on the second side. In general, the three LEDs may emit light of the same color or the three LEDs may emit light of different colors. In FIGS. 8A–8F, the particular example is chosen where each LED emits a different color. In FIGS. 8A–8F, LED 206a emits light of a first color. Light rays of the first color are illustrated using solid lines as in FIG. 8C. LED 206b emits light of a second color. Light rays of the second color are illustrated using dashed lines as in FIG. 8D. LED 206c emits light of a third color. Light rays of the third color are illustrated using dotted lines as in FIG. 8E. The first color and the second color, the first color and the third color, the second color and the third color or all three colors may be emitted concurrently to produce additional colors. Alternatively, the first color, the second color and the third color may be emitted at different times to produce a color sequential output. The first color, the second color and the third color may each be any color as long as no two colors are the same. In a projection display system, usually the first color, the second color and the third color are the primary colors red, green and blue.

As in light-recycling illumination system 100, a portion of the light emitted by the light source in light-recycling illuminations system 200, in this case the three LEDs, is reflected and recycled back to the reflecting layers of the three LEDs by the light-recycling envelope. It is also possible for light emitted by one LED to reflect off the reflecting layer of the second LED or the third LED. The latter type of reflected light is another form of recycled light since it is light emitted by one element of the light source (one of the LEDs) that is recycled back to another element of the light source (the second or third LED) where it is reflected by the reflecting layer of the second or third LED. Both forms of recycled light increase the effective brightness of the light source. The reflectivity of the light-recycling envelope is $R_E$. The reflectivity of reflecting layer 210a of LED 206a, reflecting layer 210b of LED 206b and reflecting layer 210c of LED 206c is $R_S$. The preferred values for $R_E$ and $R_S$ for illumination system 200 are identical to the preferred values listed previously for light-recycling illumination system 100. Ideally, $R_E$ and $R_S$ should be as close to 100% as possible in order to maximize the efficiency and the maximum exiting luminance of the illumination system.

Example light rays in FIGS. 8C, 8D, 8E and 8F illustrate some aspects of the operation of illumination system 200.

Figure 8C:
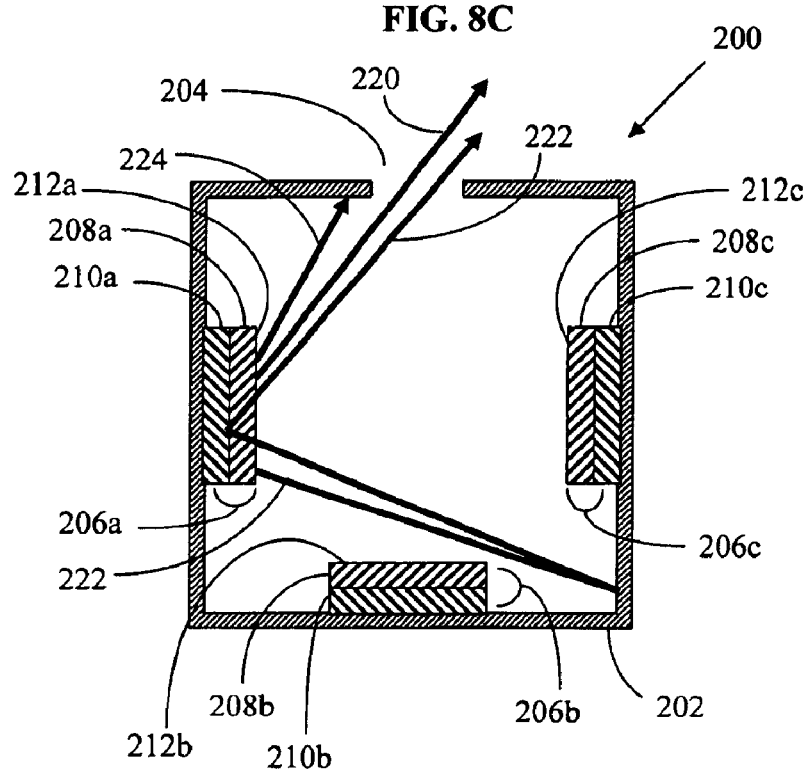

In FIG. 8C, a first light ray 220 of a first color (solid line) emitted from the surface 212a of emitting layer 208a of the LED 206a on the fourth side passes through the interior of the light-recycling envelope 202 to exit through the light output aperture 204 on the first side without reflecting off the reflecting sides of the light-recycling envelope.

A second light ray 222 of a first color emitted from the surface 212a of the emitting layer 208a of the LED 206a in a first time period passes through the interior of the light-recycling envelope and is reflected by the light-recycling envelope 202 on the second side. The second ray 222 of a first color then passes through the interior of the light-recycling envelope to the surface 212a of LED 206a. The second ray 222 of a first color passes through surface 212a and emitting layer 208a, is reflected by reflecting layer 210a and passes through emitting layer 208a and surface 212a a final time and in a second time period. The second ray 222 passes through the interior of the light recycling envelope and exits through the light output aperture 204 on the first side. This is merely an illustrative example since the second ray 222 can reflect a finite number of times from the reflective surfaces of any and all of the sides before exiting the light-recycling envelope through the light output aperture. When the second ray 222 passes through the surface 212a a final time and in a second time period, it adds to light concurrently being emitted by emitting layer 208a in the second time period and increases the effective luminance of LED 206a. Only a portion of the light of a first color, light ray 222 in this example, is recycled back to the reflecting layer 210a.

A third light ray 224 of a first color emitted from the surface 212a of the emitting layer 208a of LED 206a passes through the interior of the light-recycling envelope 202 and is absorbed by the light-recycling envelope 202 on the first side. In general, the light-recycling envelope is not a perfect reflector and has a reflectivity less than 100%. Some of the light, such as light ray 224, will be absorbed. Due to the absorption losses, only a fraction of the light of a first color that is inside the light-recycling envelope will exit the light-recycling envelope through the light output aperture 204.

Figure 8D:
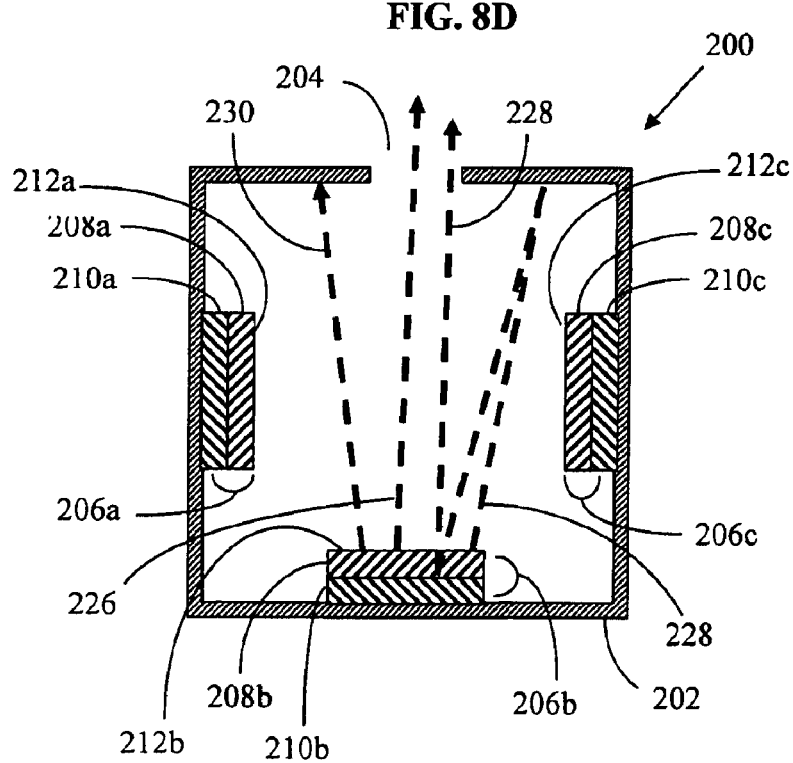

In FIG. 8D, a first light ray 226 of a second color (dashed line) emitted from the surface 212b of emitting layer 208b of the LED 206b on the third side passes through the interior of the light-recycling envelope 202 to exit through the light output aperture 204 on the first side without reflecting off the reflecting sides of the light-recycling envelope.

A second light ray 228 of a second color emitted from the surface 212b of the emitting layer 208b of the LED 206b in a first time period passes through the interior of the light-recycling envelope, is reflected by the light-recycling envelope 202 on the first side and then passes through the interior of the light-recycling envelope to the surface 212b of LED 206b. The second ray 228 passes through surface 212b and emitting layer 208b, is reflected by reflecting layer 210b and passes through emitting layer 208b and surface 212b a final time and in a second time period. The second ray 228 passes through the interior of the light recycling envelope and exits through the light output aperture 204 on the first side. When the second ray 228 passes through the surface 212b a final time and in a second time period, it adds to light concurrently being emitted by emitting layer 208b in the second time period and increases the effective luminance of LED 206b. Only a portion of the light of a second color, light ray 228 in this example, is recycled back to the reflecting layer 210b.

A third light ray 230 of a second color emitted from the surface 212b of the emitting layer 208b of LED 206b passes through the interior of the light-recycling envelope 202 and is absorbed by the light-recycling envelope 202 on the first side. Due to the absorption losses, only a fraction of the light of a second color that is inside the light-recycling envelope will exit the light-recycling envelope through the light output aperture 204.

Figure 8E:
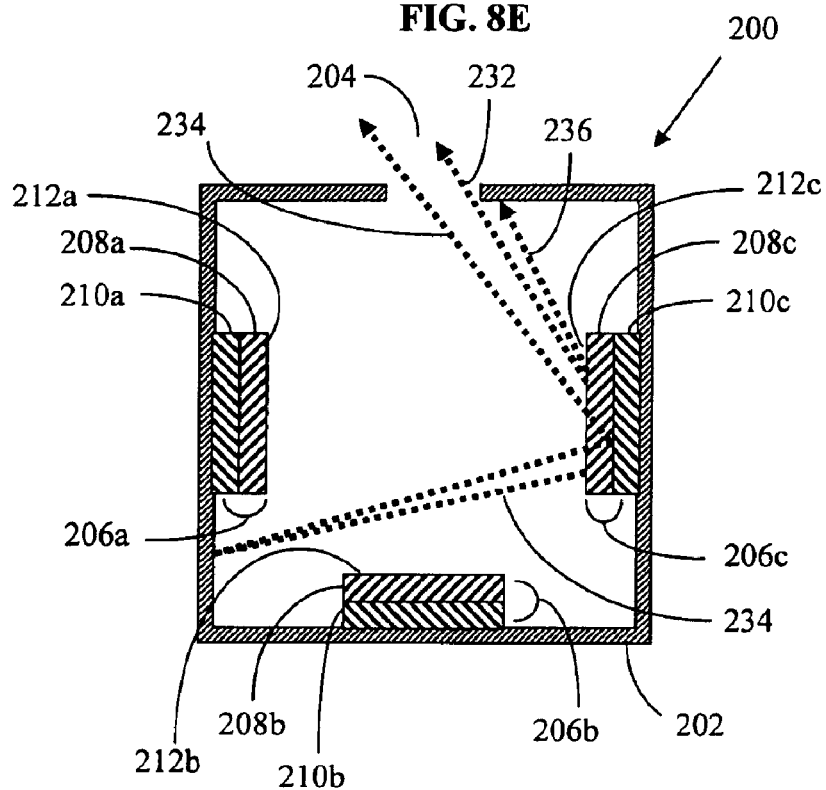

In FIG. 8E, a first light ray 232 of a third color (dotted line) emitted from the surface 212c of emitting layer 208c of the LED 206c on the third side passes through the interior of the light-recycling envelope 202 to exit through the light output aperture 204 on the first side without reflecting off the reflecting sides of the light-recycling envelope.

A second light ray 234 of a third color emitted from the surface 212c of the emitting layer 208c of the LED 206c in a first time period passes through the interior of the light-recycling envelope and is reflected by the light-recycling envelope 202 on the fourth side. The second ray 234 of a third color then passes through the interior of the light-recycling envelope to the surface 212c of LED 206c. The second ray 234 passes through surface 212c and emitting layer 208c, is reflected by reflecting layer 210c and passes through emitting layer 208c and surface 212c a final time and in a second time period. The second ray 234 passes through the interior of the light recycling envelope and exits through the light output aperture 204 on the first side. When the second ray 234 passes through the surface 212c a final time and in a second time period, it adds to light concurrently being emitted by emitting layer 208c in the second time period and increases the effective luminance of LED 206c. Only a portion of the light of a third color, light ray 234 in this example, is recycled back to the reflecting layer 210c.

A third light ray 236 of a third color emitted from the surface 212c of the emitting layer 208c of LED 206c passes through the interior of the light-recycling envelope 202 and is absorbed by the light-recycling envelope 202 on the first side. Due to the absorption losses, only a fraction of the light of a third color that is inside the light-recycling envelope will exit the lightrecycling envelope through the light output aperture 204.

Figure 8F:
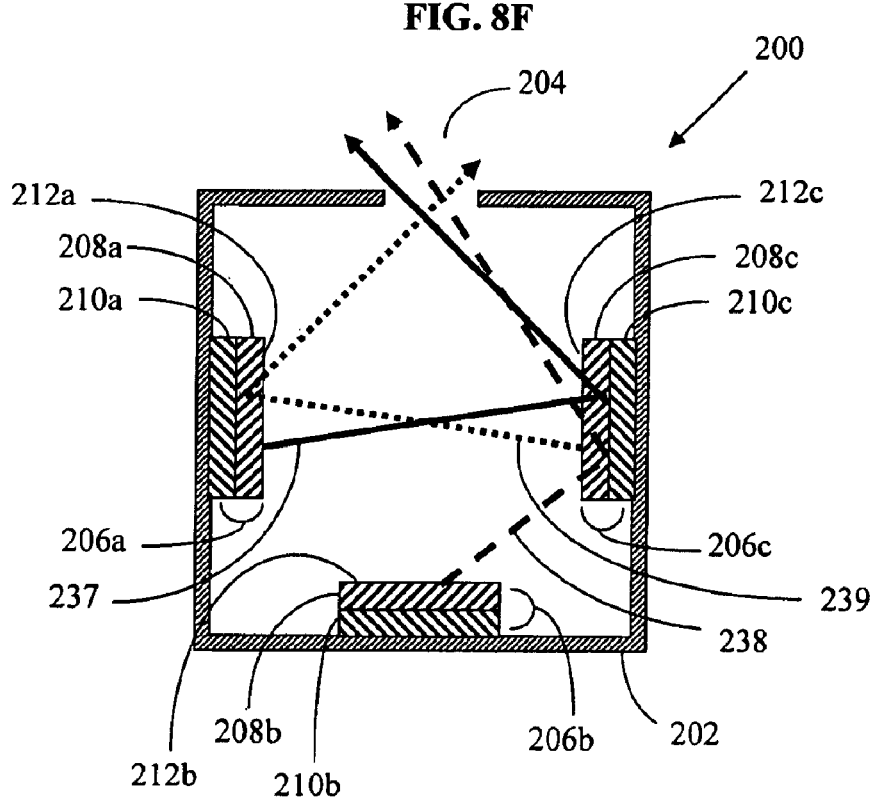

When the light source comprises two or more LEDs inside the light-recycling envelope, the effective brightness of the light source may also be increased when light of one LED is directed to and reflected by another LED, i.e. when light emitted by one part of the light source is recycled back to another part of the light source. FIG. 8F illustrates examples of rays emitted by one LED of the light source that reflect off the second or third LED of the light source.

In FIG. 8F, light ray 237 of a first color (solid line) is emitted from surface 212a of emitting layer 208a of LED 206a in a first time period. Light ray 237 of a first color passes through the interior of the light-recycling envelope to surface 212c of LED 206c. Light ray 237 passes through surface 212c and emitting layer 208c, is reflected by reflecting layer 210c and passes through emitting layer 208c and surface 212c a final time and in a second time period. Light ray 237 then passes through the interior of the light-recycling envelope 202 and exits the light-recycling envelope through the light-output aperture 204. When light ray 237 of a first color passes through surface 212c a final time and in a second time period, it adds to the light of a third color concurrently being emitted by LED 206c in the second time period and increases the effective luminance of LED 206c.

Light ray 238 of a second color (dashed line) is emitted from surface 212b of emitting layer 208b of LED 206b in a first time period. Light ray 238 of a second color passes through the interior of the light-recycling envelope to surface 212c of LED 206c. Light ray 238 passes through surface 212c and emitting layer 208c, is reflected by reflecting layer 210c and passes through emitting layer 208c and surface 212c a final time and in a second time period. Light ray 238 then passes through the interior of the light-recycling envelope 202 and exits the light-recycling envelope through the light-output aperture 204. When light ray 238 of a second color passes through surface 212c a final time and in a second time period, it adds to the light of a third color concurrently being emitted by LED 206c in the second time period and increases the effective luminance of LED 206c.

Light ray 239 of a third color (dotted line) is emitted from surface 212c of emitting layer 208c of LED 206c in a first time period. Light ray 239 of a third color passes through the interior of the light-recycling envelope to surface 212a of LED 206a. Light ray 239 passes through surface 212a and emitting layer 208a, is reflected by reflecting layer 210a and passes through emitting layer 208a and surface 212a a final time and in a second time period. Light ray 239 then passes through the interior of the light-recycling envelope 202 and exits the lightrecycling envelope through the light-output aperture 204. When light ray 239 of a third color passes through surface 212a a final time and in a second time period, it adds to the light of a first color concurrently being emitted by LED 206a in the second time period and increases the effective luminance of LED 206a.

The total light-emitting area of the light source in light-recycling illumination system 200 is area $A_S$. In this embodiment, the light source consists of three LEDs, so the total light-emitting area $A_S$ of the light source is the combined light-emitting area of the three LEDs. The light source emits light with a maximum intrinsic source luminance. As stated previously, the maximum intrinsic source luminance is determined by measuring the luminance for each LED in the light source when the light-recycling envelope is not present and when no other LED is directing light to the LED under measurement. The measurements are done with each LED powered at the same level as in illumination system 200 and are done as a function of emitting angle. Then from these luminance measurements, a maximum luminance value can be determined. This maximum value is defined as the maximum intrinsic source luminance.

The total light output aperture area is area $A_O$. Light-recycling illumination system 200 has only one light output aperture 204, which therefore has area $A_O$. If $A_O$ is less than $A_S$ and $R_E$ and $R_S$ are each greater than 50% in light-recycling illumination system 200, then it is possible for the maximum exiting luminance of light-recycling illumination system 200 to be greater than the maximum intrinsic source luminance of the light source.

Figure 10:
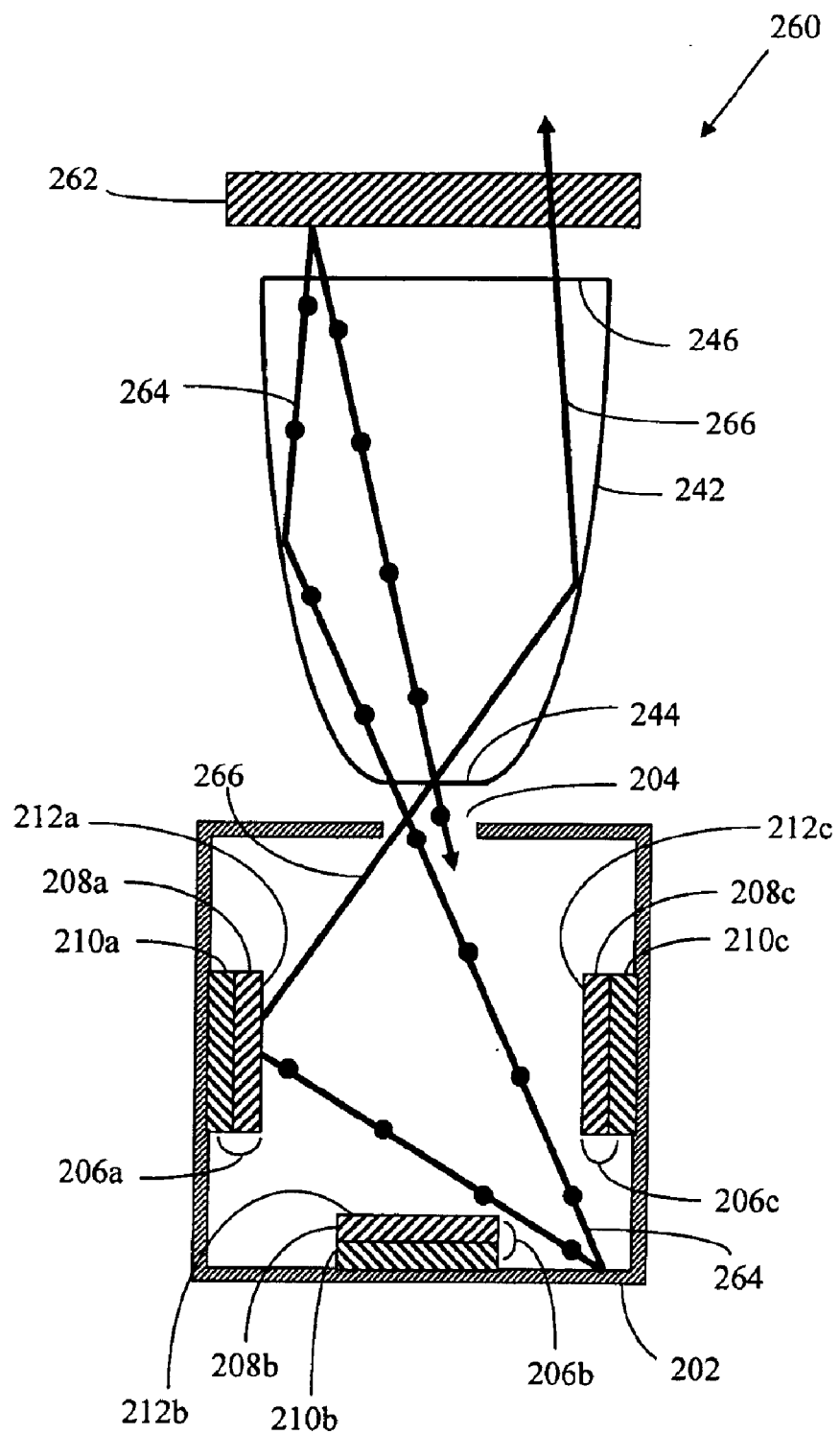
FIG. 10 is a cross-sectional view of an embodiment of this invention that has both a light-collimating means and a planar reflective polarizer.
Figure 11:
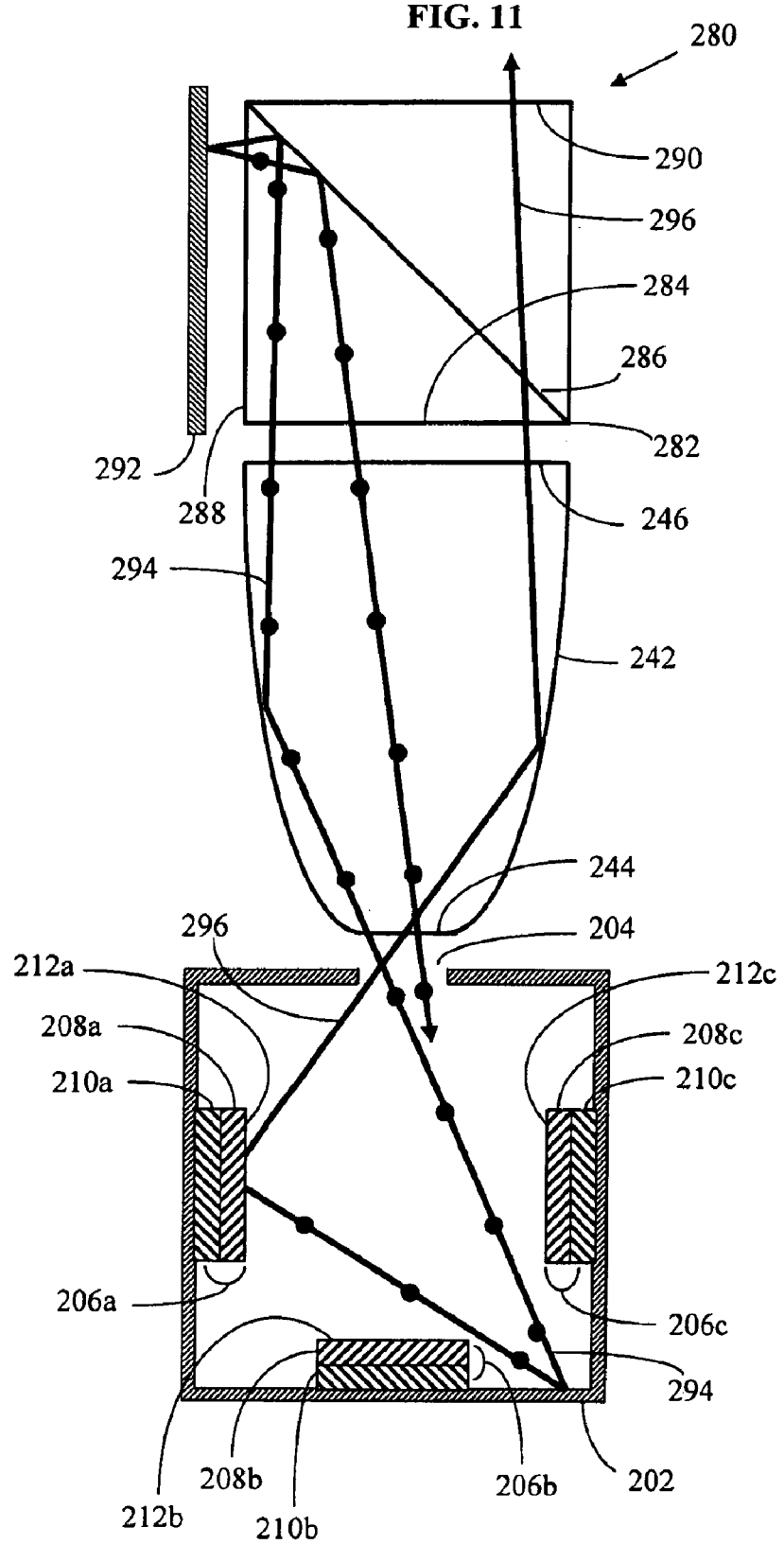
FIG. 11 is a cross-sectional view of an embodiment of this invention that has both a light-collimating means and a beam-splitting prism polarizer.

Light-recycling illumination system 200 can be combined with a light-collimating means or with a light-collimating means plus a reflective polarizer to form other light-recycling illumination systems that are suitable for projection display applications. Examples are shown in FIGS. 9, 10 and 11.

Figure 9:
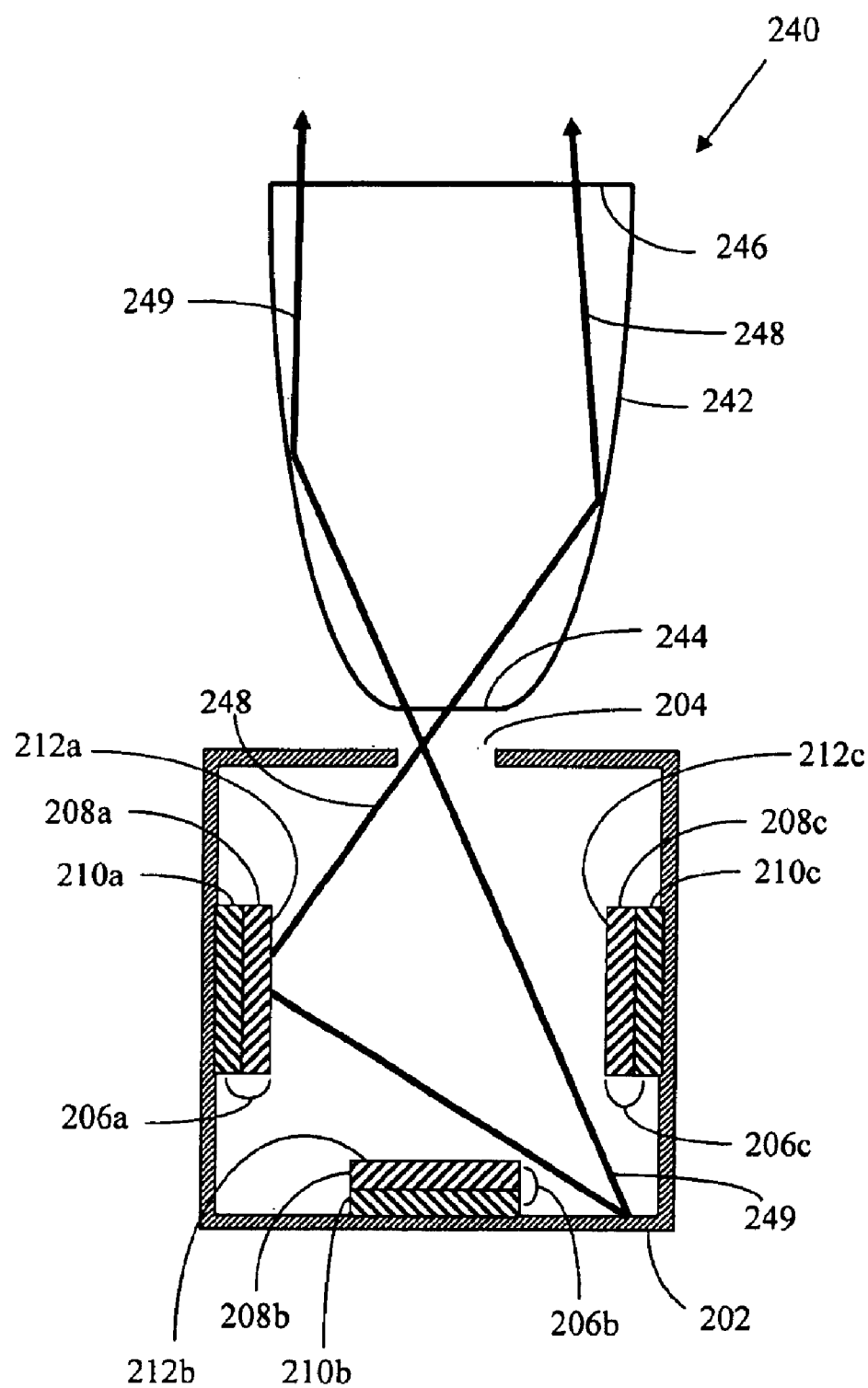
FIG. 9 is a cross-sectional view of an embodiment of this invention that has a light-collimating means.

In an embodiment of this invention illustrated in FIG. 9, light-recycling illumination system 240 is similar to light-recycling illumination system 200 except that light-recycling illumination system 240 further comprises a light-collimating means. The characteristics of a light-collimating means were described previously for FIG. 6. In FIG. 9, the light-collimating means 242 is a compound parabolic reflector for illustrative purposes. Light-collimating means 242 has an input surface 244, which is adjacent to the light output aperture 204 and which accepts uncollimated light, and an output surface 246. The input surface 244 accepts uncollimated light from the light output aperture 204. The light-collimating means 242 partially collimates the previously uncollimated light and transmits the partially collimated light through the output surface 246. In order for the light-collimating means to partially collimate the light exiting the light output aperture 204, the area of input surface 244 must be less than the area of the output surface 246 as described previously.

Representative light rays 248 and 249 shown in FIG. 9 illustrate the function of the light-collimating means 242 when light-collimating means 242 is a compound parabolic reflector. Light ray 248 of a first color is emitted from surface 212a of emitting layer 208a of LED 206a on the fourth side, passes through the interior of the light-recycling envelope 202, passes through the light output aperture 204 on the first side and passes through input surface 244 of the light-collimating means as uncollimated light. Light ray 248 of a first color is reflected by the sides of the light-collimating means and exits the light-collimating means through output surface 246 as partially collimated light.

Light ray 249 of a first color is emitted from surface 212a of emitting layer 208a of LED 206a on the fourth side, passes through the interior of light-recycling envelope 202 to the inside surface of the light-recycling envelope 202 on the third side. Light ray 249 is reflected by the light-recycling envelope 202, passes through the interior of the light-recycling envelope 202, passes through the light output aperture 204 on the first side and enters the light-collimating means through input surface 244. Light ray 249 of a first color is reflected by the sides of the light-collimating means and exits the light-collimating means through output surface 246 as partially collimated light. Note that light of a second color emitted by LED 206b and light of a third color emitted by LED 206c exiting the light output aperture 204 will also be partially collimated by the light-collimating means in the same manner.

For applications requiring a high degree of light collimation, the light-collimating means 242 partially collimates the light so that the light output distribution is preferably within the angular range of −35 degrees to +35 degrees. More preferably, light-collimating means 242 partially collimates the light so that the light output distribution is within the angular range of −25 degrees to +25 degrees. Most preferably, light-collimating means 242 partially collimates the light so that the light output distribution is within the angular range of −15 degrees to +15 degrees.

It is also possible to have embodiments of this invention that comprise both a light-collimating means and a reflective polarizer operating in combination. One embodiment using a planar reflective polarizer is shown in FIG. 10. FIG. 11 shows another embodiment of this invention that comprises both a light-collimating means and a different type of reflective polarizer.

FIG. 10 is a cross-sectional view of light-recycling illumination system 260. Lightrecycling illumination system 260 is identical to light-recycling illumination system 240 in FIG. 9 that has a light-collimating means, except that light-recycling illumination system 260 further comprises a planar reflective polarizer 262. The properties of a planar reflective polarizer and suitable examples were listed previously. The planar reflective polarizer 262 is positioned adjacent to the output surface 246 of light-collimating means 242. Planar reflective polarizer 262 reflects light of a first polarization state and transmits light of a second polarization state. Planar reflective polarizer 262 reflects and recycles light of the first polarization state back through the light-collimating means 242 and back into the light-recycling envelope 202. Light of a first polarization state that has been recycled back into the light-recycling envelope 202 can be reflected multiple times within the light-recycling envelope and thereby be partially converted into light of a second polarization state. Recycled light that has been converted into light of a second polarization state may then exit the light-recycling envelope through light output aperture 204, pass through light-collimating means 242 and finally pass through planar reflective polarizer 262. This recycled and polarization converted light adds to the light output of illumination system 260. The efficiency and maximum exiting luminance of light-recycling illumination system 260 are thereby increased.

Representative light rays 264 and 266 shown in FIG. 10 illustrate the function of the light-collimating means 242 and the planar reflective polarizer 262. Light ray 264 of a first color and a first polarization state (illustrated by a solid line with superimposed dots) is emitted from surface 212a of emitting layer 208a of LED 206a on the fourth side, passes through the interior of light-recycling envelope 202 to the inside surface of the light-recycling envelope 202 on the third side. Light ray 264 of a first color and a first polarization state is reflected by the lightrecycling envelope 202, passes through the interior of the light-recycling envelope 202, passes through the light output aperture 204 on the first side and enters the input surface 244 of light-collimating means 242 as uncollimated light. Light ray 264 of a first color and a first polarization state is reflected by the sides of light-collimating means 242 and exits the light-collimating means through the output surface 246 as partially collimated light. The light ray 264 of a first color and a first polarization state is then reflected by planar reflective polarizer 262, passes through light-collimating means 242 a second time and reenters the light-recycling envelope 202 to eventually be partially converted to light of a second polarization state.

Light ray 266 of a first color and a second polarization state (illustrated by a solid line) is emitted from surface 212a of emitting layer 208a of LED 206a on the fourth side, passes through the interior of light-recycling envelope 202, passes through the light output aperture 204 on the first side and passes through input surface 244 of the light-collimating means 242 as uncollimated light. Light ray 266 of a second polarization state is reflected by the sides of the light-collimating means 242 and then exits through the output surface 246 of the light-collimating means 242 as partially collimated light. The light ray 266 of a first color and a second polarization state then passes through planar reflective polarizer 262 and exits illumination system 260 as partially collimated light of a second polarization state. The planar reflective polarizer 262 and the light-collimating means 242 will act upon light of a second color emitted by LED 206b and light of a third color emitted by LED 206c (neither color are illustrated) in a similar manner.

FIG. 11 is a cross-sectional view of light-recycling illumination system 280. Lightrecycling illumination system 280 is identical to light-recycling illumination system 240 that has a light-collimating means, except that light-recycling illumination system 280 further comprises a reflective polarizer. In this illustration, the reflective polarizer is a beam-splitting prism polarizer 282. The beam-splitting prism polarizer 282 has an input surface 284, a first output surface 288 perpendicular to the input surface, a second output surface 290 parallel and opposite to the input surface and a partially reflecting diagonal surface 286. The partially reflecting diagonal surface 286 located along a prism diagonal reflects light of a first polarization state to the first output surface 288 and transmits light of a second polarization state to the second output surface 290. The light may have any wavelength or color.

The input surface 284 of beam-splitting prism polarizer 282 is positioned adjacent to the output surface 246 of light-collimating means 242. The partially reflecting diagonal surface 286 of the beam-splitting prism polarizer 282 reflects light of a first polarization state to a reflector 292 and transmits light of a second polarization state. Reflector 292 reflects and recycles the light of a first polarization state back through the beam-splitting prism polarizer 282, back through the light-collimating means 242 and back into the light-recycling envelope 202. Light of a first polarization state that has been recycled back into the light-recycling envelope 202 can be reflected multiple times within the light-recycling envelope and thereby be partially converted into light of a second polarization state. Recycled light that has been converted into light of a second polarization state may then exit the light-cycling envelope through light output aperture 204, pass through light-collimating means 242 and finally pass through the second output surface 290 of beam-splitting prism polarizer 282. This recycled and polarization converted light adds to the light output of illumination system 280. The efficiency and maximum exiting luminance of illumination system 280 are thereby increased.

Representative light rays 294 and 296 shown in FIG. 11 illustrate the function of the light-collimating means 242 and the beam-splitting prism polarizer 282. Light ray 294 of a first color and a first polarization state (illustrated as a solid line with superimposed dots) is emitted from surface 212a of emitting layer 208a of LED 206a on the fourth side, passes through the interior of light-recycling envelope 202 to the inside surface of the light-recycling envelope 202 on the third side. Light ray 294 of a first color and a first polarization state is reflected by the light-recycling envelope 202, passes through the interior of the light-recycling envelope 202, passes through the light output aperture 204 on the first side and enters the input surface 244 of light-collimating means 242 as uncollimated light. Light ray 294 of a first polarization state is reflected by the sides of light-collimating means 242 and exits the light-collimating means through the output surface 246 as partially collimated light. The light ray 294 of a first color and a first polarization state enters beam-splitting prism polarizer 282 through input surface 284, is reflected by partially reflecting diagonal surface 286, passes through first output surface 288 to reflector 292 and is reflected by reflector 292 backwards though the first output surface 288 of the beam-splitting prism polarizer. Light ray 294 is reflected by the partially reflecting diagonal surface 286 backwards through the input surface 284 and into the light-collimating means 242, passes through light-collimating means 242 a second time and reenters the light-recycling envelope 202 to eventually be reflected multiple times and partially converted into light of a second polarization state.

Light ray 296 of a first color and a second polarization state (illustrated by a solid line) is emitted from surface 212a of emitting layer 208a of LED 206a on the fourth side, passes through the interior of the light-recycling envelope 202, passes through the light output aperture 204 on the first side and passes through input surface 244 of the light-collimating means 242 as uncollimated light. Light ray 296 of a first color and a second polarization state is reflected by the sides of the light-collimating means 242 and then exits through the output surface 246 of the light-collimating means 242 as partially collimated light. Light ray 296 passes through input surface 284 into the beam-splitting prism polarizer 282, passes through partially reflecting diagonal surface 286, exits the beam-splitting prism polarizer 282 through the second output surface 290 and exits illumination system 280 as partially collimated light of a first color and a second polarization state. The light-collimating means 242 and the planar reflective polarizer will act on the light of a second color and light of a third color (neither color are illustrated) in a similar manner.

Projection display systems can be designed that utilize both the light-recycling illumination systems described above and imaging light modulators to form spatially varying and time varying images. Imaging light modulators include, but are not limited to, devices such as liquid crystal display (LCD) devices, liquid-crystal-on-silicon (LCOS) devices and digital light processor (DLP) devices. LCD, LCOS and DLP devices are comprised of two-dimensional arrays of pixels, or picture elements, that can be individually controlled to form an image by varying the amount of light that each pixel transmits to a magnifying projection lens and to a viewing screen. The number of different light transmission levels that can be achieved for each pixel depends on the imaging light modulator design. For example, in some imaging light modulators, the number of light transmission levels that can be achieved for each pixel is 256. LCD and LCOS devices utilize liquid crystals, polarizing optical components and electronic driver circuits to individually control the amount of light transmission for each pixel. DLP devices utilize an array of micro-mirrors and associated electronic driver circuits to individually control the amount of light directed to a viewing screen by each pixel. DLP devices are not affected by the polarization state of the light.

Most projection display systems of the prior art utilize three non-identical primary colors, a first color, a second color, and a third color, to form color images. Although not a requirement, in most displays the first color, the second color and the third color are red (R), green (G) and blue (B). It is also possible to use the colors white (W), yellow (Y), cyan (C) and magenta (M) as additional colors in projection displays.

In the embodiments of this invention that follow, the first color, the second color and the third color used for three-color projection display systems are assumed, for purposes of illustration and simplicity, to be the primary colors red, green and blue. The red, green and blue primary colors can each be generated by two methods. The color red, for example, can be generated directly by one or more red-emitting LEDs. However, a second way to generate red light in another embodiment of this invention is to coat one or more ultraviolet-emitting LEDs with a wavelength conversion layer that converts the ultraviolet light into red light. Similarly, the green and blue colors can be generated directly or can be generated by wavelength conversion using ultraviolet emitting LEDs and the appropriate wavelength conversion layers.

A full color image can be formed in a projection display system by concurrently spatially superimposing a red image, a green image and a blue image to form a full-color frame in a frame time period $t_F$. The frame frequency $f_F$ or the number of frames imaged per second is given by the equation $$f_F = 1/t_F \qquad \text{[Equation 7]}$$

In order to form continuously changing images of a moving object that do not flicker, the frame frequency $f_F$ is typically 50 Hz or higher. In other words, at least 50 new full-color frames are formed by the projection display system every second.

A projection display system that utilizes concurrent, spatially superimposed images of three primary colors will generally require three imaging light modulators, one for the red image, one for the green image and one for the blue image. An embodiment of this invention that utilizes three imaging light modulators will be described later in the specification as FIG. 22. Furthermore, to fabricate a similar projection display system that uses five primary colors requires five imaging light modulators to generate five independent images that can be concurrently superimposed.

It is also possible to form full-color images in a projection display system using just one imaging light modulator by utilizing a color sequential means to form the images. The color sequential operation of a display is sometimes also called field sequential operation.

To implement color sequential means using three colors, the following sequence of events occurs. The time period for each image frame is divided into three sub-frames. During the first sub-frame, all the pixels of the imaging light modulator are addressed to set the transmission of the imaging light modulator for light of a first color. The light of a first color is emitted from a first light source that has a first reflecting layer. A portion of the light of a first color is recycled back to the first reflecting layer to increase the effective brightness of the first light source. A fraction of the light of a first color is partially collimated by a light-collimating means and directed to the imaging light modulator. The imaging light modulator spatially modulates the partially collimated light of a first color to form a first image.

During the second sub-frame, all the pixels of the imaging light modulator are addressed to set the transmission of the imaging light modulator for light of a second color. The light of a second color is emitted from a second light source that has a second reflecting layer. A portion of the light of a second color is recycled back to the second reflecting layer to increase the effective brightness of the second light source. A fraction of the light of a second color is partially collimated by a light-collimating means and directed to the imaging light modulator. The imaging light modulator spatially modulates the partially collimated light of a second color to form a second image.

During the third sub-frame, all the pixels of the imaging light modulator are addressed to set the transmission of the imaging light modulator for light of a third color. The light of a third color is emitted from a third light source that has a third reflecting layer. A portion of the light of a third color is recycled back to the third reflecting layer to increase the effective brightness of the third light source. A fraction of the light of a third color is partially collimated by a light-collimating means and directed to the imaging light modulator. The imaging light modulator spatially modulates the partially collimated light of a third color to form a third image.

The first image, second image and third images must be generated very rapidly so that the human eye and brain visualize a composite full-color display image instead of three single-color images. An electronic or a computer control unit (not shown) manages the timing sequence for the color sequential means. The first, second and third light sources may be a first, a second and a third light-emitting diode located in the same light-recycling envelope or the first, second and third light sources may be located in separate light-recycling envelopes.

Examples of embodiments of this invention that incorporate only one imaging light modulator and that use a color sequential means to generate full-color images are illustrated in FIGS. 16, 17, 18, 19 and 21. Utilizing a single imaging light modulator can reduce the cost and optical complexity of the projection display system.

LED-based light sources have several advantages over prior art high-intensity-discharge (HID) lamps for projection display systems utilizing color sequential means to form full-color images. First, LED light sources can be turned off while the imaging light modulator is being addressed for a particular color. HID sources cannot be turned off, which can lower the contrast and image quality of the display.

Second, LED sources can emit one color at a time as required for the color sequential means. This results in a highly efficiency system with no wasted light and no mechanical moving parts. In contrast to this, HID sources emit all colors at the same time. A mechanical color wheel, for example, can be used to select one primary color at a time from the HID source for color sequential operation while discarding the other two primary colors. This is very inefficient and requires mechanical moving parts to select single colors. Color scrolling systems can also be used with HID lamps. The color scrolling systems can use all three colors at the same time but mechanical moving parts are still needed.

Third, LED-based light sources can provide pure primary colors whereas HID sources generate colors that have a wide wavelength range. Starting with pure LED-generated primary colors will increase the color gamut of the projection display.

An embodiment of this invention that utilizes a color sequential means to form full-color images will be described in FIG. 12 using three primary colors. In general, color sequential means can also be done using more than three primary colors. For example, color sequential means can also be accomplished with four, five or six primary colors.

Figure 12:
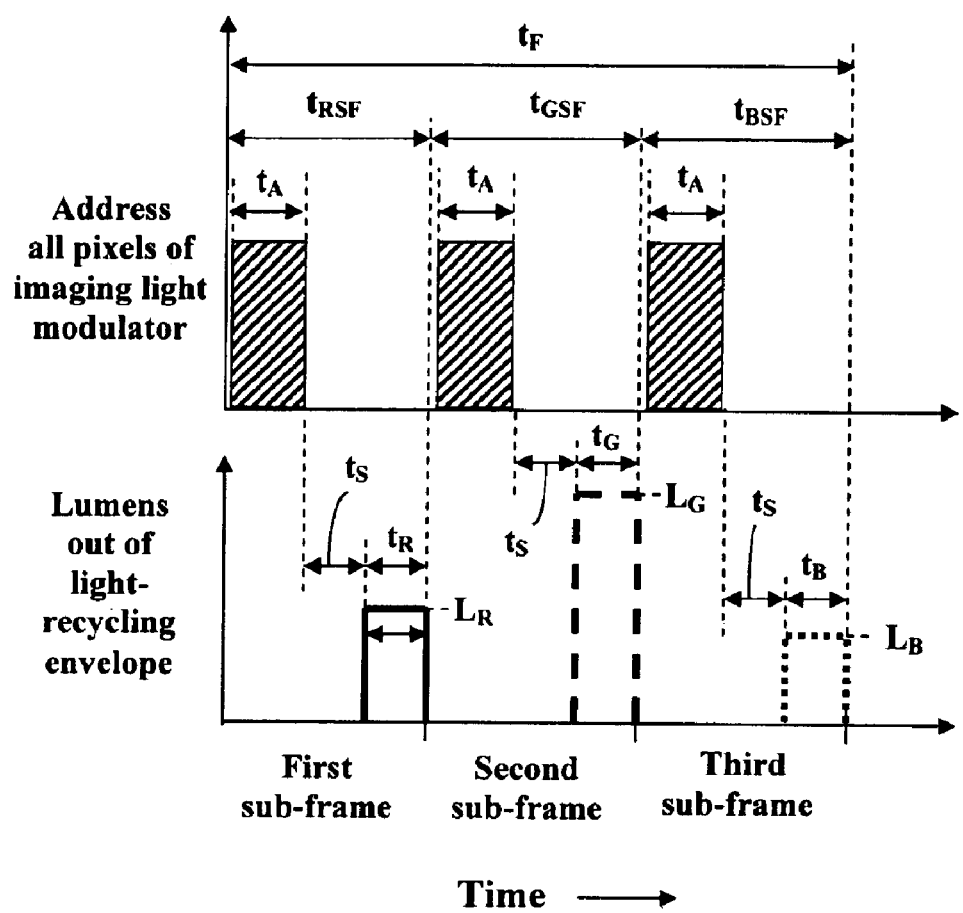
FIG. 12 is an example of a color sequential time sequence that utilizes three sub-frames per image frame.

FIG. 12 illustrates an example of the time sequence of events for color sequential operation using three primary colors. The three colors are chosen, for purposes of illustration, to be red, green and blue. This timing sequence is an illustrative example and other timing sequences can be utilized. A control unit (not shown) manages the color sequential operation and divides each frame corresponding to a full-color image and a time period $t_F$ into three sub-frames, one for each primary color. In general, the number of sub-frames per full-color frame equals the number of primary colors used. In color sequential operation, a first image is formed in a first color and in a first sub-frame, a second image is formed in a second color and in a second sub-frame and a third image is formed in a third color and in a third sub-frame. If the time intervals involved are shorter than the response time of the eye and brain, the eye and brain will integrate the three images into one full-color image (or full-color frame). For illustrative purposes, we will assume that the three primary colors are red, green and blue. Then the first image is a red image, the second image is a green image and the third image is a blue image.

At the initial stage of the color sequential operation for three colors as shown in FIG. 12, all LED sources are in the "off" state and do not emit light. At the beginning of the first sub-frame, all the pixels of the imaging light modulator are addressed in time $t_A$ in order to set the transmission of each pixel for the red image. After all pixels are addressed, the imaging light modulator sometimes requires an additional settling time $t_S$ for the pixels to settle to the correct state. Next the red LEDs are turned on and the imaging light modulator is illuminated for a time period $t_R$ in order to form a red image. During the time that the red LEDs are emitting red light, a portion of the red light is recycled back to the red LEDs by the light-recycling envelope to increase the effective brightness of the red LEDs. The light-recycling envelope (for example, the light-recycling envelope 202 in FIG. 16), has an output of $L_R$ lumens of red light during the time period $t_R$. At the end of time $t_R$, the red LEDs are turned off. The sum of the three times, $t_A$ plus $t_S$ plus $t_R$, is equal to the time for the first (red) sub-frame or $t_{RSF}$.

At the start of the second sub-frame, all the LEDs are in the "off" state and all the pixels of the imaging light modulator are addressed in time $t_A$ in order to set the transmission of each pixel for green light. After all pixels are addressed, the imaging light modulator again sometimes requires an additional settling time $t_S$ for the pixels to settle to the correct state. Next the green LEDs are turned on and the imaging light modulator is illuminated for a time period to in order to form a green image. During the time that the green LEDs are emitting green light, a portion of the green light is recycled back to the green LEDs by the light-recycling envelope to increase the effective brightness of the green LEDs. The light-recycling envelope has an output of $L_G$ lumens of green light during the time period $t_G$. At the end of time to, the green LEDs are turned off. The total of the three times, $t_A$ plus $t_S$ plus $t_G$, is equal to the time for the second (green) sub-frame $t_{GSF}$.

At the start of the third sub-frame, all the LEDs are in the "off" state and all the pixels of the imaging light modulator are addressed in time $t_A$ in order to set the transmission of each pixel for blue light. After all pixels are addressed and after an additional settling time $t_S$, the blue LEDs are turned on and the imaging light modulator is illuminated for a time period $t_B$ in order to form a blue image. During the time that the blue LEDs are emitting blue light, a portion of the blue light is recycled back to the blue LEDs by the light-recycling envelope to increase the effective brightness of the blue LEDs. The light-recycling envelope has an output of $L_B$ lumens of blue light during the time period $t_B$. At the end of the time $t_B$, the blue LEDs are turned off. The sum of the three times, $t_A$ plus $t_S$ plus $t_B$, is equal to the time for the third (blue) sub-frame $t_{BSF}$.

If $t_R$ equals $t_G$ equals $t_B$, then the three sub-frame times $t_{RSF}$, $t_{GSF}$ and $t_{BSF}$ are equal in length. It is normal to have sub-frames that are equal in length, but this is not a requirement.

If the projection display uses three primary colors, there will be three sub-frames for every full-color frame. The frequency of the sub-frame images will be three times the frequency of the full-color frames. For example, if the frequency of the full-color frames is 50 Hz, the frequency of the sub-frame images will be 150 Hz. Full-color frame frequencies greater than 50 Hz, corresponding to sub-frame frequencies greater than 150 Hz, may be required in order to form images of moving objects that do not exhibit flicker or color breakup. Color breakup is a stroboscopic effect in which the color images appear as flashes of light rather than continuous images. Color breakup can occur if an observer's eyes move rapidly from point to point on the projected image or color breakup can sometimes be seen in the peripheral vision of the observer's eyes. As an illustrative example, the full-color frame frequency may need to be 75 Hz or higher and the sub-frame frequency may need to be 225 Hz or higher in order to eliminate flicker and color breakup. The maximum sub-frame frequency that can be utilized will depend upon on the time $t_A$ with which the imaging light modulator can be addressed, the settling time $t_S$ of the imaging light modulator and the "on" times of the LEDs.

Normally the red, green and blue LEDs are illuminated in some fixed order and the order does not change. For example, in FIG. 12 the red LEDs are illuminated first, the green LEDs are illuminated second and the blue LEDs are illuminated third. This sequence is then repeated to give the sequence R, G, B, R, G, B, R, G, B and so forth.

One embodiment of this invention is an apparatus and a method for reducing the color breakup phenomenon by randomizing the order in which the red, green and blue LEDs are illuminated. For example, in the first full-color frame, the order of illumination may be R, G and B. In the second full-color frame, the order of illumination may be changed to G, R, and B. In the third full-color frame, the order may be changed again to B, G and R. Storing the R, G, and B images ahead of time in a computer buffer memory and then transferring the images in random order to the imaging light modulator can be used to achieve color randomization. Similar procedures can be done for four-color, five-color and six-color projection display systems.

The brightness of an LED-based projection display system can be changed over a wide operating range without affecting the display image quality or power efficiency. In contrast to this, the brightness of a projection display system that utilizes an HID lamp cannot be dimmed over a wide range without making the HID lamp either unstable or lowering the lamp output efficiency. The overall brightness of an LED-based projection display of this invention can be specified by setting the output lumens of the light-recycling envelope to some predetermined values. For example, when the red LEDs are on, the red light output exiting the light-recycling envelope can be set to $L_R$ lumens for a time period of $t_R$ as illustrated in FIG. 12. When the green LEDs are on, the green light output can be set to $L_G$ lumens for a time period of $t_G$. When the blue LEDs are on, the blue light output can be set to $L_B$ lumens for a time period of $t_B$. Sometimes one would like to raise or lower the overall brightness of the projection display in order to compensate for changes in the ambient light level but without changing the output grayscale range of the display. For example, at night in a darkened room, the brightness of the display can be lower than the display brightness in bright sunlight.

One embodiment of this invention is an apparatus and a method for modifying the overall brightness of the projection display system while retaining the full grayscale range of the imaging light modulator. One can lower the overall brightness of the LED-based projection display in two different ways. Assume, for example, that one wants to lower the overall brightness by 50 percent. One method is to lower each of the LED outputs, the red light output $L_R$ from the first light source, the green light output $L_G$ from the second light source and the blue light output $L_B$ from the third light source, by the same numerical factor of 50 percent. The second method is to cut each of the LED "on" times, the red light emitting time $t_R$, the green light emitting time $t_G$ and blue light emitting time $t_B$, by the same numerical factor of 50 percent. Either method will lower the display brightness and not effect the grayscale range of the imaging light modulator. Similar procedures can be done for four-color, five-color and six-color projection display systems.

The color temperature of a HID-lamp based projection display system cannot be adjusted by changing the lamp color temperature. HID lamps are normally run at one electrical power setting that gives a maximum output efficiency and has just one color temperature. If one wishes to affect a change of color temperature for the HID-based display, the settings of the imaging light modulator must be modified.

One embodiment of this invention is an apparatus and a method for modifying the color temperature of a projection display system without affecting the imaging light modulator. In contrast to an HID-lamp based projection display, it is easy to change the effective color temperature of an LED-based projection display system. If one assumes that the LED "on" times $t_R$, $t_G$ and $t_B$ as shown in FIG. 12 are equal, then one can provide one color temperature by setting the ratio of the LED outputs, the red light output $L_R$, the green light output $L_G$ and the blue light output $L_B$, to some value. For example, setting $L_R:L_G:L_B$ equal to 12:80:8 will give one color temperature. To change the color temperature, it is only necessary to change the $L_R:L_G:L_B$ ratio. For example, one can change to the ratio $L_R:L_G:L_B$ equal to 15:80:5. The latter ratio has more red light and less blue light than the previous ratio and results in a lower color temperature. Note that it is also possible to change the color temperature of the display by changing the ratio of the LED "on" times rather than the ratio of the LED light output. For example, instead of setting the ratio of the red light emitting time $t_R$ to the green light emitting time $t_G$ to the blue light emitting time $t_B$ (or $t_R:t_G:t_B$) equal to 1:1:1, the ratio can be changed to 1.05:1.00:0.95. The latter ratio again will produce more red light and less blue light coming from the display and result in a lower color temperature. Similar procedures can be done for four-color, five-color and six-color projection display systems.

Figure 13:
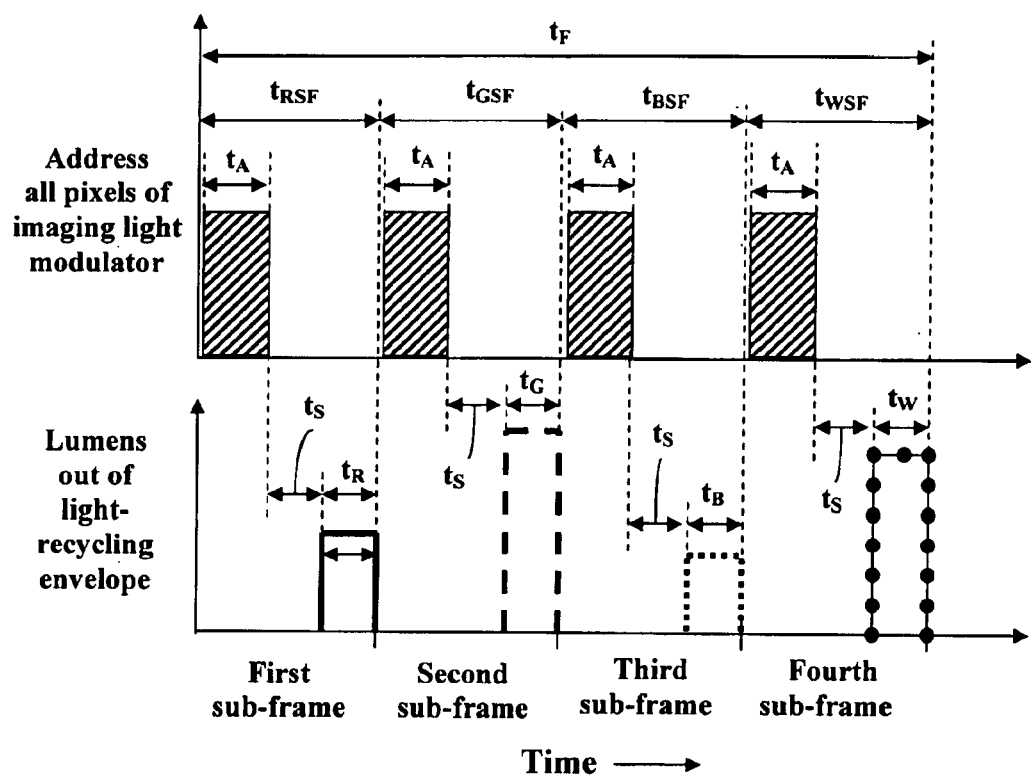
FIG. 13 is an example of a color sequential time sequence that utilizes four sub-frames per image frame.

The color sequential means illustrated in FIG. 12 is a three-color system with three sub-frame images per full-color frame. It is also possible to have a color sequential means that utilizes four colors and has four sub-frame images per full-color frame. Examples of the fourth color include, but are not limited to, white, yellow, cyan and magenta. An embodiment of this invention utilizing a four-color, color sequential means is illustrated in FIG. 13 using white light as the fourth color. Using white light as an additional color can increase the brilliance or sparkle of projection images of bright objects.

White light can be generated by several different methods. A few examples of the methods are listed here. First, illuminating simultaneously the red, green and blue LEDs that are used in the first, second and third sub-frames can generate white light. No additional LEDs are needed for this first method. Second, adding an additional one or more blue LEDs that are coated with green and red wavelength conversion layers will generate white light by combining the blue light from the LED with the green and red light generated by the two wavelength conversion layers. Third, adding one or more ultraviolet-emitting LEDs that are coated with red, green and blue wavelength conversion layers will generate white light by combining the red, green and blue light generated by the three wavelength conversion layers.

FIG. 13 is similar to FIG. 12 except for the addition of the fourth (white) sub-frame of the color sequential means. The operation of first three sub-frames is the same as described above for FIG. 12. The operation of the fourth sub-frame is as follows. At the start of the fourth sub-frame, all the LEDs are in the "off" state and all the pixels of the imaging light modulator are addressed in time $t_A$ in order to set the transmission of each pixel for white light. After all pixels are addressed, the imaging light modulator sometimes requires an additional settling time $t_S$ for the pixels to settle to the correct state. Next the white light is turned on and the imaging light modulator is illuminated for a time period $t_B$ in order to form a white image. During the time that the white light is being emitted, a portion of the light is recycled back to the reflecting layers of the emitting LEDs to increase the effective brightness of the emitting LEDs. The light-recycling envelope has an output of $L_W$ lumens of white light during the time period $t_W$. At the end of the time $t_W$, the white light is turned off. The sum of the three times, $t_A$ plus $t_S$ plus $t_W$, is equal to the time for the fourth (white) sub-frame $t_{WSF}$.

Figure 14:
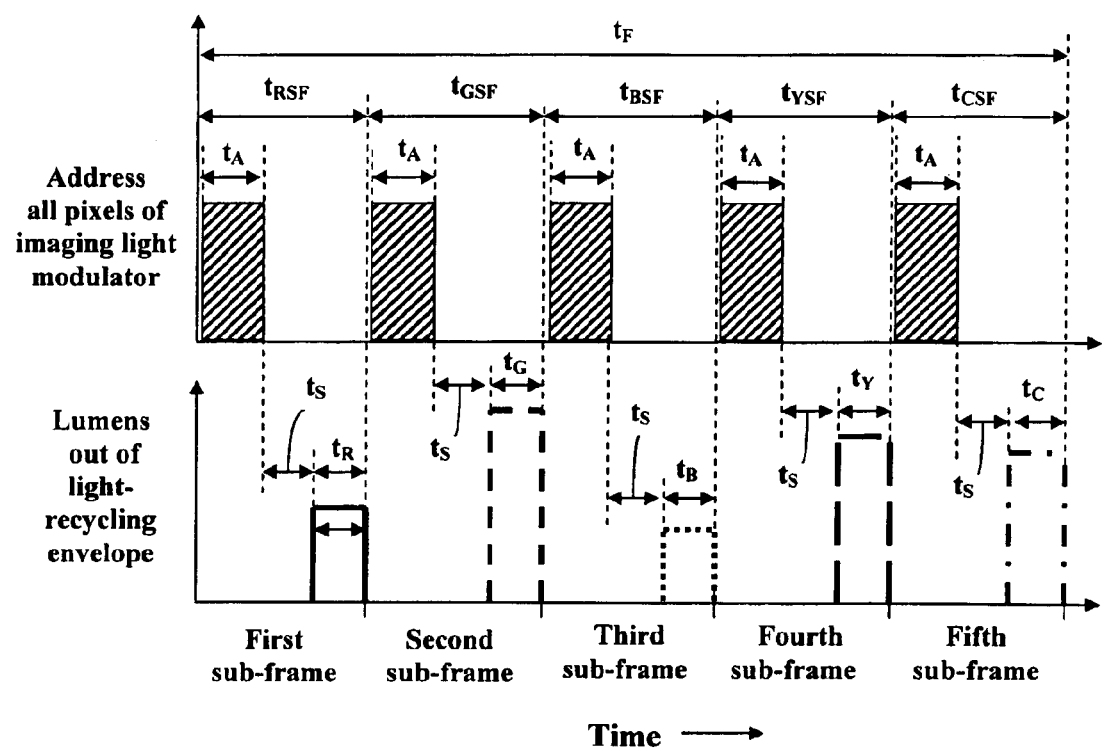
FIG. 14 is an example of a color sequential time sequence that utilizes five sub-frames per image frame.

It is also possible to have a color sequential means that utilizes five or six colors and has, respectively, five or six sub-frame images per full-color frame. Examples of the fifth and sixth colors include, but are not limited to, white, yellow, cyan and magenta. An embodiment of this invention utilizing a five-color, color sequential means is illustrated in FIG. 14. FIG. 14 is similar to the example in FIG. 12 except for the additions of yellow as the fourth color and cyan as the fifth color. Note that one could also produce a six-color display using the five colors in FIG. 14 plus adding magenta as the sixth color.

Figure 3A:
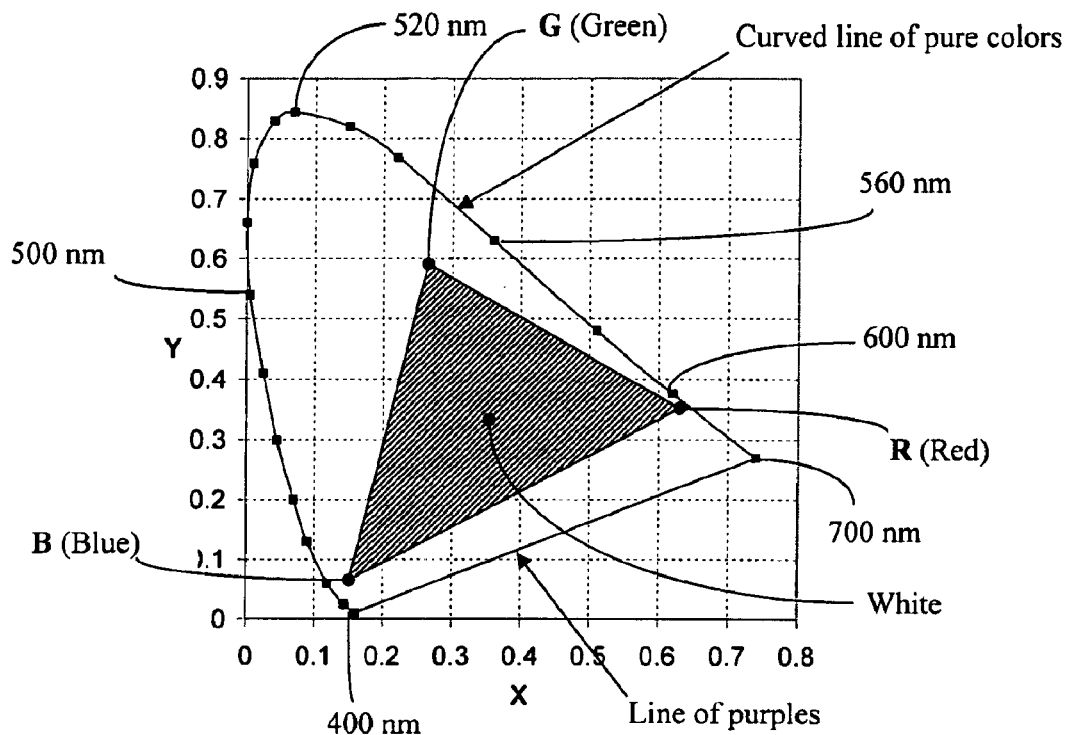
FIGS. 3A and 3B are examples of CIE Chromaticity Diagrams.
Figure 3B:
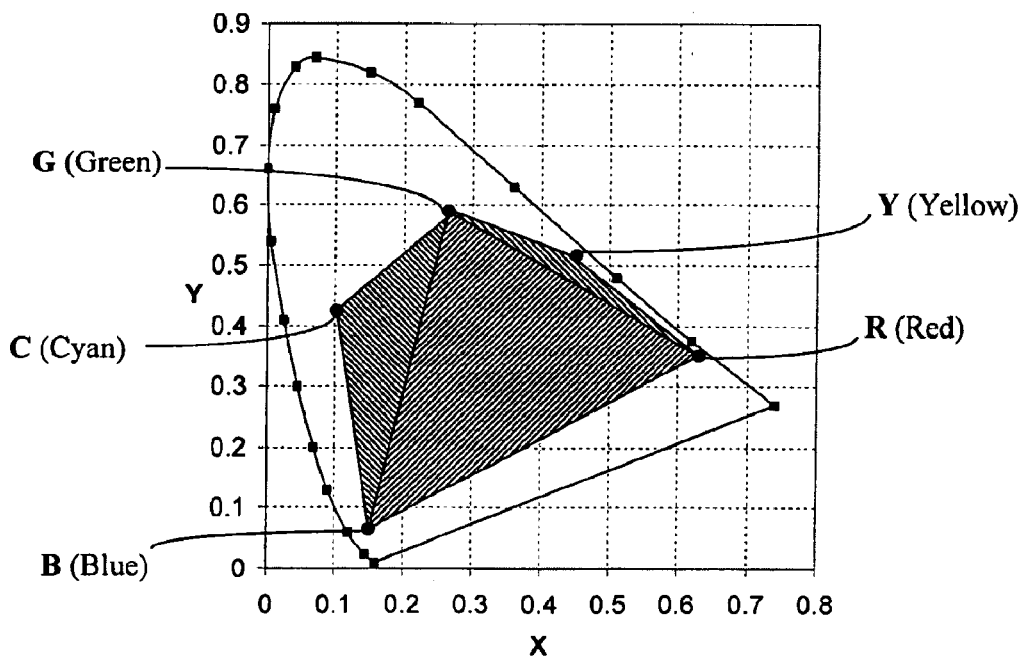
Figure 15:
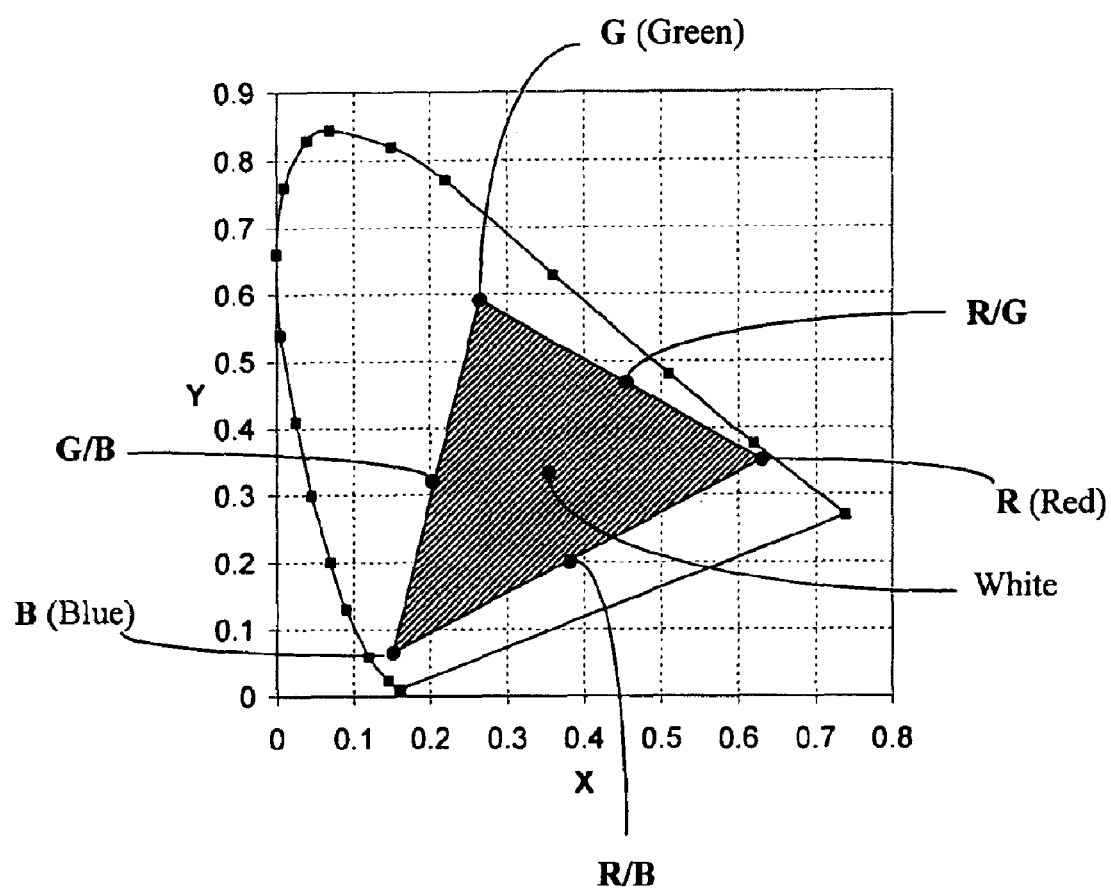
FIG. 15 is another example of a CIE Chromaticity Diagram.

The color yellow can be produced two different ways. First, one can utilize one or more yellow-emitting LEDs to produce yellow light. Adding separate yellow-emitting LEDs will increase the color gamut of the projection display as illustrated in FIG. 3B. Second, one can simultaneously illuminate the red LEDs and the green LEDs that are already incorporated in the projection display system. Illuminating both sets of LEDs simultaneously will generate yellow light. Producing yellow light by the second method can increase the number of grayscale levels that can be produced by the display, but will not increase the color gamut of the display. The resulting color gamut is illustrated in FIG. 15. The color yellow generated by simultaneously illuminating the red and green LEDs will produce the spot R/G shown on the CIE diagram in FIG. 15. The R/G spot is on the line connecting the colors R and G.

The color cyan can also be produced two different ways. First, one can utilize one or more cyan-emitting LEDs to produce cyan light. Adding separate cyan-emitting LEDs will increase the color gamut of the projection display as illustrated in FIG. 3B. Second, one can simultaneously illuminate the green LEDs and the blue LEDs that are already incorporated in the projection display system. Illuminating both sets of LEDs simultaneously will generate cyan light. Producing cyan light by the second method can again increase the number of grayscale levels that can be produced by the display, but will not increase the color gamut of the display. As illustrated in FIG. 15, the color cyan generated by simultaneously illuminating the green and blue LEDs will produce the spot G/B shown on the CIE diagram. The G/B spot is on the line connecting the colors G and B.

The color magenta is not a pure color. It can be generated by simultaneously illuminating the red LEDs and the blue LEDs that are already incorporated in the projection display system. Producing magenta light by this method can increase the number of grayscale levels that can be produced by the display, but will not increase the color gamut of the display. The color magenta generated by simultaneously illuminating the red and blue LEDs will produce the spot R/B shown on the CIE diagram shown in FIG. 15. The R/B spot is on the line connecting the colors R and G.

FIG. 14 is similar to FIG. 12 except for the addition of the fourth (yellow) sub-frame and the fifth (cyan) sub-frame of the color sequential means. The operation of first three sub-frames is the same as described above for FIG. 12. The operation of the fourth sub-frame in FIG. 14 is as follows. At the start of the fourth sub-frame, all the LEDs are in the "off" state and all the pixels of the imaging light modulator are addressed in time $t_A$ in order to set the transmission of each pixel for yellow light. After all pixels are addressed, the imaging light modulator sometimes requires an additional settling time $t_S$ for the pixels to settle to the correct state. Next the yellow light is turned on and the imaging light modulator is illuminated for a time period ty in order to form a yellow image. During the time that the yellow light is being emitted, a portion of the yellow light is recycled back to the emitting LEDs by the light-recycling envelope to increase the effective brightness of the emitting LEDs. The light-recycling envelope has an output of $L_Y$ lumens of yellow light during the time period ty. At the end of the time $t_Y$, the yellow light is turned off. The sum of the three times, $t_A$ plus $t_S$ plus $t_Y$, is equal to the time for the fourth (yellow) sub-frame $t_{YSF}$.

At the start of the fifth sub-frame in FIG. 14, all the LEDs are in the "off" state and all the pixels of the imaging light modulator are addressed in time $t_A$ in order to set the transmission of each pixel for cyan light. After all pixels are addressed and after an additional settling time $t_S$, the cyan light is turned on and the imaging light modulator is illuminated for a time period $t_C$ in order to form a cyan image. During the time that the cyan light is being emitted, a portion of the cyan light is recycled back to the emitting LEDs by the light-recycling envelope to increase the effective brightness of the emitting LEDs. The light-recycling envelope has an output of $L_C$ lumens of cyan light during the time period $t_C$. At the end of the time $t_C$, the cyan light is turned off. The sum of the three times, $t_A$ plus $t_S$ plus $t_C$, is equal to the time for the fifth (cyan) sub-frame $t_{CSF}$.

The above examples illustrate the time sequence of events for the operation of a projection display system by color sequential means. FIGS. 16, 17, 18, 19 and 21 illustrate projection display systems that incorporate a single imaging light modulator and utilize color sequential means for image formation.

Figure 16:
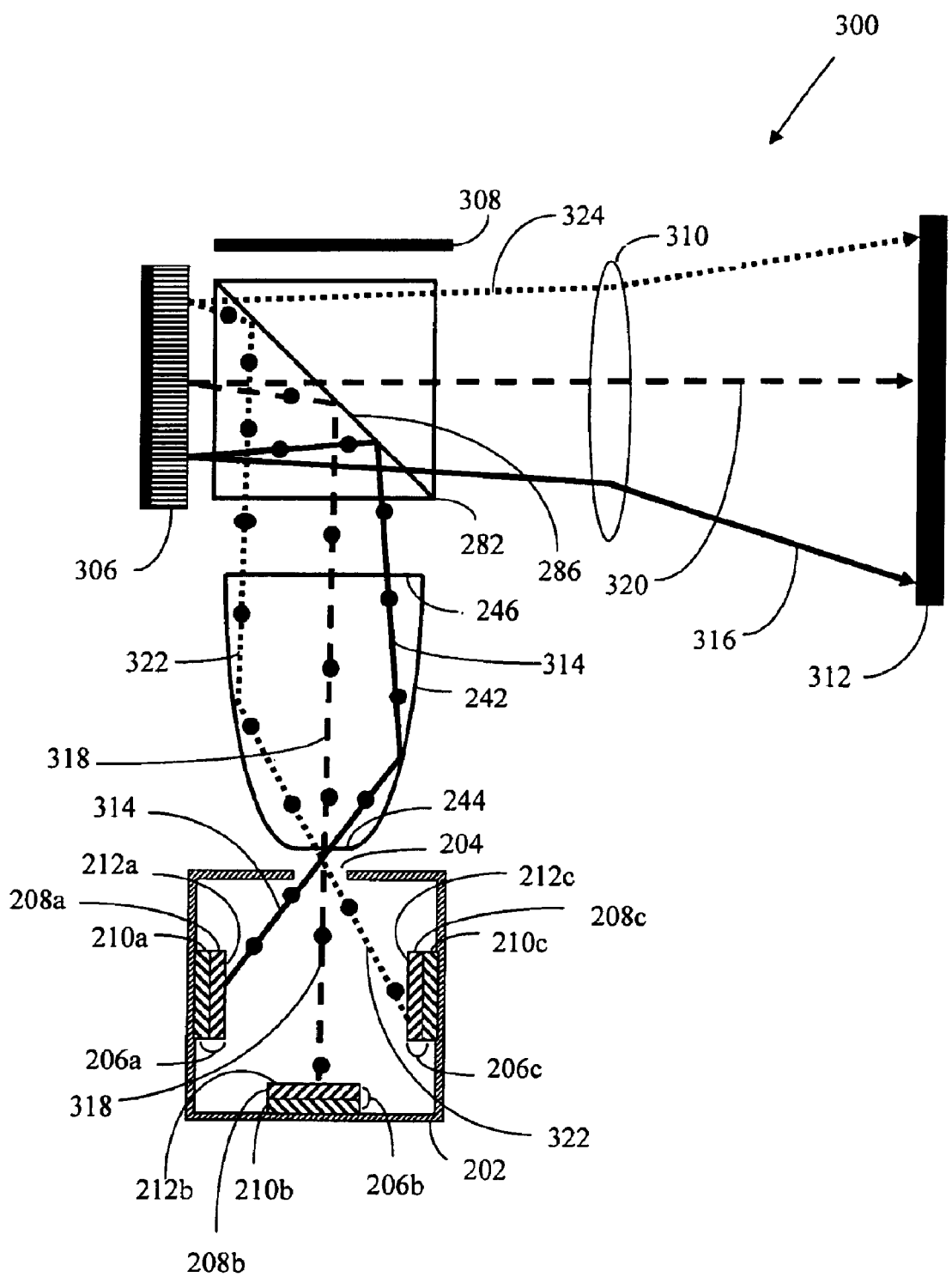
FIG. 16 is a cross-sectional view of an embodiment of this invention that incorporates one light-recycling illumination system and one imaging light modulator.

Another embodiment of this invention is projection display system 300 illustrated in cross-section in FIG. 16. Projection display system 300 incorporates a single LCOS imaging light modulator and utilizes a color sequential means for image formation. FIG. 16 is similar to FIG. 11 except that FIG. 16 includes an imaging light modulator 306, an optional reflector 308, a projection lens 310 and a viewing screen 312. Imaging light modulator 306 shown in FIG. 16 replaces the reflector 292 in FIG. 11.

The main elements of the projection display system 300 are a light-recycling illumination system, a reflective polarizer, an imaging light modulator 306, a reflector 308, a projection lens 310 and a viewing screen 312. The light-recycling illumination system is comprised of a light source, a light-recycling envelope 202, a light output aperture 204 and light-collimating means 242. The light source is comprised of three LEDs, which are labeled 206a, 206b and 206c. The reflective polarizer can be any type of reflective polarizer, but is illustrated to be a beam-splitting prism polarizer 282. The characteristics and properties of the LEDs, the light-recycling envelope 202, the light output aperture 204, the light-collimating means 242 and the beam-splitting prism polarizer 282 have been described previously. The area of the light output aperture 204 is less than the area of the light source and, in some cases, the maximum exiting luminance from the light output aperture is greater than the maximum intrinsic source luminance.

The imaging light modulator 306 in FIG. 16 is a reflective device. For example, imaging light modulator can be an LCOS device that utilizes liquid crystals to modulate the light reflectivity of a two-dimensional array of pixels. Preferably light of a single polarization state is directed to the LCOS device. The beam-splitting prism polarizer 282 directs light of a single polarization state to the imaging light modulator 306 by reflecting light of a first polarization state to the imaging light modulator and transmitting light of a second polarization state. To form an image, each pixel of the imaging light modulator converts a portion of the light of a first polarization state into light of a second polarization state. The portion will vary for each pixel. The converted light of a second polarization state is then transmitted as an image through the partially reflecting diagonal surface 286 and through the projection lens 310 to the viewing screen 312. Light of a first polarization state that is not converted by the imaging light modulator to light of a second polarization state is reflected and recycled back to the light-collimating means and to the light-recycling envelope 202 by the partially reflecting diagonal surface 286. Recycling light of a first polarization state back to the light-recycling envelope to be reused can increase the efficiency and the maximum exiting luminance of the projection display system.

Light of a second polarization state (not shown in FIG. 16) emitted by LED 206a, LED 206b and LED 206c passes through the partially reflecting diagonal surface 286 of beam-splitting prism polarizer 282 and is directed to reflector 308. Reflector 308 reflects the light of a second polarization state back through the beam-slitting prism polarizer 282, back through the light-collimating means and back into the light-recycling envelope 202 where it can be reflected multiple times and partially converted to light of a first polarization state. Recycling light of a second polarization state back to the light-recycling envelope to be converted to light of a first polarization state can increase the efficiency and the maximum exiting luminance of the projection display system.

In projection display system 300, LED 206a is assumed to emit red light of both a first polarization state and a second polarization state. LED 206b is assumed to emit green light of both a first polarization state and a second polarization state. LED 206c is assumed to emit blue light of both a first polarization state and a second polarization state. Although there is just one LED for each of three colors in FIG. 16, it is within the scope of this invention that the lightrecycling envelope may contain more than one LED for each color and may contain LEDs emitting more than three colors.

In order to illustrate light rays of three different colors in FIGS. 16–19 and 21–22, a solid line indicates a light ray of red light, a dashed line indicates a light ray of green light and a dotted line indicates a light ray of blue light. A light ray of a first polarization state is indicated by superimposing dots onto the line representing the light ray. A light ray of a second polarization state has no superimposed dots.

Representative light rays 314, 316, 318, 320, 322 and 324 shown in FIG. 16, combined with the time sequence of the color sequential means shown in FIG. 12, illustrate the operation of projection display system 300. Only a few rays are shown in order to simplicity the figure. Although a typical ray may reflect several times inside the light-recycling envelope 202 before exiting the light output aperture 204, these extra reflections are not shown in order to simplify the figure.

In the first sub-frame of the color sequential time sequence, red light ray 314 of a first polarization state is emitted through surface 212a of emitting layer 208a of LED 206a. Red light ray 314 of a first polarization state passes through the interior of light-recycling envelope 202, passes through light output aperture 204 and enters input surface 244 of light-collimating means 242 as uncollimated light. Red light ray 314 of a first polarization state is reflected by the sides of light-collimating means 242 and exits the light-collimating means 242 through the output surface 246 as partially collimated light. Red light ray 314 of a first polarization state enters beam-splitting prism polarizer 282, is reflected by the partially reflecting diagonal surface 286 and is directed to a pixel of imaging light modulator 306. The pixel of imaging light modulator 306 reflects and converts all or part of red light ray 314 of a first polarization state into red light ray 316 of a second polarization state, forming one pixel of a red image. Red light ray 316 of a second polarization state passes through the partially reflecting diagonal surface 286 of beam-splitting prism polarizer 282, is directed through projection lens 310 to viewing screen 312. Although not shown in FIG. 16, any part of red light ray 314 of a first polarization state that is not converted to red light ray 316 of a second polarization state by the pixel of the imaging light modulator is reflected by the imaging light modulator, is also reflected by the partially reflecting diagonal surface 286 and is recycled back through the light-collimating means 242 into the lightrecycling envelope 202. Any such recycled light can be redirected out of the light-recycling envelope 202 and can increase the efficiency and the maximum exiting luminance of projection display 300.

In a second sub-frame of the color sequential time sequence, green light ray 318 of a first polarization state is emitted through surface 212b of emitting layer 208b of LED 206b. Green light ray 318 of a first polarization state passes through the interior of light-recycling envelope 202, passes through light output aperture 204 and enters input surface 244 of light-collimating means 242 as uncollimated light. Green light ray 318 of a first polarization state passes is partially collimated by the light-collimating means 242 and exits the light-collimating means 242 through the output surface 246. Green light ray 318 of a first polarization state enters beam-splitting prism polarizer 282, is reflected by the partially reflecting diagonal surface 286 and is directed to a pixel of imaging light modulator 306. The pixel of imaging light modulator 306 reflects and converts all or part of green light ray 318 of a first polarization state into green light ray 320 of a second polarization state, forming one pixel of a red image. Green light ray 320 of a second polarization state passes through the partially reflecting diagonal surface 286 of beam-splitting prism polarizer 282, is directed through projection lens 310 to viewing screen 312. Although not shown in FIG. 16, any part of green light ray 318 of a first polarization state that is not converted to green light ray 320 of a second polarization state by the pixel of the imaging light modulator is reflected by the imaging light modulator, is also reflected by the partially reflecting diagonal surface 286 and is recycled back through the light-collimating means 242 into the light-recycling envelope 202. Any such recycled light can be redirected out of the light-recycling envelope 202 and can increase the efficiency and the maximum exiting luminance of projection display 300.

In the third sub-frame of the color sequential time sequence, blue light ray 322 of a first polarization state is emitted through surface 212c of emitting layer 208c of LED 206c. Blue light ray 322 of a first polarization state passes through the interior of light-recycling envelope 202, passes through light output aperture 204 and enters input surface 244 of light-collimating means 242 as uncollimated light. Blue light ray 322 of a first polarization state is reflected by the sides of light-collimating means 242 and exits the light-collimating means 242 through the output surface 246 as partially collimated light. Blue light ray 322 of a first polarization state enters beam-splitting prism polarizer 282, is reflected by the partially reflecting diagonal surface 286 and is directed to a pixel of imaging light modulator 306. The pixel of imaging light modulator 306 reflects and converts all or part of blue light ray 322 of a first polarization state into blue light ray 324 of a second polarization state, forming one pixel of a blue image. Blue light ray 324 of a second polarization state passes through the partially reflecting diagonal surface 286 of beam-splitting prism polarizer 282, is directed through projection lens 310 to viewing screen 312. Although not shown in FIG. 16, any part of blue light ray 322 of a first polarization state that is not converted to blue light ray 324 of a second polarization state by the pixel of the imaging light modulator is reflected by the imaging light modulator, is also reflected by the partially reflecting diagonal surface 286 and is recycled back through the light-collimating means 242 into the light-recycling envelope 202. Any such recycled light can be redirected out of the light-recycling envelope 202 and can increase the efficiency and the maximum exiting luminance of projection display 300.

Figure 17:
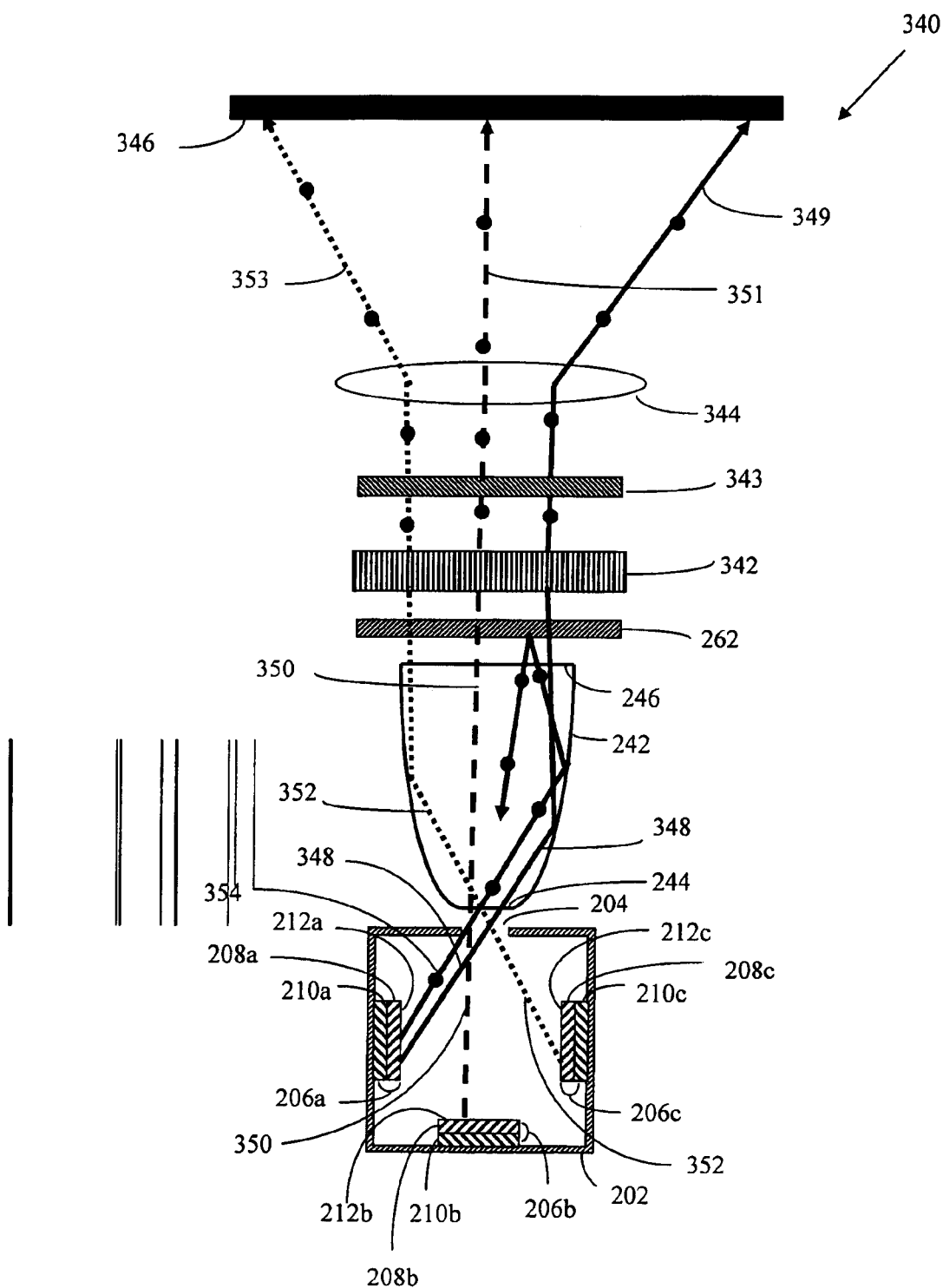
FIG. 17 is a cross-sectional view of another embodiment of this invention that incorporates one light-recycling illumination system and one imaging light modulator.

FIG. 17 is a cross-sectional view of another embodiment of this invention. FIG. 17 illustrates projection display system 340 that incorporates one light-recycling illumination system and one imaging light modulator. FIG. 17 is similar to FIG. 10 except that FIG. 17 includes an imaging light modulator 342, a second polarizer 343, a projection lens 344 and a viewing screen 346. Projection display system 340 also utilizes a color sequential means for image formation.

The main elements of the projection display system 340 are a light-recycling illumination system, a first polarizer, an imaging light modulator 342, a second polarizer 343, a projection lens 344 and a viewing screen 346. The light-recycling illumination system is comprised of a light source, a light-recycling envelope 202, a light output aperture 204 and light-collimating means 242. The light source is comprised of three LEDs, which are labeled 206a, 206b and 206c. The first polarizer can be any type of polarizer, but is illustrated to be a planar reflective polarizer 262 as in FIG. 10. The characteristics and properties of the LEDs, the lightrecycling envelope 202, the light output aperture 204, the light-collimating means 242 and the planar reflective polarizer 262 have been described previously. The area of the light output aperture 204 is less than the area of the light source and, in some cases, the maximum exiting luminance from the light output aperture is greater than the maximum intrinsic source luminance.

The imaging light modulator 342 in FIG. 17 is a light-transmitting device, for example an LCD device. LCD light-transmitting devices utilize liquid crystals to modulate the light transmission of a two-dimensional array of pixels. Preferably light of a single polarization state is directed to the LCD device. The planar reflecting polarizer 262 directs light of a single polarization state to the imaging light modulator 342 by reflecting light of a first polarization state back to the light-recycling envelope and transmitting light of a second polarization state to a imaging light modulator 342. To form an image, each pixel of the imaging light modulator converts a portion of the incident light of a second polarization state to light of a first polarization state. The portion converted to a first polarization state will vary for each pixel. A second polarizer 343 allows the light of a first polarization state to be transmitted and reflects or absorbs light of a second polarization state. The light of a first polarization state generated by all the pixels of the imaging light modulator 342 forms an image that is transmitted through the projection lens 344 to the viewing screen 346.

Planar reflective polarizer 262 reflects the light of a first polarization state back through the light-collimating means 242 and back into the light-recycling envelope 202 where it can be reflected multiple times and partially converted to light of a second polarization state. Recycling light of a first polarization state back to the light-recycling envelope to be converted to light of a second polarization state can increase the efficiency and the maximum exiting luminance of the projection display system.

In projection display system 340, LED 206a is assumed to emit red light of both a first polarization state and a second polarization state. LED 206b is assumed to emit green light of both a first polarization state and a second polarization state. LED 206c is assumed to emit blue light of both a first polarization state and a second polarization state. Although there is just one LED for each of three colors in FIG. 17, it is within the scope of this invention that the lightrecycling envelope may contain more than one LED for each color and may contain LEDs emitting more than three colors.

Representative light rays 348, 349, 350, 351, 352, 353 and 354 shown in FIG. 17, combined with the time sequence of the color sequential means shown in FIG. 12, illustrate the operation of projection display system 340. Only a few rays and only a few reflections are shown in order to simplicity the figure.

In the first sub-frame of the color sequential time sequence, red light ray 354 of a first polarization state is emitted through surface 212a of LED 206a. Red light ray 354 of a first polarization state passes through the interior of light-recycling envelope 202, passes through light output aperture 204 and enters input surface 244 of light-collimating means 242 as uncollimated light. Red light ray 354 of a first polarization state is reflected by the sides of light-collimating means 242 and exits the light-collimating means 242 through the output surface 246 as partially collimated light. Red light ray 354 of a first polarization state is reflected and recycled by planar reflecting polarizer 262 back into the light-collimating means 242. Eventually red light ray 354 of a first polarization state will return to the light-recycling envelope where red light ray 354 will be reflected multiple times and be partially converted to light of a second polarization state. Converting recycled light of a first polarization state into light of a second polarization state can increase the efficiency and the maximum exiting luminance of projection display system 340.

Also in the first sub-frame of the color sequential time sequence, red light ray 348 of a second polarization state is emitted through surface 212a of LED 206a. Red light ray 348 of a second polarization state passes through the interior of light-recycling envelope 202, passes through light output aperture 204, is partially collimated by light-collimating means 242, passes through planar reflective polarizer 262 and is directed to a pixel of imaging light modulator 342. The pixel of imaging light modulator 342 converts all or part of red light ray 348 of a second polarization state into red light ray 349 of a first polarization state, forming one pixel of a red image. Red light ray 349 of a first polarization state passes through the second polarizer 343 and is directed through projection lens 344 to viewing screen 346. Although not shown in FIG. 17, any part of red light ray 348 of a second polarization state that is not converted to red light ray 349 of a first polarization state by the pixel of the imaging light modulator is reflected or absorbed by the second polarizer 343.

In a second sub-frame of the color sequential time sequence, green light ray 350 of a second polarization state is emitted through surface 212b of LED 206b. Green light ray 350 of a second polarization state passes through the interior of light-recycling envelope 202, passes through light output aperture 204, is partially collimated by light-collimating means 242, passes through planar reflective polarizer 262 and is directed to a pixel of imaging light modulator 342. The pixel of imaging light modulator 342 converts all or part of green light ray 350 of a second polarization state into green light ray 351 of a first polarization state, forming one pixel of a green image. Green light ray 351 of a first polarization state passes through the second polarizer 343 and is directed through projection lens 344 to viewing screen 346. Although not shown in FIG. 17, any part of green light ray 350 of a second polarization state that is not converted to green light ray 351 of a first polarization state by the pixel of the imaging light modulator is reflected or absorbed by the second polarizer 343.

In a third sub-frame of the color sequential time sequence, blue light ray 352 of a second polarization state is emitted through surface 212c of LED 206c. Blue light ray 352 of a second polarization state passes through the interior of light-recycling envelope 202, passes through light output aperture 204, is partially collimated by light-collimating means 242, passes through planar reflective polarizer 262 and is directed to a pixel of imaging light modulator 342. The pixel of imaging light modulator 342 converts all or part of blue light ray 352 of a second polarization state into blue light ray 353 of a first polarization state, forming one pixel of a blue image. Blue light ray 353 of a first polarization state passes through the second polarizer 343 and is directed through projection lens 344 to viewing screen 346. Although not shown in FIG. 17, any part of blue light ray 352 of a second polarization state that is not converted to blue light ray 353 of a first polarization state by the pixel of the imaging light modulator is reflected or absorbed by the second polarizer 343.

Figure 18:
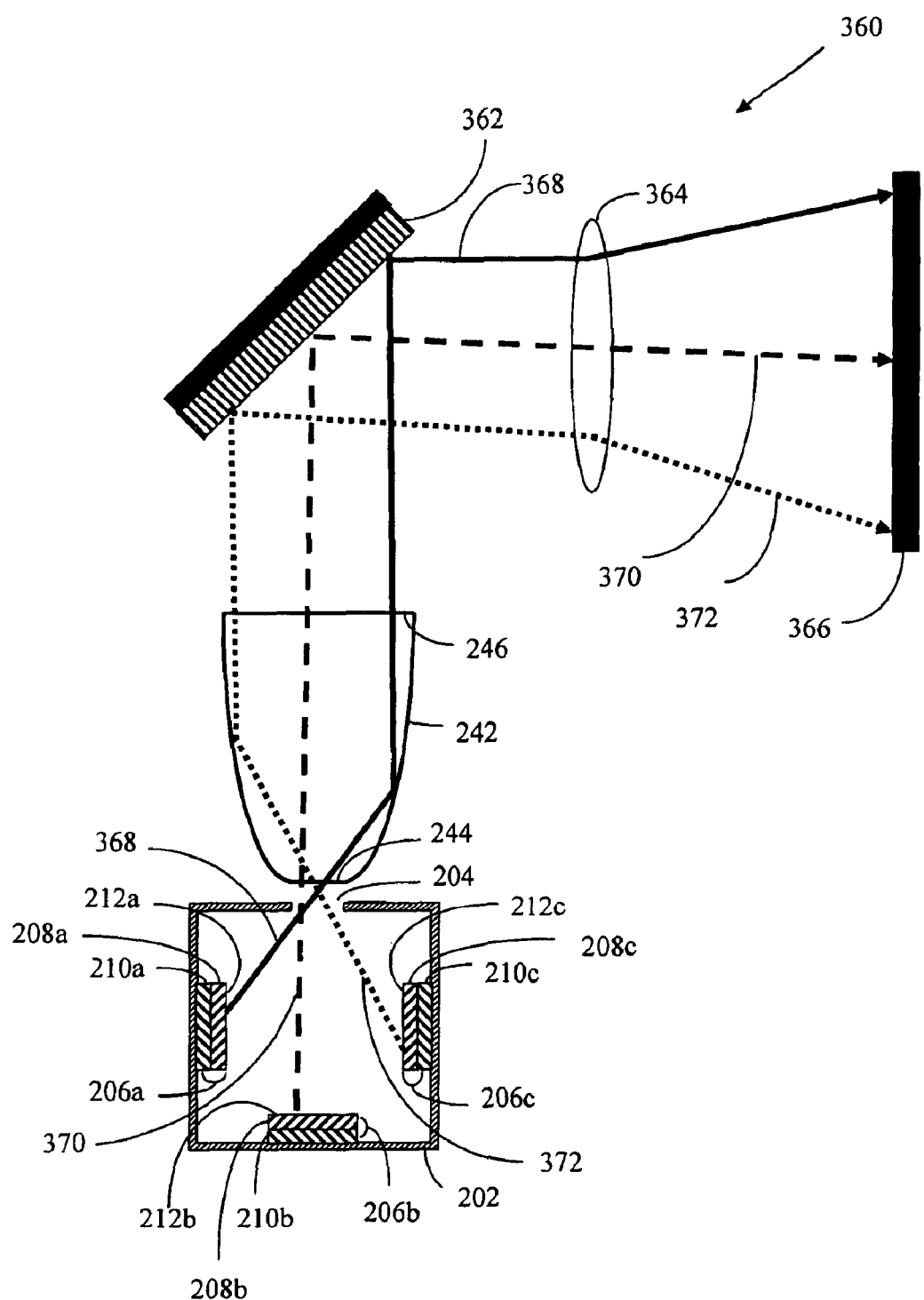
FIG. 18 is a cross-sectional view of another embodiment of this invention that incorporates one light-recycling illumination system and one imaging light modulator.

FIG. 18 is a cross-sectional view of another embodiment of this invention. FIG. 18 illustrates projection display system 360 that incorporates one light-recycling illumination system and one imaging light modulator. FIG. 18 is similar to FIG. 16 except that in FIG. 18 the imaging light modulator 362 is a DLP device. Because DLP devices are not polarization sensitive, polarizing elements are not required in projection display system 360. Projection display system 360 utilizes a color sequential means for image formation.

The main elements of the projection display system 360 are a light-recycling illumination system, an imaging light modulator 362, a projection lens 364 and a viewing screen 366. The light-recycling illumination system is comprised of a light source, a light-recycling envelope 202, a light output aperture and light-collimating means 242. The light source is comprised of three LEDs, which are labeled 206a, 206b and 206c. The characteristics and properties of the LEDs, the light-recycling envelope 202, the light output aperture 204 and the light-collimating means 242 have been described previously. The area of the light output aperture 204 is less than the area of the light source and, in some cases, the maximum exiting luminance from the light output aperture is greater than the maximum intrinsic source luminance.

The imaging light modulator 362 in FIG. 18 is a reflective DLP device. To form an image, each pixel of the imaging light modulator directs a portion of the incident light to the projection lens 364 and viewing screen 366. The portion directed to the viewing screen will vary for each pixel.

In projection display system 360, LED 206a is assumed to emit red light of both a first polarization state and a second polarization state. LED 206b is assumed to emit green light of both a first polarization state and a second polarization state. LED 206c is assumed to emit blue light of both a first polarization state and a second polarization state. Although there is just one LED for each of three colors in FIG. 16, it is within the scope of this invention that the lightrecycling envelope may contain more than one LED for each color and may contain LEDs emitting more than three colors.

Representative light rays 368, 370, and 372 shown in FIG. 18, combined with the time sequence of the color sequential means shown in FIG. 12, illustrate the operation of projection display system 360. Although only three light rays of the second polarization state are shown in FIG. 18, light rays of the first polarization state will behave in a similar way. Multiple ray reflections inside the light-recycling envelope 202 are not shown in order to simplify the figure.

In the first sub-frame of the color sequential time sequence, red light ray 368 of a second polarization state is emitted through surface 212a of LED 206a. Red light ray 368 of a second polarization state passes through the interior of light-recycling envelope 202, passes through light output aperture 204, is partially collimated by light-collimating means 242 and is directed to a pixel of imaging light modulator 362. The pixel of imaging light modulator 362 forms one pixel of a red image by reflecting all or part of red light ray 368 of a second polarization state to projection lens 364 and to viewing screen 366.

In a second sub-frame of the color sequential time sequence, green light ray 370 of a second polarization state is emitted through surface 212b of LED 206b. Green light ray 370 of a second polarization state passes through the interior of light-recycling envelope 202, passes through light output aperture 204, is partially collimated by light-collimating means 242 and is directed to a pixel of imaging light modulator 362. The pixel of imaging light modulator 362 forms one pixel of a green image by reflecting all or part of green light ray 370 of a second polarization state to projection lens 364 and to viewing screen 366.

In a third sub-frame of the color sequential time sequence, blue light ray 372 of a second polarization state is emitted through surface 212c of LED 206c. Blue light ray 372 of a second polarization state passes through the interior of light-recycling envelope 202, passes through light output aperture 204, is partially collimated by light-collimating means 242 and is directed to a pixel of imaging light modulator 362. The pixel of imaging light modulator 362 forms one pixel of a blue image by reflecting all or part of blue light ray 372 of a second polarization state to projection lens 364 and to viewing screen 366.

Figure 21:
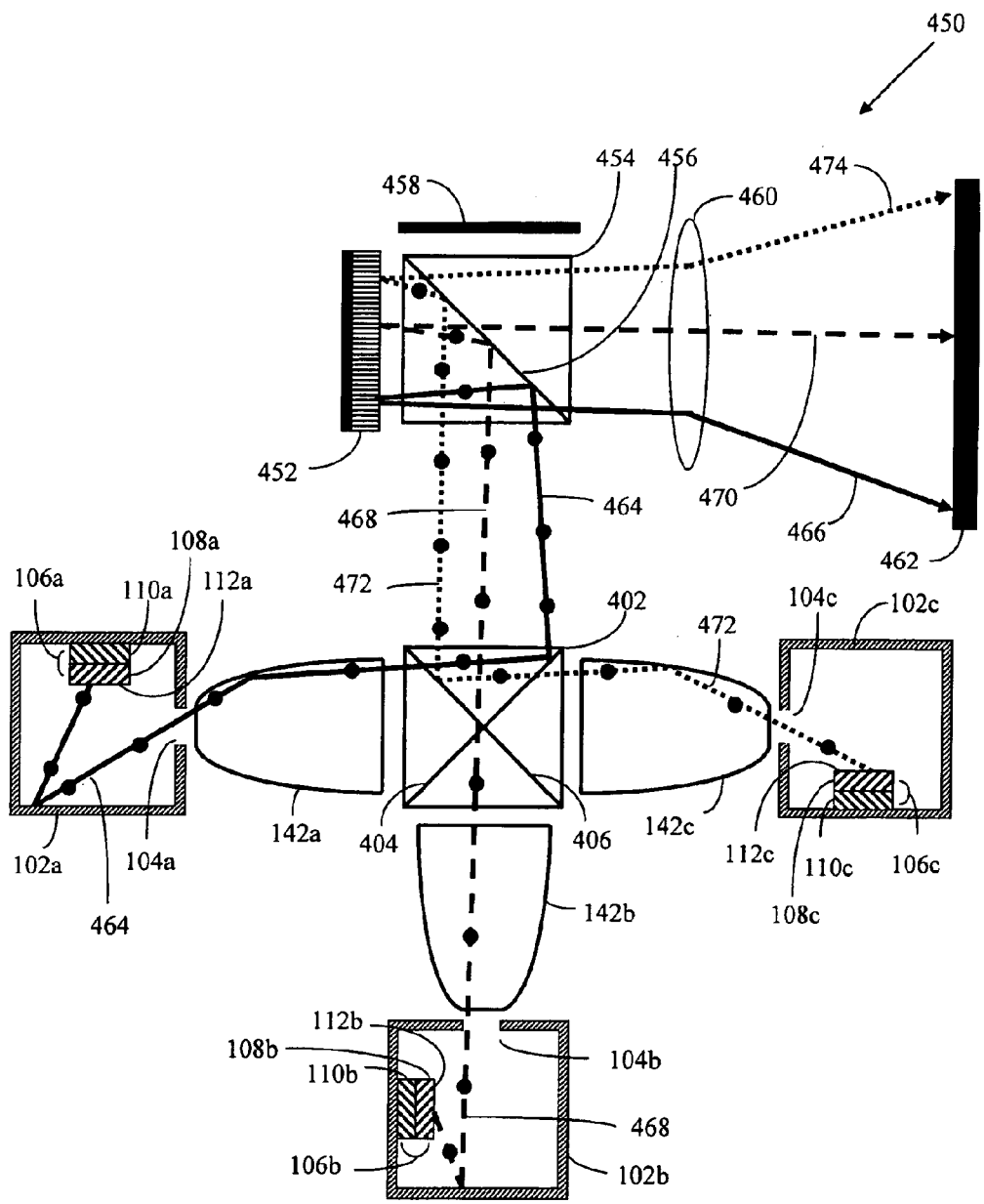
FIG. 21 is a cross-sectional view of another embodiment of this invention that incorporates three light-recycling illumination systems and one imaging light modulator.

FIGS. 16, 17 and 18 illustrate embodiments of this invention that comprise one lightrecycling illumination system and one imaging light modulator. Other embodiments of this invention are possible that utilize one imaging light modulator but that comprise three lightrecycling illumination systems and one light-combining means. Two illustrative examples of such embodiments are shown in FIGS. 19 and 21.

Figure 19:
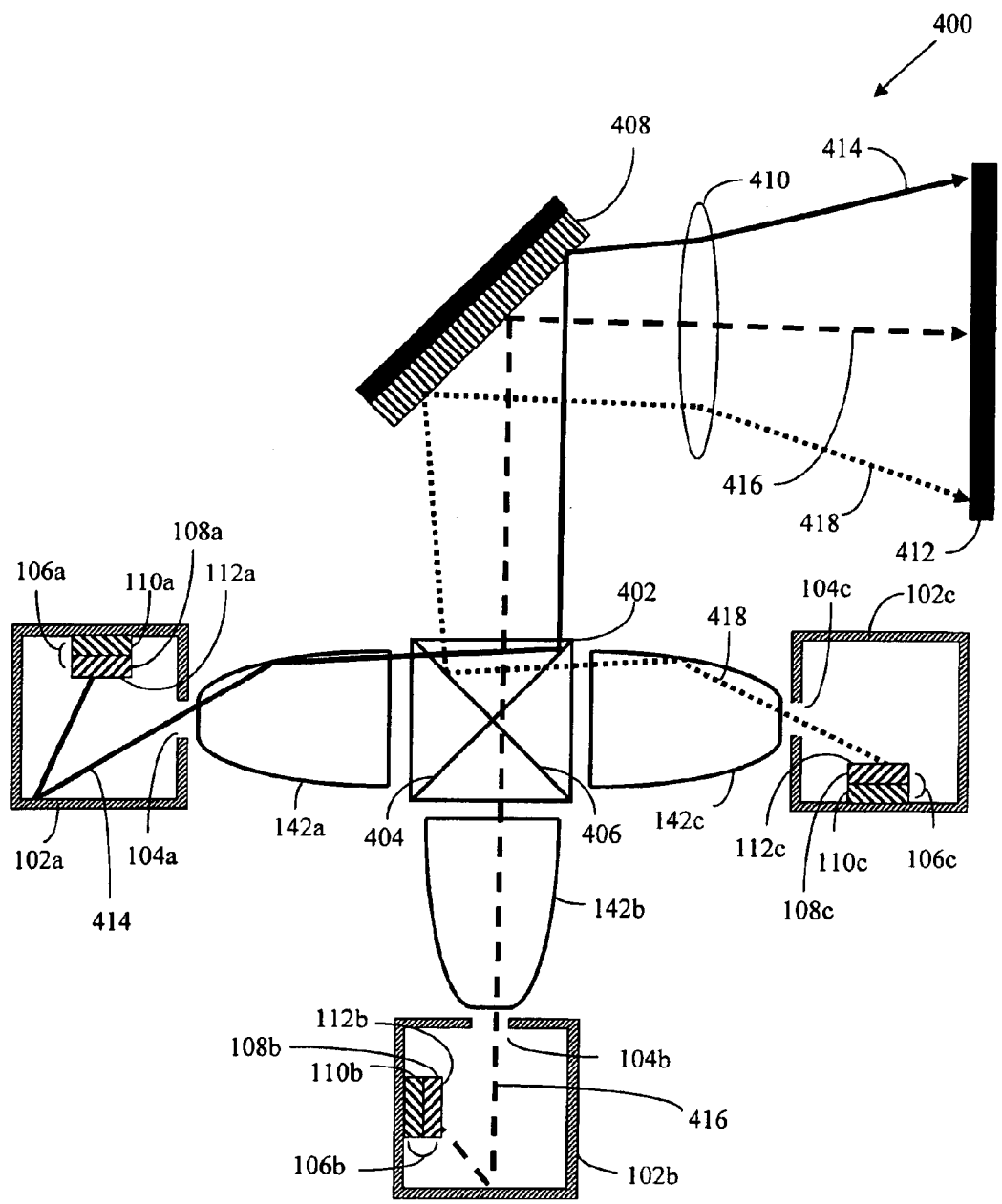
FIG. 19 is a cross-sectional view of an embodiment of this invention that incorporates three light-recycling illumination systems and one imaging light modulator.

The embodiment of this invention illustrated in FIG. 19 is a cross-sectional view of a projection display system 400 that comprises three light-recycling illumination systems. In this embodiment, a red LED, a green LED and a blue LED are placed in separate light-recycling illumination systems.

The main elements of the projection display system 400 are three light-recycling illumination systems, a light-combining means 402, an imaging light modulator 408, a projection lens 410 and a viewing screen 412. The light-recycling illumination systems comprise, respectively, three LED light sources, three light-recycling envelopes 102a, 102b and 102c, three light output apertures 104a, 104b and 104c and three light-collimating means 142a, 142b and 142c. Light-recycling envelope 102a encloses red-emitting LED 106a, light-recycling envelope 102b encloses green-emitting LED 106b and light-recycling envelope 102c encloses blue-emitting LED 106c. The characteristics and properties of the LEDs, the light-recycling envelopes, the light output apertures and the light-collimating means have been described previously in the descriptions for FIGS. 4 and 6. For each of the three light-recycling illumination systems, the area of the light output aperture 104a, 104b or 104c is less than the area of the respective light source and, in some cases, the maximum exiting luminance from the light output aperture 104a. 104b or 104c is greater than the respective maximum intrinsic source luminance.

Although light-recycling envelope 102a is illustrated with one red LED, it is within the scope of this invention that light-recycling envelope 102a may enclose more than one red LED. Likewise, light-recycling envelope 102b may enclose more than one green LED and lightrecycling envelope 102c may enclose more than one blue LED. It is also within the scope of this invention that red light may be produced inside light-recycling envelope 102a by one or more ultraviolet LEDs that are coated with a wavelength conversion material in order to convert ultraviolet light to red light. Green light and blue light may also be produced by wavelength conversion if desired.

It is also an embodiment of this invention that if light-recycling envelope, such as light-recycling envelope 102b, encloses more than one green LED, the green LEDs may emit different wavelengths of green light. For example, multiple green LEDs may each emit a different wavelength in the 510-nm to 540-nm wavelength range. Using multiple green LEDs that emit different wavelengths of green light will increase the color gamut of the projection display system. Similarly, a light-recycling envelope that contains multiple red LEDs may utilize red LEDs that emit more than one wavelength of red light and a light-recycling envelope that contains multiple blue LEDs may utilize blue LEDs that emit more than one wavelength of blue light.

The imaging light modulator 408 in projection display system 400 is a DLP device. Because DLP devices are not polarization sensitive, polarizing elements are not required in projection display system 400. Projection display system 400 utilizes a color sequential means for image formation.

Because the red light, green light and blue light are generated in three separate lightrecycling envelopes, a light-combining means is required to combine the resulting three light beams into one beam. Examples of light-combining means include, but are not limited to, an x-cube prism and a Philips prism. The Philips prism is a trichroic prism assembly comprising three prisms.

Figure 20:
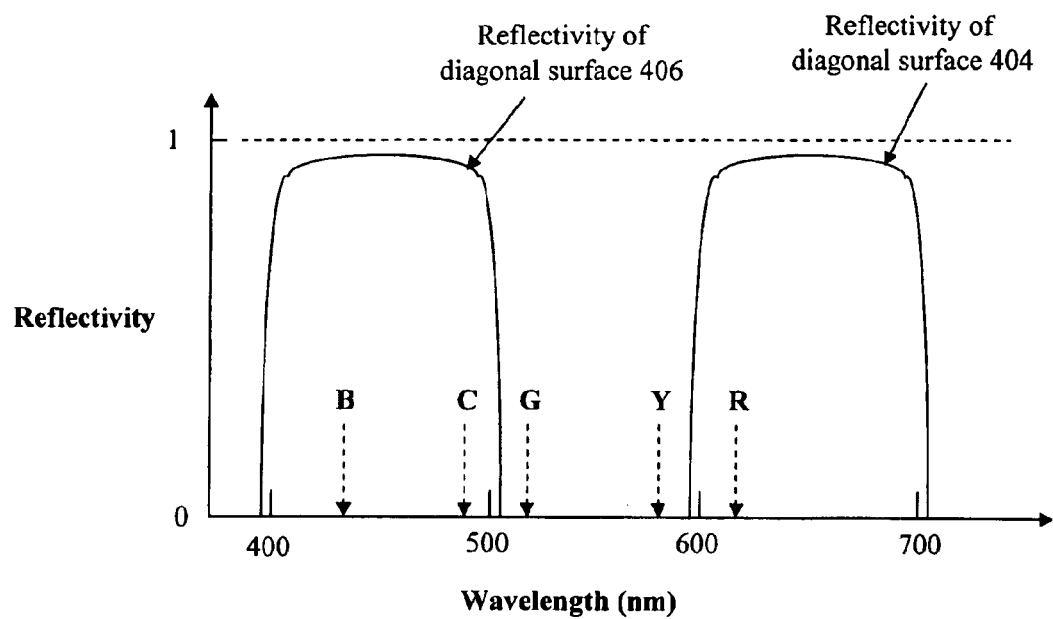
FIG. 20 is an example of the reflectivity of two diagonal surfaces of an x-cube prism.

In FIG. 19, the light-combining means is an x-cube prism 402. The x-cube prism 402 has two partially reflecting diagonal surfaces. Examples of the approximate reflectivity of the diagonal surface 404 and the approximate reflectivity of the diagonal surface 406 are illustrated schematically in FIG. 20. The reflectivity curves in FIG. 20 are illustrative examples and are not meant to limit the reflectivity of the diagonal surface 404 and diagonal surface 406 to the illustrated wavelength dependences. Diagonal surface 404 reflects light having wavelengths between approximately 600-nm and approximately 700-nm and transmit light having wavelengths between approximately 400-nm and 600-nm. The 600-m to 700-nm reflective range includes red (R) light. Diagonal surface 406 reflects light having wavelengths between approximately 400-nm and approximately 500-nm and transmits light having wavelengths between approximately 500-nm and 700-nm. The 400-nm to 500-nm reflective range includes blue (B) light and cyan (C) light. Diagonal surfaces 404 and 406 both transmit light between approximately 500-run and 600-nm. The 500-nm to 600-nm range includes green (G) light and yellow (Y) light. R, G, B, Y, and C are not single wavelengths but can each vary over a range of wavelengths. Approximate wavelengths of R, G, G, Y and C that can be used for display applications are indicated in FIG. 20.

Projection display system 400 is illustrated in FIG. 19 as a three-color display. However, since diagonal surface 406 can reflect both blue and cyan light, it is also within the scope of this invention to incorporate both blue-emitting and cyan-emitting LEDs inside lightrecycling envelope 102c. Likewise, since both diagonal surface 404 and diagonal surface 406 can transmit both green and yellow light, it is also within the scope of this invention to incorporate both green-emitting and yellow-emitting LEDs inside light-recycling envelope 102b. Using four or five primary colors and a color sequential means utilizing, respectively, four or five sub-frames per image frame, it is possible to produce a four or five-color projection display system by suitably modifying projection display system 400.

Representative light rays 414, 416 and 418 in FIG. 19, combined with the time sequence of the color sequential means shown in FIG. 12, illustrate the operation of projection display system 400. Although only three light rays of the second polarization state are shown in FIG. 19, light rays of the first polarization state will behave in a similar way. Multiple ray reflections inside the light-recycling envelopes 102a, 102b and 102c are also not shown in order to simplify the figure.

In the first sub-frame of the color sequential time sequence, red light ray 414 of a second polarization state is emitted through surface 112a of LED 106a. Red light ray 414 of a second polarization state passes through the interior of light-recycling envelope 102a, is reflected by the light-recycling envelope 102a, passes through the interior of the light-recycling envelope 102a a second time and passes through light output aperture 104a Red light ray 414 of a second polarization state is partially collimated by light-collimating means 142a, is reflected by diagonal surface 404 of x-cube prism 402 and is directed to a pixel of imaging light modulator 408. The pixel of imaging light modulator 408 forms one pixel of a red image by reflecting all or part of red light ray 414 of a second polarization state to projection lens 410 and to viewing screen 412.

In a second sub-frame of the color sequential time sequence, green light ray 416 of a second polarization state is emitted through surface 112b of LED 106b. Green light ray 416 of a second polarization state passes through the interior of light-recycling envelope 102b, is reflected by the light-recycling envelope 102b, passes through the interior of the light-recycling envelope 102b a second time and passes through light output aperture 104b. Green light ray 416 of a second polarization state is partially collimated by light-collimating means 142b, passes through x-cube prism 402 without reflection and is directed to a pixel of imaging light modulator 408. The pixel of imaging light modulator 408 forms one pixel of a green image by reflecting all or part of green light ray 416 of a second polarization state to projection lens 410 and to viewing screen 412.

In a third sub-frame of the color sequential time sequence, blue light ray 418 of a second polarization state is emitted through surface 112c of LED 106c. Blue light ray 418 of a second polarization state passes through the interior of light-recycling envelope 102c, passes through light output aperture 104c, is partially collimated by light-collimating means 142c, is reflected by diagonal surface 406 of x-cube prism 402 and is directed to a pixel of imaging light modulator 408. The pixel of imaging light modulator 408 forms one pixel of a blue image by reflecting all or part of blue light ray 418 of a second polarization state to projection lens 410 and to viewing screen 412.

FIG. 21 is a cross-sectional view of another embodiment of this invention that comprises three light-recycling illumination systems and one imaging light modulator. Projection display system 450 in FIG. 21 is similar to projection display system 400 in FIG. 19 except that the embodiment in FIG. 21 utilizes an LCOS device for the imaging light modulator instead of a DLP device. The LCOS device also requires a reflecting polarizer, which in this example is beam-splitting prism polarizer 454.

The main elements of the projection display system 450 are three light-recycling illumination systems, an x-cube prism 402, an imaging light modulator 452, a beam-splitting prism polarizer 454, a reflector 458, a projection lens 460 and a viewing screen 462. The three light-recycling illumination systems comprise, respectively, three LED light sources, three lightrecycling envelopes 102a, 102b and 102c, three light output apertures 104a, 104b and 104c and three light-collimating means 142a, 142b and 142c. Light-recycling envelope 102a encloses red-emitting LED 106a, light-recycling envelope 102b encloses green-emitting LED 106b and lightrecycling envelope 102c encloses blue-emitting LED 106c. The characteristics and properties of the LEDs, the light-recycling envelopes, the light output apertures and the light-collimating means have been described previously in the descriptions for FIGS. 4 and 6. The x-cube prism 402 was described previously for FIG. 19. Beam-splitting prism polarizers and LCOS devices have also been described above. For each of the three light-recycling illumination systems, the area of the light output aperture 104a, 104b or 104c is less than the area of the respective light source and, in some cases, the maximum exiting luminance from the light output aperture 104a, 104b or 104c is greater than the respective maximum intrinsic source luminance.

Although light-recycling envelope 102a in FIG. 21 is illustrated with one red LED, it is within the scope of this invention that light-recycling envelope 102a may enclose more than one red LED. Likewise, light-recycling envelope 102b may enclose more than one green LED and light-recycling envelope 102c may enclose more than one blue LED. It is also within the scope of this invention that red light may be produced inside light-recycling envelope 102a by one or more ultraviolet LEDs that are coated with a wavelength conversion material in order to convert ultraviolet light to red light. Green light and blue light may also be produced by wavelength conversion if desired.

Representative light rays 464, 466, 468, 470, 472 and 474 in FIG. 21, combined with the time sequence of the color sequential means shown in FIG. 12, illustrate the operation of projection display system 450. Multiple ray reflections of light rays 464, 468 and 470 inside the respective light-recycling envelopes 102a, 102b and 102c are not shown in order to simplify the figure.

LEDs 106a, 106b and 106c can emit both light of a first polarization state and light of a second polarization state. Representative rays in FIG. 21 illustrate what happens to light of a first polarization state that is emitted by the LEDs.

In the first sub-frame of the color sequential time sequence, red light ray 464 of a first polarization state is emitted through surface 112a of LED 106a. Red light ray 464 of a first polarization state passes through the interior of light-recycling envelope 102a, is reflected by the light-recycling envelope 102a, passes through the interior of the light-recycling envelope 102a a second time and passes through light output aperture 104a. Red light ray 464 of a first polarization state is partially collimated by light-collimating means 142a, is reflected by diagonal surface 404 of x-cube prism 402 and is directed to beam-splitting prism polarizer 454. Red light ray 464 of a first polarization state is reflected by partially reflecting diagonal surface 456 and is directed to a pixel of imaging light modulator 452. The pixel of imaging light modulator 452 forms one pixel of a red image by reflecting and converting all or part of red light ray 464 of a first polarization state into red light ray 466 of a second polarization state. Red light ray 466 of a second polarization state passes through the beam-splitting prism polarizer 454 without reflection and is directed through projection lens 460 and to viewing screen 462. Any part of red light ray 464 of a first polarization state that is not converted to red light ray 466 of a second polarization state is reflected and recycled by partially reflecting diagonal surface 456 back through the optical system to light-recycling envelope 102a.

In a second sub-frame of the color sequential time sequence, green light ray 468 of a first polarization state is emitted through surface 112b of LED 106b. Green light ray 468 of a first polarization state passes through the interior of light-recycling envelope 102b, is reflected by the light-recycling envelope 102b, passes through the interior of the light-recycling envelope 102b a second time and passes through light output aperture 104b. Green light ray 468 of a first polarization state is partially collimated by light-collimating means 142b, passes through x-cube prism 402 without reflection and is directed to beam-splitting prism polarizer 454. Green light ray 468 of a first polarization state is reflected by partially reflecting diagonal surface 456 and is directed to a pixel of imaging light modulator 452. The pixel of imaging light modulator 452 forms one pixel of a green image by reflecting and converting all or part of green light ray 468 of a first polarization state into green light ray 470 of a second polarization state. Green light ray 470 of a second polarization state passes through the beam-splitting prism polarizer 454 without reflection and is directed through projection lens 460 and to viewing screen 462. Any part of green light ray 468 of a first polarization state that is not converted to green light ray 470 of a second polarization state is reflected and recycled by partially reflecting diagonal surface 456 back through the optical system to light-recycling envelope 102*a*.

In a third sub-frame of the color sequential time sequence, blue light ray 472 of a first polarization state is emitted through surface 112*c* of LED 106*c*. Blue light ray 472 of a first polarization state passes through the interior of light-recycling envelope 102*c*, passes through light output aperture 104*c*, is partially collimated by light-collimating means 142*c*, is reflected by diagonal surface 406 of x-cube prism 402 and is directed to beam-splitting prism polarizer 454. Blue light ray 472 of a first polarization state is reflected by partially reflecting diagonal surface 456 and is directed to a pixel of imaging light modulator 452. The pixel of imaging light modulator 452 forms one pixel of a blue image by reflecting and converting all or part of blue light ray 472 of a first polarization state into blue light ray 474 of a second polarization state. Blue light ray 474 of a second polarization state is directed through projection lens 460 and to viewing screen 462.

Red, green and blue light of a second polarization state emitted by LED 106*a*, LED 106*b* and LED 106*c* will not be reflected by partially reflecting diagonal surface 456 of beam-splitting prism polarizer 454. Such red, green and blue light of a second polarization state (not shown in FIG. 21) will be directed to reflector 458, will be reflected by reflector 458 and will be recycled back through x-cube prism 402 and back into the respective light-recycling envelopes.

The previous examples of projection display systems are comprised of one imaging light modulator and a color sequential means to form images. It is also possible to construct projection display systems that incorporate three imaging light modulators. Such systems can form the red, green and blue images simultaneously and do not require a color sequential means to form full-color images. Embodiments of this invention that incorporate three imaging light modulators can be constructed with LCOS, DLP or LCD devices as the imaging light modulators. Only one embodiment that incorporates LCOS devices is illustrated in the figures.

Figure 22:
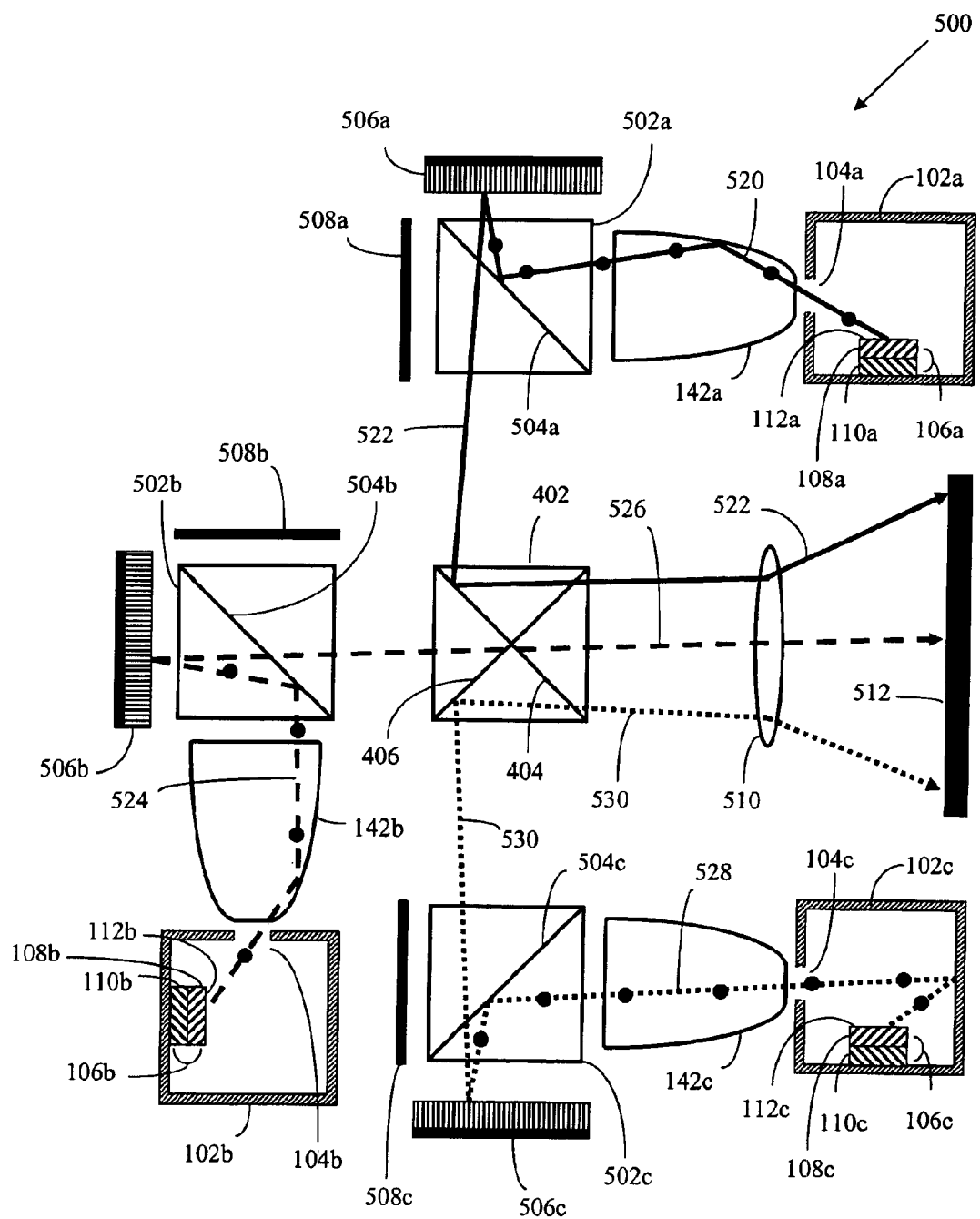
FIG. 22 is a cross-sectional view of an embodiment of this invention that incorporates three light-recycling illumination systems and three imaging light modulators.

FIG. 22 is a cross-sectional view of another embodiment of this invention that comprises three light-recycling illumination systems and three imaging light modulators. The main elements of the projection display system 500 are three light-recycling illumination systems, three beam-splitting prism polarizers 502*a*, 502*b* and 502*c*, three imaging light modulators 506*a*, 506*b* and 506*c*, three reflectors 508*a*, 508*b* and 508*c*, a light combining means, a projection lens 510 and a viewing screen 512. The three light-recycling illumination systems comprise, respectively, three LED light sources, three light-recycling envelopes 102*a*, 102*b* and 102*c*, three light output apertures 104*a*, 104*b* and 104*c* and three light-collimating means 142*a*, 142*b* and 142*c*. Light-recycling envelope 102*a* encloses red-emitting LED 106*a*, light-recycling envelope 102*b* encloses green-emitting LED 106*b* and light-recycling envelope 102*c* encloses blue-emitting LED 106*c*. The characteristics and properties of the LEDs, the light-recycling envelopes and the light-collimating means have been described previously in the descriptions for FIGS. 4 and 6. The light-combining means is x-cube prism 402, which was described previously for FIG. 19. Other light-combining means can also be utilized for this embodiment in place of the x-cube prism. Beam-splitting prism polarizers and LCOS devices have also been described previously. For each of the three light-recycling illumination systems, the area of the light output aperture 104*a*, 104*b* pr 104*c* is less than the area of the respective light source and, in some cases, the maximum exiting luminance from the light output aperture 104*a*, 104*b* or 104*c* is greater than the respective maximum intrinsic source luminance.

Although light-recycling envelope 102*a* in FIG. 22 is illustrated with one red LED, it is within the scope of this invention that light-recycling envelope 102*a* may enclose more than one red LED. Likewise, light-recycling envelope 102*b* may enclose more than one green LED and light-recycling envelope 102*c* may enclose more than one blue LED. It is also within the scope of this invention that red light may be produced inside light-recycling envelope 102*a* by one or more ultraviolet LEDs that are coated with a wavelength conversion layer in order to convert ultraviolet light to red light. Green light and blue light may also be produced by wavelength conversion layers if desired.

Representative light rays 520, 522, 524, 526, 528 and 530 in FIG. 22 illustrate the operation of projection display system 500. Multiple ray reflections of light rays 520, 524 and 528 inside the respective light-recycling envelopes 102*a*, 102*b* and 102*c* are not shown in order to simplify the figure.

Red light ray 520 of a first polarization state is emitted through surface 112*a* of LED 106*a*. Red light ray 520 of a first polarization state passes through the interior of light-recycling envelope 102*a* and passes through light output aperture 104*a*. Red light ray 520 of a first polarization state is partially collimated by light-collimating means 142*a*, is reflected by partially-reflecting diagonal surface 504*a* of beam-splitting prism polarizer 502*a* and is directed to a pixel of imaging light modulator 506*a*. The pixel of imaging light modulator 506*a* forms one pixel of a red image by reflecting and converting all or part of red light ray 520 of a first polarization state into red light ray 522 of a second polarization state. Red light ray 522 of a second polarization state is directed through beam-splitting prism polarizer 502*a* to x-cube prism 402, is reflected by diagonal surface 404 of x-cube prism 402 and is directed through projection lens 510 and to viewing screen 512. Any part of red light ray 520 of a first polarization state that is not converted by imaging light modulator 506*a* into red light ray 522 of a second polarization state is reflected and recycled by partially reflecting diagonal surface 504*a* back through the optical system to light-recycling envelope 102*a*.

Green light ray 524 of a first polarization state is emitted through surface 112*b* of LED 106*b*. Green light ray 524 of a first polarization state passes through the interior of lightrecycling envelope 102*b* and passes through light output aperture 104*b*. Green light ray 524 of a first polarization state is partially collimated by light-collimating means 142*b*, is directed to beam-splitting prism polarizer 502*b*, is reflected by partially reflecting diagonal surface 504*b* and is directed to a pixel of imaging light modulator 506*b*. The pixel of imaging light modulator 506*b* forms one pixel of a green image by reflecting and converting all or part of green light ray 524 of a first polarization state into green light ray 526 of a second polarization state. Green light ray 526 of a second polarization state is directed through beam-splitting prism polarizer 502*b* to x-cube prism 402, passes through x-cube prism 402 without reflecting and is directed through projection lens 510 and to viewing screen 512. Any part of green light ray 524 of a first polarization state that is not converted imaging light modulator 506*b* into green light ray 526 of a second polarization state is reflected and recycled by partially reflecting diagonal surface 504*b* back through the optical system to light-recycling envelope 102*b*.

Blue light ray 528 of a first polarization state is emitted through surface 112c of LED 106c. Blue light ray 528 of a first polarization state passes through the interior of light-recycling envelope 102c, is reflected by the light-recycling envelope 102c, passes through the interior of the light-recycling envelope 102c a second time and passes through light output aperture 104c. Blue light ray 528 of a first polarization state is partially collimated by light-collimating means 142c, is reflected by partially-reflecting diagonal surface 504c of beam-splitting prism polarizer 502c and is directed to a pixel of imaging light modulator 506c. The pixel of imaging light modulator 506c forms one pixel of a blue image by reflecting and converting all or part of blue light ray 528 of a first polarization state into blue light ray 530 of a second polarization state. Blue light ray 530 of a second polarization state is directed to x-cube prism 402, is reflected by diagonal surface 406 of x-cube prism 402 and is directed through projection lens 510 and to viewing screen 512. Any part of blue light ray 528 of a first polarization state that is not converted by imaging light modulator 506c into blue light ray 530 of a second polarization state is reflected and recycled by partially reflecting diagonal surface 504c back through the optical system to light-recycling envelope 102c.

In FIG. 22, reflectors 508a, 508b and 508c recycle any light of a second polarization state (not shown) emitted by the respective LEDs 106a, 106b and 106c back to the respective light-recycling envelopes 102a, 102b and 102c. Recycled light of a second polarization state can reflect many times inside the respective light-recycling envelopes and be partially converted to light of a first polarization state. Such recycled and converted light can exit the light-recycling envelopes and increase the efficiency and output brightness of projection display system 500.

While the invention has been described in conjunction with specific embodiments and examples, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A projection display system, comprising:
   a light-recycling illumination system, wherein said light-recycling illumination system further comprises:
      a light source for generating light, wherein said light source is at least one light-emitting diode having a reflecting layer, wherein the total light-emitting area of said light source is area $A_S$ and wherein said light source has a maximum intrinsic source luminance and;
      a light-recycling envelope, wherein said light-recycling envelope encloses said light source and wherein said light-recycling envelope reflects and recycles a portion of said light generated by said light source back to said reflecting layer; and
      a light output aperture, wherein said light output aperture is located in a surface of said light-recycling envelope, wherein the area of said light output aperture is area $A_O$, wherein said area $A_O$ is less than said area $A_S$, wherein said light source and said light-recycling envelope direct at least a fraction of said light out of said light-recycling envelope through said light output aperture and wherein said fraction of said light exits said light output aperture as uncollimated light having a maximum exiting luminance;
      a light-collimating means, wherein said light-collimating means has an input surface that is adjacent to said light output aperture that accepts said uncollimated light, wherein said light-collimating means partially collimates said uncollimated light and wherein said light-collimating means has an output surface through which the partially collimated light is transmitted; and
      an imaging light modulator, wherein said imaging light modulator is located in the optical path of said partially collimated light, and wherein said imaging light modulator spatially modulates said partially collimated light to form an image.

2. A projection display system as in claim 1, further comprising a reflective polarizer, wherein said reflective polarizer is located in the optical path of said partially collimated light and is located adjacent to said output surface of said light-collimating means, wherein said reflective polarizer reflects a first polarization state of said partially collimated light and wherein said reflective polarizer transmits a second polarization state of said partially collimated light.

3. A projection display system as in claim 1, wherein said maximum exiting luminance is greater than said maximum intrinsic source luminance.

4. A projection display system as in claim 3, further comprising a projection lens, wherein said projection lens is located in the optical path in a position after said imaging light modulator and wherein said projection lens magnifies said image formed by said imaging light modulator.

5. A projection display system as in claim 4, wherein said light-collimating means is chosen from the group consisting of a convex lens, a tapered light guide and a compound parabolic reflector.

6. A projection display system as in claim 5, wherein said imaging light modulator is chosen from the group consisting of a liquid crystal display device, a liquid-crystal-on-silicon device and a digital light processor device.

7. A projection display system as in claim 6, wherein said light source is a plurality of light-emitting diodes.

8. A projection display system as in claim 7, wherein said light source emits red light, green light and blue light.

9. A projection display system as in claim 8, wherein said light source comprises at least one light-emitting diode that emits ultraviolet light and wherein said light source further comprises a wavelength conversion layer that converts said ultraviolet light into said red light or said green light or said blue light.

10. A projection display system as in claim 8, wherein said light-recycling envelope is filled or partially filled with a transparent material having an effective refractive index greater than 1.60.

11. A projection display system as in claim 8, wherein said light source also emits a fourth color.

12. A projection display system as in claim 11, wherein said fourth color is chosen from the group consisting of white, yellow, cyan and magenta.

13. A projection display system as in claim 8, further comprising a control unit, wherein said control unit manages the timing sequence for the emission of said red light, said green light and said blue light by a color sequential means.

14. A projection display system as in claim 13, wherein said light-recycling illumination system emits red light and wherein said projection display system further comprises a second light-recycling illumination system that emits green light and a third light-recycling illumination system that emits blue light.

15. A projection display system as in claim 14, wherein said second light-recycling illumination system also emits yellow light.

16. A projection display system as in claim 14, wherein said third light-recycling illumination system also emits cyan light.

17. A projection display system as in claim 14, wherein said projection display system further comprises a color combining means.

18. A projection display system as in claim 17, wherein said color combining means is chosen from the group of a trichroic prism and an x-cube prism.

19. A projection display system as in claim 18, wherein said projection display system further comprises a second imaging light modulator and a third imaging light modulator.

20. A color sequential method of forming a full-color projection display image comprising the steps of:
dividing the time period for each frame of said full-color projection display image into at least a first sub-frame, a second sub-frame after said first sub-frame, and a third sub-frame after said second sub-frame;
during said first sub-frame, addressing all pixels of an imaging light modulator to set the transmission of said imaging light modulator for light of a first color, emitting said light of first color from a first light source that has a first reflecting layer, recycling a portion of said light of a first color back to said first reflecting layer to increase the effective brightness of said first light source, partially collimating a fraction of said light of a first color, directing the partially collimated said light of a first color to said imaging light modulator and spatially modulating said partially collimated said light of a first color to form a first image;
during said second sub-frame, addressing all said pixels of said imaging light modulator to set said transmission of said imaging light modulator for light of a second color, emitting said light of a second color from a second light source that has a second reflecting layer, recycling a portion of said light of a second color back to said second reflecting layer to increase the effective brightness of said second light source, partially collimating a fraction of said light of a second color, directing the partially collimated said light of a second color to said imaging light modulator and spatially modulating said partially collimated said light of a second color to form a second image; and
during said third sub-frame, addressing all said pixels of said imaging light modulator to set said transmission of said imaging light modulator for light of a third color, emitting said light of a third color from a third light source that has a third reflecting layer, recycling a portion of said light of a third color back to said third reflecting layer to increase the effective brightness of said third light source, partially collimating a fraction of said light of a third color, directing the partially collimated said light of a third color to said imaging light modulator and spatially modulating said partially collimated said light of a third color to form a third image.

21. A method as in claim 20, wherein said step of emitting said light of first color from a first light source is done with red light from a red light-emitting diode, said step of emitting said light of second color from a second light source is done with green light from a green light-emitting diode and said step of emitting said light of third color from a third light source is done with blue light from a blue light-emitting diode.

22. A method as in claim 21, further comprising:
emitting said green light at different green wavelengths from a plurality of different green light-emitting diodes in order to increase the color gamut of said full-color projection display image.

23. A method as in claim 21, further comprising:
emitting said red light, said green light and said blue light in random order in said first sub-frame, said second sub-frame and said third sub-frame.

24. A method as in claim 21, further comprising:
dividing the time period for each said frame into a fourth sub-frame after said third sub-frame and, during said fourth sub-frame, addressing all said pixels of said imaging light modulator to set said transmission of said imaging light modulator for light of a fourth color, emitting said light of a fourth color from a fourth light source that has a fourth reflecting layer, recycling a portion of said light of a fourth color back to said fourth reflecting layer to increase the effective brightness of said fourth light source, partially collimating said light of a fourth color, directing the partially collimated said light of a fourth color to said imaging light modulator and spatially modulating said partially collimated said light of a fourth color to form a fourth image.

25. A method as in claim 24, further comprising:
emitting said light of a fourth color by simultaneously emitting said red light, said green light and said blue light in order to produce white light.

26. A method as in claim 24, further comprising:
emitting said fourth color by simultaneously emitting said red light and said green light in order to produce yellow light.

27. A method as in claim 24, further comprising:
emitting said fourth color by simultaneously emitting said green light and said blue light in order to produce cyan light.

28. A method as in claim 24, further comprising:
emitting said fourth color by simultaneously emitting said red light and said blue light in order to produce magenta light.

29. A method as in claim 24, further comprising:
emitting said fourth color by emitting yellow light from a yellow light-emitting diode in order to increase the color gamut of the full-color image.

30. A method as in claim 24, further comprising:
emitting said fourth color by emitting cyan light from a cyan light-emitting diode in order to increase the color gamut of the full-color image.

31. A method as in claim 21, further comprising:
modifying the output brightness of said full-color projection display image by changing each of the red light output from said first light source, the green light output from said second light source and the blue light output from said third light source by the same numerical factor.

32. A method as in claim 21, further comprising:
modifying the output brightness of said full-color projection display image by changing each of the red light emitting time, the green light emitting time and the blue light emitting time by the same numerical factor.

33. A method as in claim 21, further comprising:
modifying the color temperature of said full-color projection display image by changing the ratio of the red light output to the green light output to the blue light output.

34. A method as in claim 21, further comprising:
modifying the color temperature of said full-color projection display image by changing the ratio of the red light emitting time to the green light emitting time to said blue light emitting time.

* * * * *